US006826364B2

(12) United States Patent
Kawasaki et al.

(10) Patent No.: US 6,826,364 B2
(45) Date of Patent: Nov. 30, 2004

(54) ZOOM FLASH AND FLASH PHOTOGRAPHY SYSTEM

(75) Inventors: Masahiro Kawasaki, Saitama (JP); Osamu Sato, Saitama (JP); Shigeru Iwamoto, Saitama (JP); Tadahisa Ohkura, Saitama (JP); Kazuhito Taneoka, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/955,098

(22) Filed: Sep. 19, 2001

(65) Prior Publication Data

US 2002/0061190 A1 May 23, 2002

(30) Foreign Application Priority Data

Sep. 19, 2000 (JP) .......................................... 2000-284413
Feb. 9, 2001 (JP) .......................................... 2001-34580

(51) Int. Cl.$^7$ ........................... G03B 15/02; G03B 15/06

(52) U.S. Cl. ........................... 396/157; 396/62; 396/175

(58) Field of Search ........................... 396/62, 157, 164, 396/173, 175

(56) References Cited

U.S. PATENT DOCUMENTS

| 4,710,012 A | * | 12/1987 | Yamada ........................ 396/157 |
| 5,956,531 A | * | 9/1999 | Kawabe et al. ................ 396/62 |
| 6,067,422 A | | 5/2000 | Tokunaga et al. |
| 6,167,202 A | * | 12/2000 | Fukui ........................ 396/157 |

FOREIGN PATENT DOCUMENTS

JP          9-54352          2/1997

* cited by examiner

*Primary Examiner*—Russell Adams
*Assistant Examiner*—Arthur A Smith
(74) *Attorney, Agent, or Firm*—Greenblum & Bernstein, P.L.C.

(57) ABSTRACT

A zoom flash includes a light emitter, a zoom driver which moves the light emitter along an axis to vary an illumination angle, a detecting device which detects a zoom position of the light emitter, a calculation device which calculates a pre-flash emission level according to the detected zoom position so that illuminance on an object at a predetermined distance is substantially constant regardless of a variation of the illumination angle, and a control device which activates the light emitter to emit a preliminary flash emission, before a main flash emission, by supplying a voltage corresponding to the pre-flash emission level for the light emitter. A flash photography system is also disclosed.

18 Claims, 34 Drawing Sheets

Waveform of Flash Emission

Waveform of Flash Emission (1) (2)

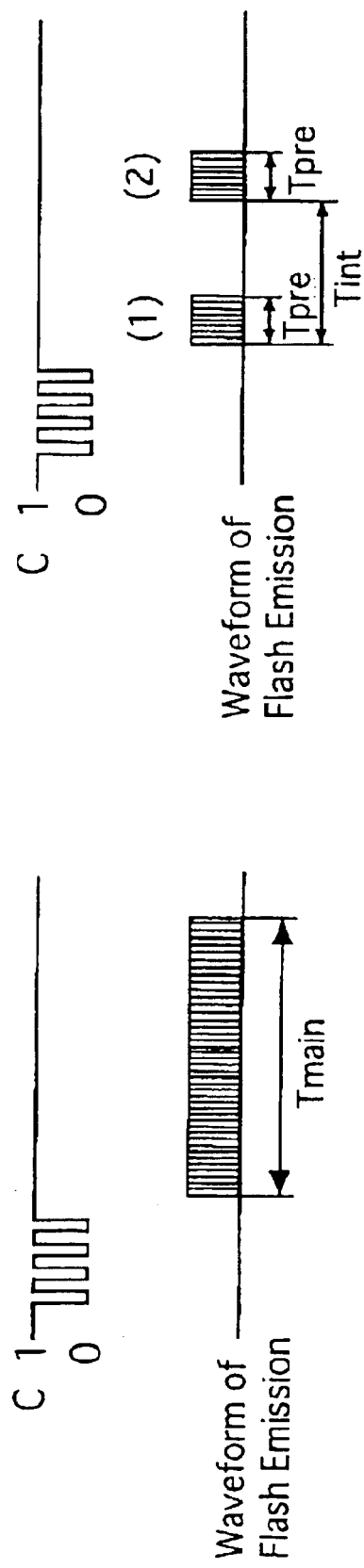

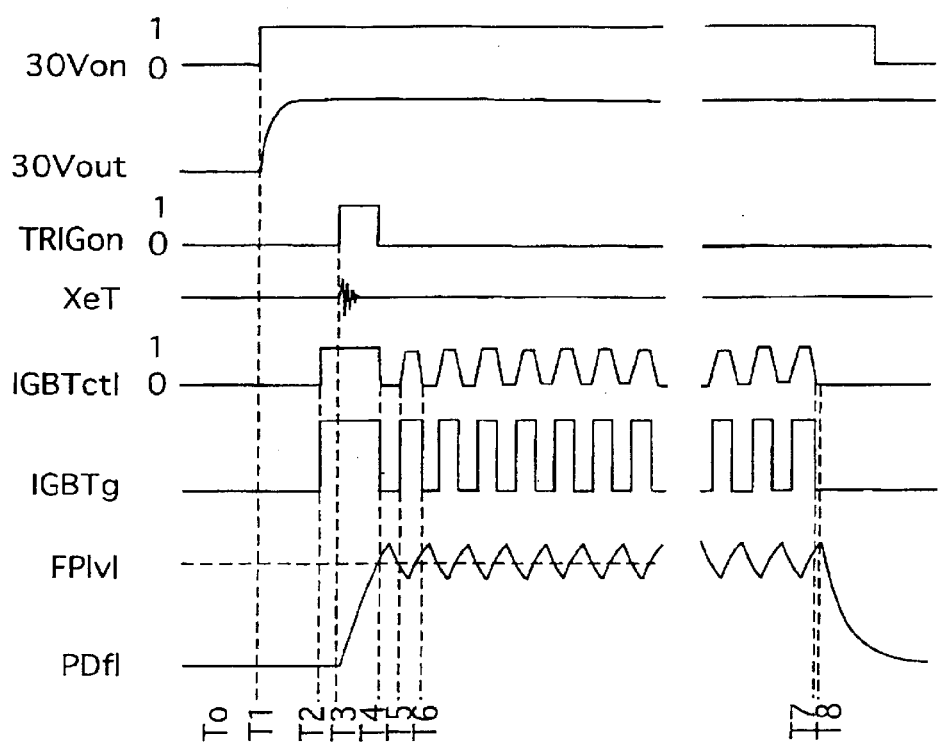

Fig.8A
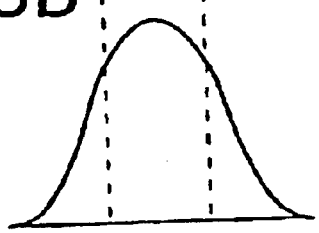
Fig.8B
Fig.8C
| 4 | 12 | 4 |
|---|----|---|
| 12 | 36 | 12 |
| 4 | 12 | 4 |
Fig.9A
Fig.9B
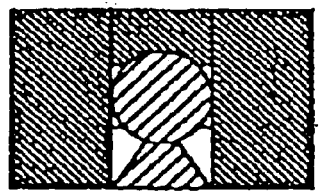
Fig.9C
Fig.9D
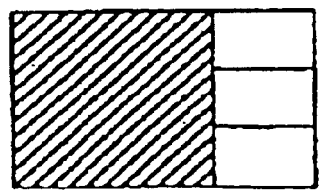

ZOOM FLASH AND FLASH PHOTOGRAPHY SYSTEM

BACKGROUND OF THE INVENTION

1. Field of the Invention

The present invention relates to a zoom flash which adjusts the flash illumination angle in accordance with a variation of the focal length of a photographing lens, and further relates to a flash photography system, wherein the amount of light of the main flash discharge is controlled in accordance with photometric readings obtained at a pre-flash emission.

2. Description of the Related Art

Various types of cameras with which a flash photography is possible in which one or more flash devices are actuated to emit a pre-flash emission (preliminary flash emission) to determine the reflectivity of the subject (an object) before the main flash discharges wherein the amount of light of the main flash discharge is controlled in accordance with photometric readings obtained at the pre-flash emission are known in the art.

However, in the case of using a zoom flash (a zoom flash device) which adjusts the flash illumination angle in accordance with a variation of the focal length of the photographing lens, correct photometric readings cannot be obtained at the pre-flash emission when the light amount of the pre-flash emission is constant because the intensity of the pre-flash emission varies in accordance with zooming of the zoom flash. Therefore, it is sometimes the case that correct exposure is not achieved for the main object in flash photography.

SUMMARY OF THE INVENTION

An object of the present invention is to provide a flash photography system in which correct exposure can be attained to the main subject even if a plurality of zoom flashes with different illumination angles are used or even if a plurality of flash devices with different guide numbers are used.

Another object of the present invention is to provide a zoom flash that is used in such a flash photography system.

To achieve the objects mentioned above, according to an aspect of the present invention, a zoom flash is provided, including a light emitter, a zoom driver which moves the light emitter along an axis to vary an illumination angle, a detecting device which detects a zoom position of the light emitter, a calculation device which calculates a pre-flash emission level according to the detected zoom position so that illuminance on an object at a predetermined distance is substantially constant regardless of a variation of the illumination angle, and a control device which activates the light emitter to emit a preliminary flash emission, before a main flash emission, by supplying a voltage corresponding to the pre-flash emission level for the light emitter.

Preferably, the calculation device calculates the pre-flash emission level so that an effective guide number is substantially constant regardless of the variation of the illumination angle.

In an embodiment, the zoom flash further includes a memory in which a maximum guide number that varies in accordance with the zoom position, a reference guide number predetermined as a constant, and a reference flash emission level predetermined as a correction constant are stored; wherein the maximum guide number, the reference guide number, and the reference flash emission level are stored in the memory, and wherein the calculation device calculates a pre-flash emission level using the following equation:

$$Vfp = Va \times (Gnos/Gno(\text{zoom}))^2$$

wherein "Vfp" represents the pre-flash emission level; "Va" represents the reference flash emission level; "Gnos" represents the reference guide number; and "Gno(zoom)" represents the maximum guide number corresponding to the detected zoom position.

Preferably, the zoom flash further includes a terminal connector via which the zoom flash can be electrically connected to a camera body. The zoom driver moves the light emitter in accordance with a focal length of a photographing lens of the camera body in a case where the zoom flash is electrically connected to the camera body.

In an embodiment, the control device controls the light emitter perform a pre-flash emission in a flat emission mode.

According to another aspect of the present invention, a flash photography system is provided, having a camera body and at least one zoom flash, the zoom flash being activated to emit a preliminary flash emission before a main flash emission. The zoom flash includes a light emitter, a zoom driver which moves the light emitter along an axis to vary an illumination angle, and a detecting device which detects a zoom position of the light emitter. Either the camera body or the zoom flash includes a calculation device which calculates a pre-flash emission level according to the detected zoom position so that an illuminance on an object at a predetermined distance is substantially constant regardless of a variation of the illumination angle, and a control device which activates the light emitter to emit a preliminary flash emission by supplying a voltage corresponding to the pre-flash emission level for the light emitter before a main flash emission.

Preferably, the calculation device calculates the pre-flash emission level so that an effective guide number is substantially constant regardless of the variation of the illumination angle.

In an embodiment, the zoom flash further includes a memory in which a maximum guide number that varies in accordance with the zoom position, a reference guide number predetermined as a constant, and a reference flash emission level predetermined as a correction constant are stored; wherein the maximum guide number, the reference guide number, and the reference flash emission level are stored in the memory, and wherein the calculation device calculates a pre-flash emission level using the following equation:

$$Vfp = Va \times (Gnos/Gno(\text{zoom}))^2$$

wherein "Vfp" represents the pre-flash emission level; "Va" represents the reference flash emission level; "Gnos" represents the reference guide number; and "Gno(zoom)" represents the maximum guide number corresponding to the detected zoom position.

Preferably, the flash photography system further includes a terminal connector via which the zoom flash can be electrically connected to a camera body. The zoom driver moves the light emitter in accordance with a focal length of a photographing lens of the camera body in a case where the zoom flash is electrically connected to the camera body.

In an embodiment, the control device controls the light emitter perform a pre-flash emission in a flat emission mode.

The present disclosure relates to subject matter contained in Japanese Patent Application No.2000-284413 (filed on Sep. 19, 2000) and No.2001-34580 (filed on Feb. 9, 2001), which are expressly incorporated herein by reference in their entireties.

BRIEF DESCRIPTION OF THE DRAWINGS

The present invention will be described below in detail with reference to the accompanying drawings in which:

FIG. 7 is a timing chart for signals or values in the uniform flash-emission process;

FIG. 8A is a diagram of a photometering area of a TTL nine-segment photometering sensor including nine different photometering zones;

FIG. 8B is a graph showing the distribution of the light received by a TTL direct photometering sensor in the horizontal direction across the center of the TTL nine-segment photometering sensor;

FIG. 8C is a diagram showing the amount of the light received by the TTL direct photometering sensor via each of the nine different photometering zones as a percentage (%) relative to the total amount of the light received by the TTL direct photometering sensor;

FIG. 9A is a conceptual diagram showing a case where the main object is located at a position corresponding to only a central part of the TTL nine-segment photometering sensor while the background of the main object are located far away from the main object;

FIG. 9B is a diagram showing the brightness determined with the TTL nine-segment photometering sensor at each of the nine different photometering zones thereof in the particular case shown in FIG. 9A at the pre-flash emission stage;

FIG. 9C is a conceptual diagram showing a case where the main object is located to correspond to a major part of the TTL nine-segment photometering sensor while an object having a high reflectivity exits in the background of the main object;

FIG. 9D is a diagram showing the brightness determined with the TTL nine-segment photometering sensor at each of the nine different photometering zones thereof in the particular case shown in FIG. 9C at the pre-flash emission stage;

DESCRIPTION OF THE PREFERRED EMBODIMENT

Figure 4A:
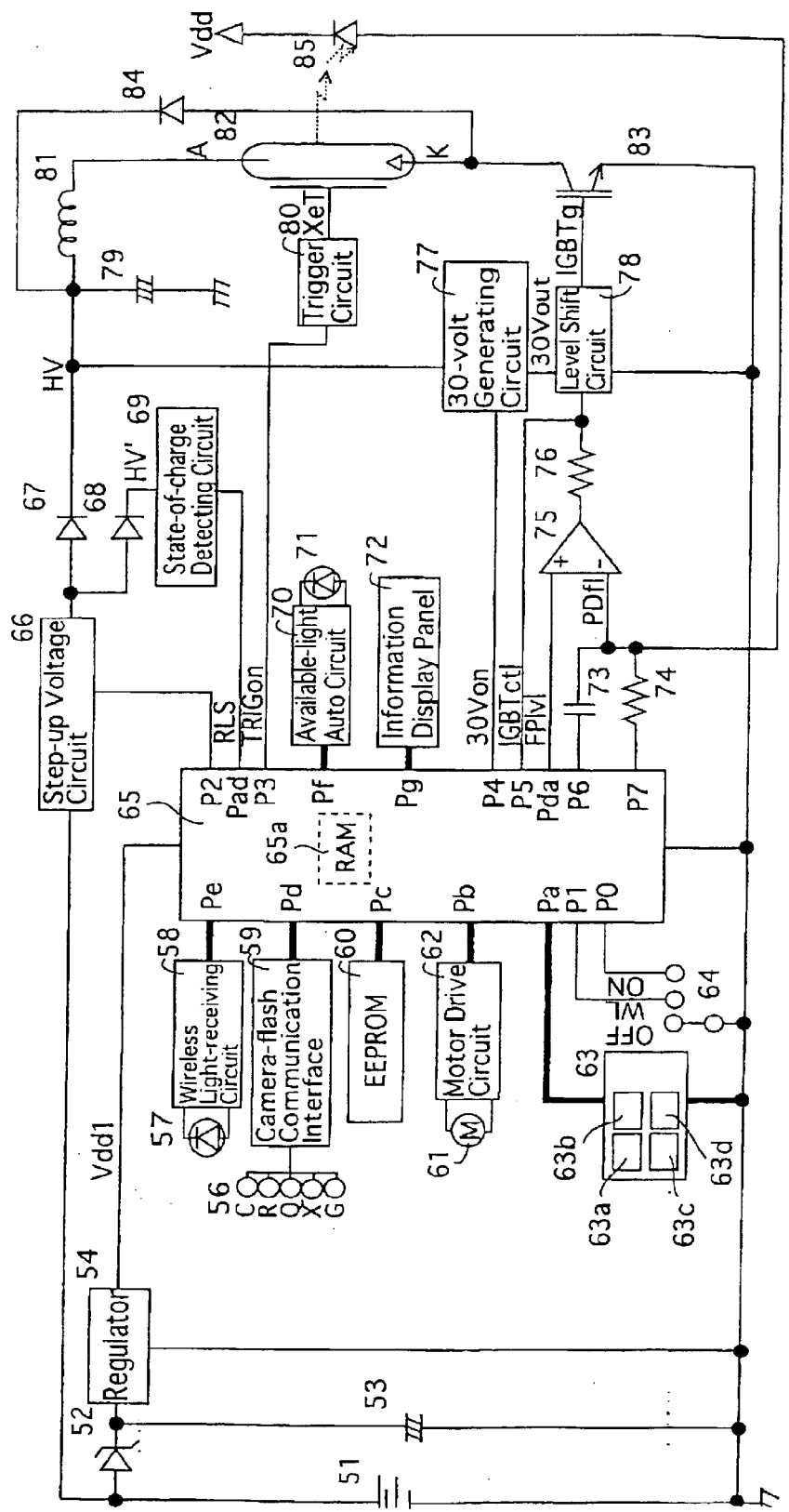
FIG. 4A is a schematic block diagram of a flash device which serves as a fundamental component of the flash photography system to which the present invention is applied.

An embodiment of a flash photography system which will be hereinafter discussed includes a camera body 10 shown in FIG. 1, and more than one flash device 50 shown in FIG. 4A (only one of them is shown in FIG. 4A). The camera body 10 is an SLR camera body to which an interchangeable lens (not shown) is mounted. The flash device 50 is used as either an external flash device which is electrically connected to the camera body 10 so that the flash operation of the flash device 50 is controlled via wire communication between the flash device 50 and the camera body 10, or a slave flash device whose flash operation is controlled by wireless via a low flash emission (wireless signal) emitted by a built-in flash of the camera body 10 or the external flash device. The user can freely determine the number of flash devices 50 to be used, and which flash device 50 is to be used as external flash device or slave flash device.

In the following descriptions, the logic level of a low-level (ground-level) voltage is represented by "0", while the logic level of a high-level voltage is represented by "1" with respect to the illustrated circuits and elements.

Figure 1:
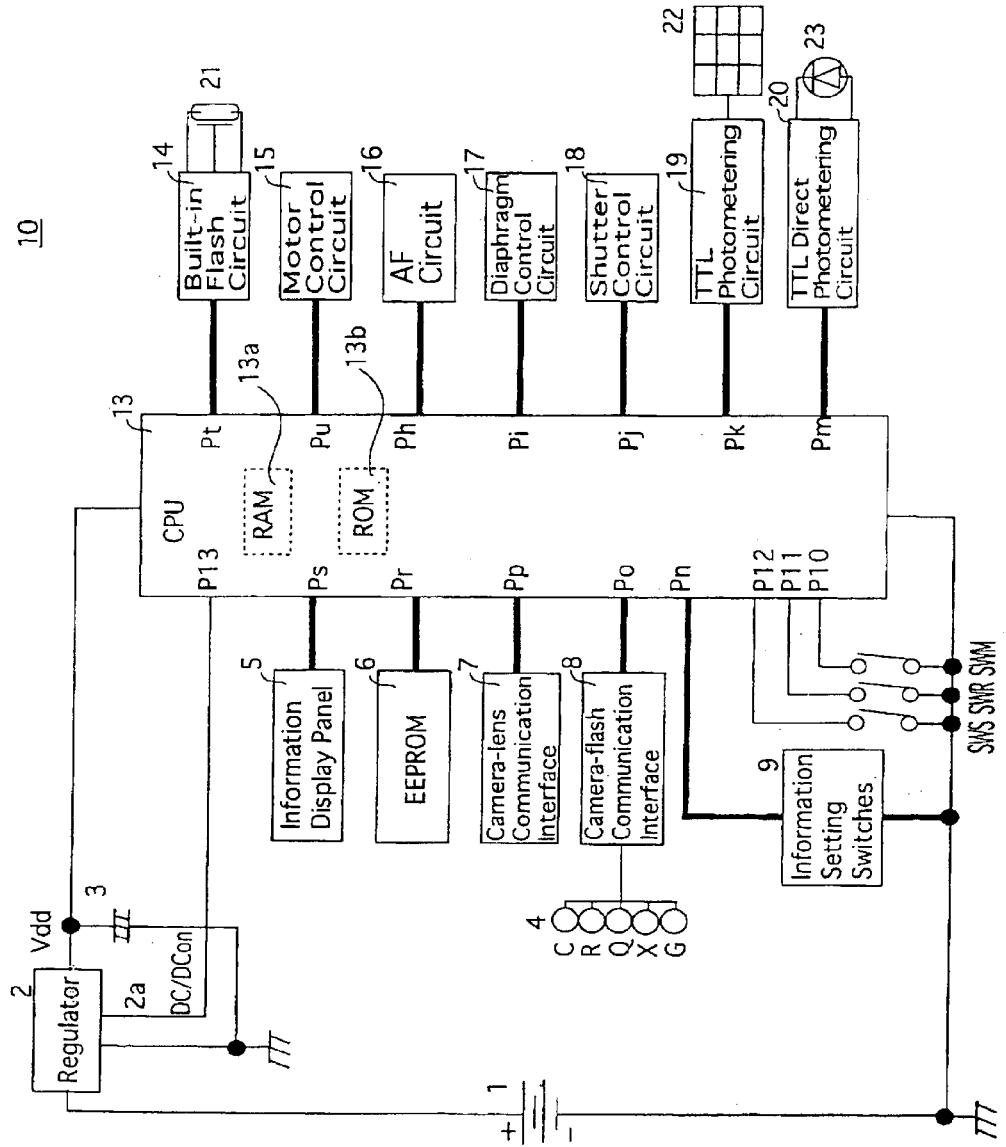
FIG. 1 is a schematic block diagram of an embodiment of a camera which serves as a fundamental component of a flash photography system to which the present invention is applied.

As shown in FIG. 1, the camera body 10 is provided with a CPU 13 which serves as a controller for comprehensively controlling the overall operations of the camera body 10. The CPU 13 is provided therein with a RAM 13a in which control data are temporarily stored, and a ROM 13b in which control programs are stored. The voltage of a battery 1 is supplied as a constant voltage Vdd to the CPU 13 via a regulator 2. The regulator 2 is provided with a DC/DCon terminal 2a which serves as a control terminal. The DC/DCon terminal 2a is connected to a port P13 of the CPU 13 so that the voltage step-up operation of the regulator 2 is controlled by the CPU 13. The constant voltage Vdd output from the regulator 2 is also supplied to a capacitor 3.

The camera body 10 is provided with an information display panel 5 such as an LCD panel, an EEPROM 6, a camera-lens communication interface 7, and a camera-flash communication interface 8. The information display panel 5 is connected to a group of ports Ps of the CPU 13, and indicates various photographic information. Various rewritable parameters and modes are written in the EEPROM 6 that is connected to a group of ports Pr of the CPU 13. The camera-lens communication interface 7 is connected to a group of ports Pp of the CPU 13, and is used for communication between the camera body 10 and the interchangeable lens (not shown) which is mounted to the camera body 10. The camera-flash communication interface 8 is connected to a group of ports Po of the CPU 13, and is used for communication between the camera body 10 and the external flash device.

The camera-flash communication interface 8 is provided with a terminal connector 4 provided, e.g., at a hot shoe of the camera body 10. The terminal connector 4 has five terminals C, R, Q, X and G. The terminal C serves as a control terminal via which a control signal is output to the external flash device (flash device 50). The terminal R serves as a clock terminal via which a clock signal is output to the external flash device. The terminal Q is a dual-purpose terminal which is used for the two-way communication between the camera and the external flash device, and for outputting a quench signal to the external flash device. The terminal X corresponds to the X contact which becomes "0" upon completion of a movement of the leading curtain (first blind) of a focal plane shutter provided in the camera body 10. The terminal G serves as a ground terminal.

The camera body 10 is provided with a photometering switch SWS, a release switch SWR, a main switch SWM and a group of information setting switches 9 which are connected to the CPU 13 via ports P12, P11, P10 and a group of ports Pn, respectively.

The photometering switch SWS is turned ON when the release button (not shown) on the camera body 10 is depressed halfway down, while the release switch SWR is turned ON when the release button is fully depressed.

The main switch SWM is turned ON and OFF when a power button or knob (not shown) on the camera body 10 is switched to an ON position and an OFF position, respectively.

The group of information setting switches 9 includes a test-flash setting switch, a DX-code information setting switch, a photographic information setting switch and a WLint-mode setting switch.

In the WLint mode, the flash operation of the slave flash device (flash device 50) is wireless-controlled via a light signal (wireless signal) emitted by the built-in flash of the camera body 10. The WLint mode has the following subordinate modes: a WLoff mode in which the flash operation of the slave flash device is disabled; a WLFP mode in which the slave flash device is activated to discharge in a uniform flash-emission mode (flat emission mode) upon receipt of the aforementioned wireless signal; a WLC mode in which the slave flash device is activated to discharge in a normal flash emission mode (i.e., in a flash emission mode other than the flat emission mode) upon receipt of the aforementioned wireless signal; and a WLM mode in which the slave flash device is activated to discharge in the normal flash emission mode, upon receipt of the aforementioned wireless signal, and at the same time, the built-in flash of the camera body 10 is emitted for an exposure. Note that the use of the term "uniform intensity" or "uniform flash-emission" refers to one kind of flash emission control used in high-speed synchronized photography, and can be also referred to as "flat emission".

The camera body 10 is provided with a built-in flash circuit 14 for activating an xenon flashtube 21, a motor control circuit 15 for controlling operations of motors such as a film transport motor, a film charge motor and an AF motor, an AF circuit 16 for detecting a focus state of an image of the object using a phase difference detecting method, a diaphragm control circuit 17 for opening and closing an iris diaphragm of the photographing lens, and a shutter control circuit 18 for controlling the movement of the leading and trailing curtains (first and second curtains) of the focal plane shutter. The built-in flash circuit 14, the motor control circuit 15, the AF circuit 16, the diaphragm control circuit 17 and the shutter control circuit 18 are connected to groups of ports Pt, Pu, Ph, Pi and Pj of the CPU 13, respectively. The built-in flash circuit 14 and the xenon flashtube 21 are fundamental elements of the built-in flash of the camera body 10. In the descriptions of the present specification and claims, the term "built-in flash" represents the xenon flashtube 21 itself or a combination of the built-in flash circuit 14 and the xenon flashtube 21.

The camera body 10 is provided with a TTL photometering circuit (photometering circuit) 19 and a TTL direct photometering circuit (direct photometering circuit) 20 which are connected to a group of ports Pk and a group of ports Pm of the CPU 13, respectively.

The camera body 10 is provided with a nine-segment photometering sensor (a multi-zone photometering sensor) 22 which is disposed in the vicinity of a pentagonal prism (an erecting optical system) (not shown) to receive light passing through an optical path of a viewfinder (not shown) The TTL photometering circuit 19 processes sensor data output from the nine-segment photometering sensor 22, and outputs the processed sensor data to the CPU 13. The nine-segment photometering sensor 22 has nine different zone sensors 22_1, 22_2, 22_3, 22_4, 22_5, 22_6, 22_7, 22_8 and 22_9. The nine-segment photometering sensor 22 can perform a photometering operation on each of nine different photometering zones (1 through 9; see FIG. 8A) defined in the image via the nine zone sensors 22_1 through 22_9, respectively.

The camera body 10 is provided with a TTL direct photometering sensor (photodiode/single-segment direct photometering sensor) 23 which is disposed at a position where the TTL direct photometering sensor 23 can receive light which is passed through the photographing lens and reflected by a film surface, so that the TTL direct photometering sensor 23 can receive light of the object directly during an exposure. The TTL direct photometering circuit 20 processes a photo-current output from the TTL direct photometering sensor 23, and outputs the processed data to the CPU 13.

In the present embodiment of the flash photography system, the reflected light of a pre-flash emission, which is emitted before the main flash, is photometered by the nine-segment photometering sensor 22 to determine a TTL correction value in accordance with the amount of received light at each of the nine different zone sensors 22_1 through 22_9. Thereafter, a predetermined optimum exposure amount is corrected in accordance with the TTL correction value, and subsequently the reflected light of the main flash emission is photometered by the TTL direct photometering sensor 23 to attain correct exposure at a shutter release. The reflected light of a test-flash emission that is performed to check the illumination range is photometered via the nine-segment photometering sensor 22.

The TTL photometering circuit 19 will be hereinafter discussed in detail with reference to FIG. 2.

Figure 2:
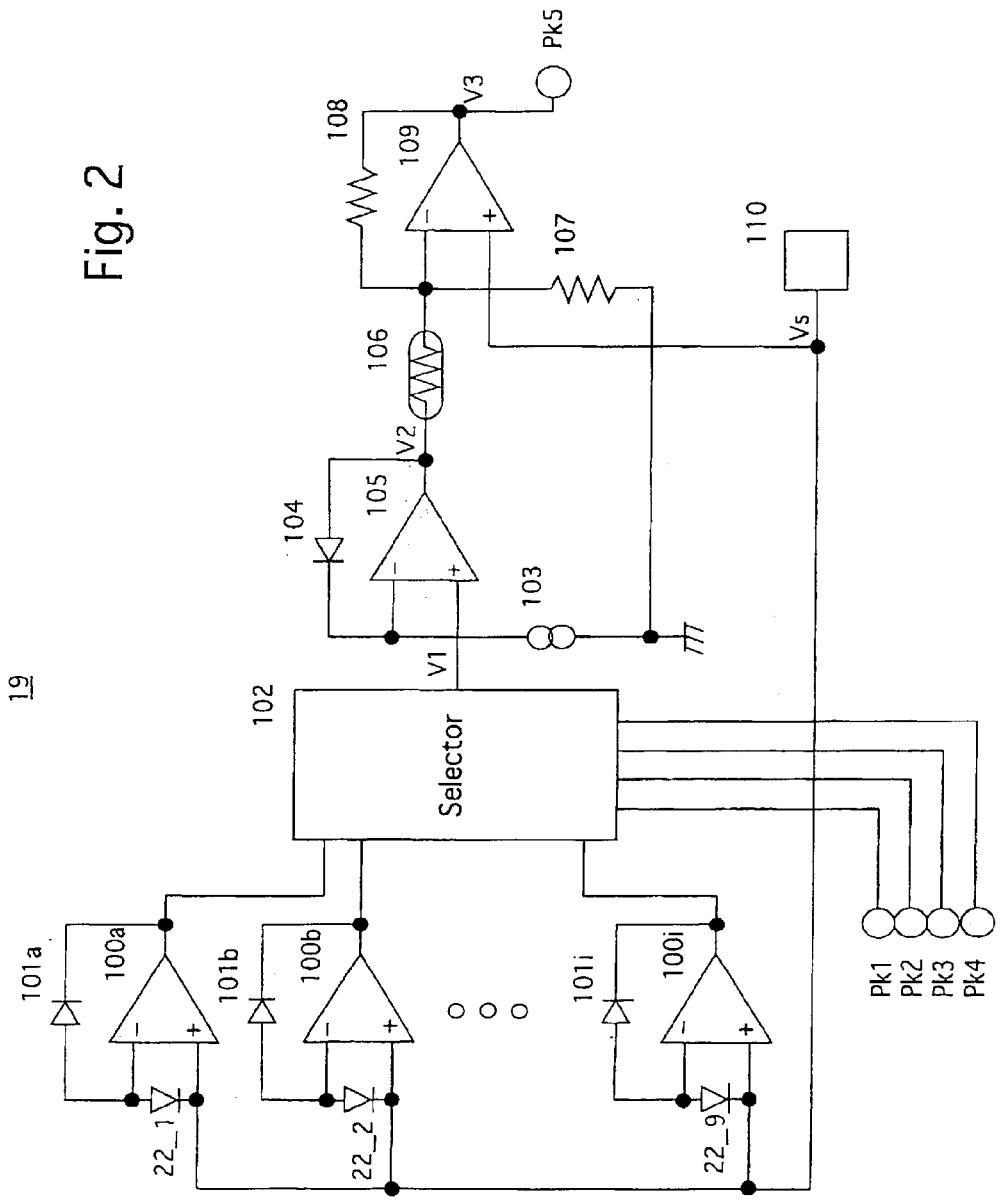
FIG. 2 is a circuit diagram of an embodiment of a TTL photometering circuit shown in FIG. 1.

FIG. 2 is a circuit diagram of an embodiment of the TTL photometering circuit 19. It should be noted that third through eighth zone sensors 22_3 through 22_8 and associated operational amplifiers and compressor diodes are not shown in FIG. 2 for the purpose of simplifying the drawing. Each of the nine different zone sensors 22_1 through 22_9 (only 22_1, 22_2 and 22_9 are shown in FIG. 2) are connected between the inverting input terminal and the non-inverting input terminal of a corresponding one of nine operational amplifiers 100a through 100i (only 100a, 100b and 100i are shown in FIG. 2). A reference voltage Vs is applied to the non-inverting input terminal of each of the nine operational amplifiers 100a through 100i.

The light which is incident on the nine-segment photometering sensor 22 is received thereby at each of the nine different zone sensors 22_1 through 22_9, and each of the nine different zone sensors 22_1 through 22_9 generates a photo-current corresponding to the amount of the received light. The photo-current generated by each of the nine different zone sensors 22_1 through 22_9 is converted logarithmically via a corresponding one of nine compressor diodes 101a through 100i (only 101a, 100b and 101i are shown in FIG. 2) to be output to a selector 102. The selector 102 selects one of the nine different zone sensors 22_1 through 22_9 which corresponds to the levels of signals input from a group of ports Pk including first through four ports Pk1 through Pk4. The photo-current (logarithmic value) generated by one zone sensor selected by the selector 102 is output, as an output V1 of the selector 102, to the non-inventing input terminal of an operational amplifier 105.

A constant-current source 103 is connected between the inverting input terminal of the operational amplifier 105 and ground, while a compressor diode 104 is connected between the non-inverting input terminal of the operational amplifier 105 and the output terminal of the operational amplifier 105. Output V2 of the operational amplifier 105 is determined via the following equation:

$$V2 = Vs + (KT/q)(\ln(Is/Ip))$$

wherein "T" represents the absolute temperature (temperature in kelvin);

"K" represents Boltzmann's constant;

"q" represents the electric charge of electrons;

"Is" represents the value of the current supplied from the constant-current source 103; and "Ip" represents the photocurrent (logarithmic value) generated by one of the nine different zone sensors 22_1 through 22_9 which is selected by the selector 102.

The output V2 of the operational amplifier 105 is input to the inverting input terminal of an operational amplifier 109 via a PTC (positive temperature coefficient) thermal resistor 106. The reference voltage Vs is applied to the non-inverting input terminal of an operational amplifier 109. A resistor 107 is connected between the inverting input terminal of the operational amplifier 109 and ground, while a resistor 108 is connected between the inverting input terminal of the operational amplifier 109 and the output terminal of the operational amplifier 109. Assuming that the voltages of the PTC thermal resistor 106, the resistor 108 and the resistor 107 are R1, R2 and R3, respectively, a voltage output V3 of the operational amplifier 109 is determined by the following equation:

$$V3 = Vs(1 + R2/R3) + (KT/q)(R2/R1)(\ln(Is/Ip)).$$

In this equation, the absolute temperature is made up for by the temperature coefficient of the resistor R1. Namely, the output V3 of the operational amplifier 109 becomes proportional to the photocurrent Ip generated by the selected one of the nine different zone sensors 22_1 through 22_9, which is selected by the selector 102. The output V3 is output to an A/D conversion port Pk5 of the CPU 13.

Figure 3:
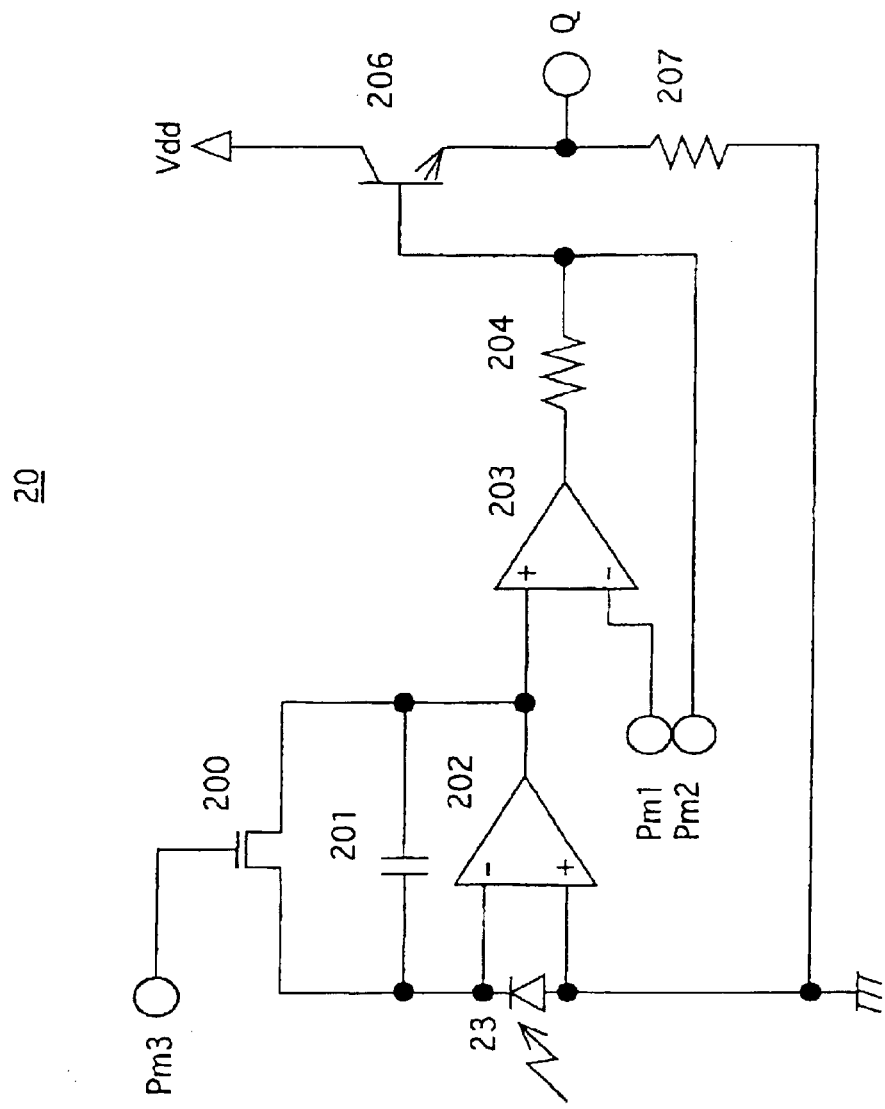
FIG. 3 is a circuit diagram of an embodiment of a TTL direct photometering circuit shown in FIG. 1.

The TTL direct photometering circuit 20 will be hereinafter discussed in detail with reference to FIG. 3. FIG. 3 is a circuit diagram of an embodiment of the TTL direct photometering circuit 20. The TTL direct photometering sensor 23 is connected between the two input terminals of an operational amplifier 202. An integrating capacitor 201 and a MOSFET (metal oxide semiconductor FET) 200, which is hereinafter referred to as "MOS_SW", are connected in parallel between the inverting input terminal of the operational amplifier 202 and the output terminal of the operational amplifier 202. The gate of the MOS_SW 200 is connected to a port Pm3 of the group of ports Pm of the CPU 13 so that the operation of the gate of the MOS_SW 200 is controlled by the CPU 13. More specifically, the operation of the gate of the MOS_SW 200 is controlled by the CPU 13 so that the MOS_SW 200 is switched ON and OFF when the output of the port Pm3 is "1" and "0", respectively. In an ON state of the MOS_SW 200, the integrating capacitor 201 discharges while the output voltage of the operational amplifier 202 drops. In an OFF state of the MOS_SW 200, upon a discharge of the main flash, the TTL direct photometering sensor 23 receives light reflected by film surface to output a photocurrent, and subsequently the integrating capacitor 201 integrates (accumulates) the photocurrent corresponding to the amount of light received by the TTL direct photometering sensor 23. As a result, the output voltage of the operational amplifier 202 rises.

The output terminal of the operational amplifier 202 is connected to an input terminal of a comparator 203. The comparator 203 compares the output of the operational amplifier 202 with a predetermined voltage T_ttl(x) to output an output signal corresponding to the result of the comparison. The comparator 203 outputs an output signal of "0" if the output of the operational amplifier 202 is equal to or smaller than the predetermined voltage T_ttl(x) The comparator 203 outputs an output signal of "1" if the output of the operational amplifier 202 is greater than the predetermined voltage T_ttl(x). The CPU 13 supplies the predetermined voltage T_ttl(x) to another input terminal of the comparator 203 via a D/A conversion port Pm1 of the group of ports Pm of the CPU 13.

The output signal of the comparator 203 is input via a resistor 204 to an emitter-follower logic circuit consisting of a transistor 206 and a resistor 207. The emitter of the transistor 206 is connected to the terminal Q of the terminal connector 4. The output signal of the emitter functions as a quench signal for quenching the discharge of the external flash device. Immediately after the output of the transistor 206 changes from low to high, the signal at terminal Q changes from "0" to "1" to quench the discharge of the external flash device. If a sync mode setting designates a successive sync flash mode (the details of which will be discussed later), the signal at terminal Q changes from "1" to "0" immediately after the output of the transistor 206 changes from high to low to activate the external flash device which is to discharge after another flash device 50 discharges.

The transistor 206 is driven between high and low by the CPU 13 via a port Pm2 thereof. The CPU 13 usually outputs a signal from the port Pm2 to control the high/low state of the transistor 206. However, in the case where a TTL photometering mode (e.g., TTL Auto-flash mode) is selected as a photometering mode setting, the port Pm2 of the CPU 13 serves as an input port. In this case, the transistor 206 is driven between high and low by the output signal of the comparator 203.

FIG. 4A is a schematic block diagram of the flash device 50. The flash device 50 is a zoom flash which can adjust the flash illumination angle in accordance with the focal length of the lens in use. The flash device 50 is used as an external flash device or a slave flash device as described above. The flash device 50 serves as external flash device when mounted directly on the camera body 10 (e.g., at a hot shoe thereof) or when connected to the camera body via a connecting cord, or serves as slave flash device when not connected to the camera body 10.

The flash device 50 is provided with a flash CPU (control device/calculation device) 65 which serves as controller for comprehensively controlling the overall operations of the flash device 50. The flash device 50 is provided with a battery 51, a Schottky diode 52, a capacitor 53 and a regulator 54. The voltage on the battery 51 is supplied as a constant voltage Vdd1 to the flash CPU 65 via the Schottky diode 52 and the regulator 54. The voltage on the battery 51 is also supplied to the capacitor 53 via the Schottky diode 52.

The flash device 50 is provided with a motor drive/detecting circuit (detecting device) 62, an EEPROM (memory) 60, and a camera-flash communication interface 59, which are connected to the flash CPU 65 via groups of ports Pb, Pc and Pd thereof, respectively. A zoom motor 61 of the flash CPU 65 is driven via the motor drive/detecting circuit 62. Various rewritable parameters and modes are written in the EEPROM 60. The camera-flash communication interface 59 is used for communication between a camera body and the flash device 50.

Figure 4B:
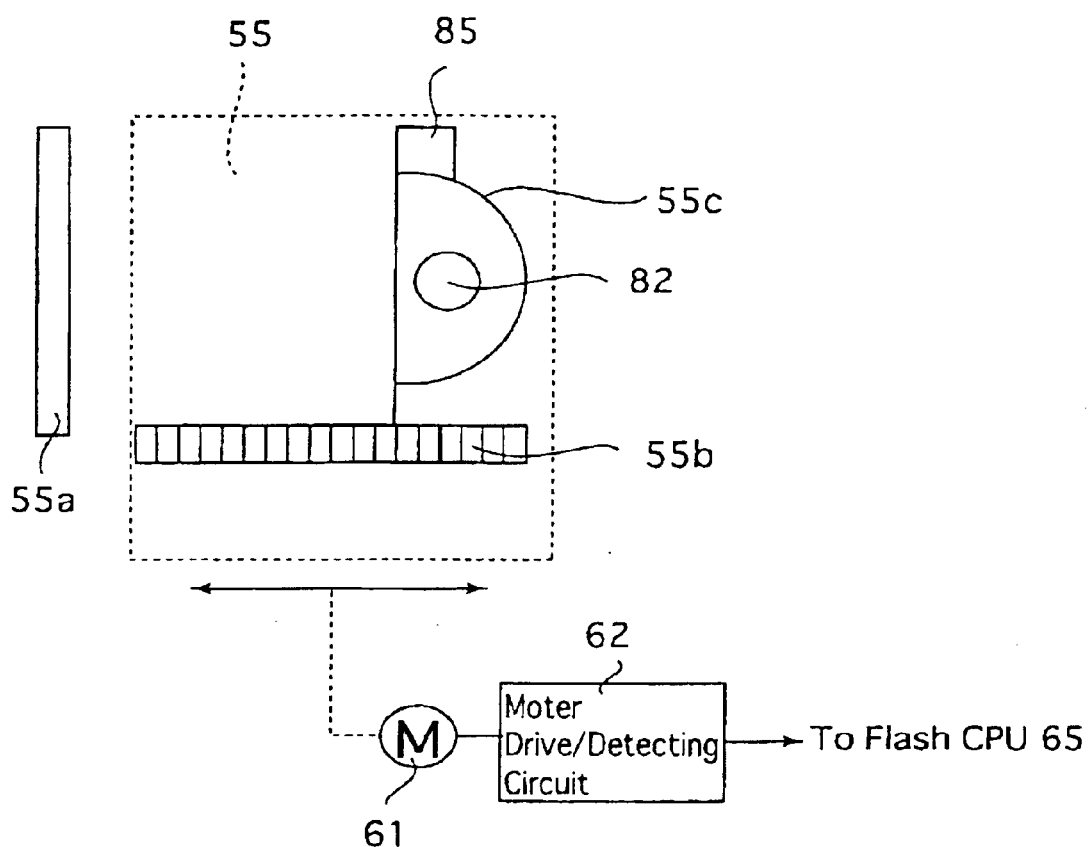
FIG. 4B is a schematic view of light emitter unit which is driven in a direction parallel to an optical axis of the camera.
Figure 5:
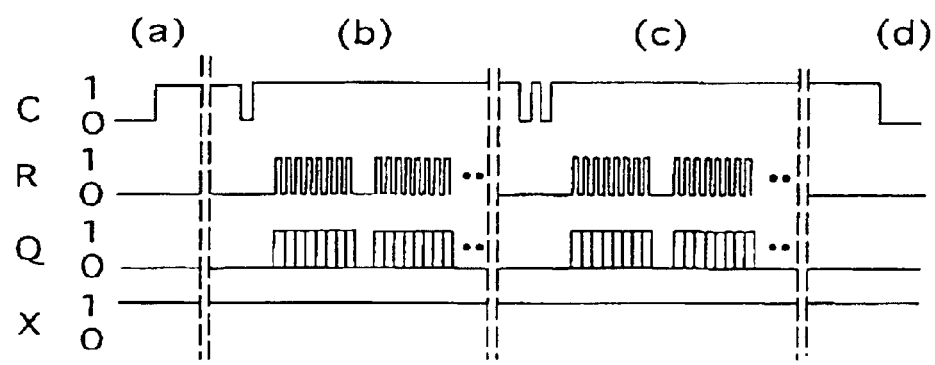
FIG. 5 is a communication sequence chart for signals transmitted between the camera body and the flash device in a state before the flash device discharges.

As shown schematically in FIG. 4B, the zoom motor 61 serves as a zoom driver for moving a light emitting unit (light emitter) 55. The light emitting unit 55 includes a xenon flashtube 82, a reflector 55c and a protection glass 55b, and is guided along an axis parallel to an optical axis of the camera body 10. Moving the light emitting unit 55 forward and rearward (left and right as viewed in FIG. 4B) with respect to a Fresnel lens 55a positioned in front of the light emitting unit 55 causes the space between the Fresnel lens 55a and the light emitting unit 55 to vary to thereby change the flash illumination angle.

The camera-flash communication interface 59 is provided with a terminal connector 56 which is connected to the terminal connector 4 provided on the camera body 10, e.g., at the hot she thereof when the flash device 50 is used as an external flash device. The terminal connector 56 has five terminals C, R, Q, X and G. The terminal C of the terminal connector 56 serves as a control terminal via which a control signal is input from the camera body 10. The terminal R of the terminal connector 56 serves as a clock terminal via which a clock signal is input from the camera body 10. The terminal Q of the terminal connector 56 is a dual-purpose terminal which is used for two-way communication between the camera body 10 and the flash device 50, and for inputting a quench signal for the flash device 50 from the camera body 10. A signal from the X contact of the camera body 10 is input from the camera body 10 via the terminal X of the terminal connector 56. The terminal G of the terminal connector 56 serves as a ground terminal.

In a state where the flash device 50 is connected to the camera body 10 via the terminal connectors 4 and 56, the flash CPU 65 carries out data-communication with the camera body 10 via the terminals C, R and Q.

Figure 33:
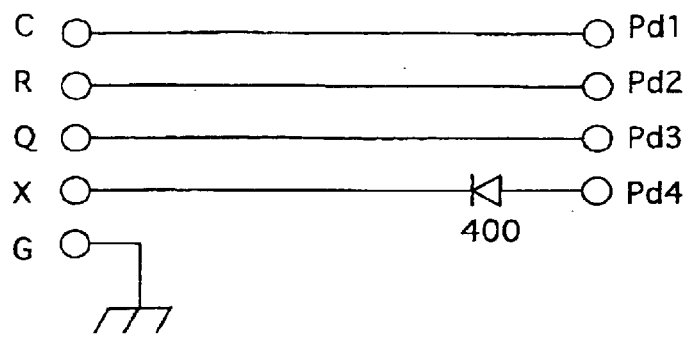
FIG. 33 is a diagram illustrating the structure of a terminal connector of the flash device which is connected to a corresponding terminal connector of the camera body.

The terminals C, R and Q of the terminal connector 56 are connected to ports Pd1, Pd2 and Pd3 of the group of ports Pd of the flash CPU 65 via the camera-flash communication interface 59, respectively (see FIG. 33). In FIG. 33 the camera-flash communication interface 59 is not shown for the purpose of simplifying the drawing. As shown in FIG. 33, the terminal X of the terminal connector 56 is connected to a port Pd4 via a diode 400. The diode 400 protects the flash CPU 65 from being damaged if the flash device 50 is connected to the camera together with an external flash device which causes a high voltage to be applied to terminal X of the terminal connector 56.

The flash device 50 is provided with a group of information setting switches 63 and a main switch 64. The main switch 64 is a sliding switch which takes one of the following three positions: OFF, WL (wireless) and ON. The main switch 64 is provided with a WL terminal and an ON terminal which are connected to the flash CPU 65 via ports P1 and P0 thereof, respectively.

The group of information setting switches 63 is connected to the flash CPU 65 via the group of ports Pa. The group of information setting switches 63 includes a photometering mode request setting switch 63a, a sync mode request setting switch 63b, a wireless mode setting switch 63c, and a system selector switch 63d. The photometering mode request setting switch 63a switches the photometering mode among the three photometering modes: a TTL photometering mode, an auto flash photometering mode and a manual photometering mode, in that order every time the photometering mode request setting switch 63a is depressed (switched ON). In the TTL photometering mode, the flash device 50, serving as an external flash device, stops emitting when the light amount measured by the TTL direct photometering sensor 23 reaches an appropriate receiving light amount. In the auto photometering mode, the flash device 50 stops emitting when the light amount measured by the auto flash circuit 71 reaches a predetermined receiving light amount. In the manual photometering mode, the flash device 50 stops emitting after the predetermined time is lapsed.

The sync mode request setting switch 63b is operated to set one of the following flash modes as a sync mode request: a leading curtain sync flash mode, the successive sync flash mode and the uniform flash-emission mode (flat emission mode). In the leading-curtain sync flash mode, the flash device 50 starts firing upon completion of a movement of the leading curtain of the shutter. In the successive sync flash mode, the flash device 50 which serves as external flash device starts discharging at the trailing edge of the quench signal after another flash device 50 which also serves as external flash device and which has been set in the leading curtain sync flash mode has discharged. In the flat emission mode, the flash fires with a substantially uniform intensity for a given period of time so as to give uniform flash-emission on the object in high-speed synchronized photography.

The wireless mode setting switch 63c is operated to set one of the following three wireless modes: a wireless controller mode, a wireless master mode and a wireless slave mode. In the wireless controller mode, the flash device 50 controls the operation of at least one slave flash device (another flash device 50) by wireless control. In the wireless master mode, the flash device 50 controls the operation of at least one slave flash device (another flash device 50) by wireless control, and at the same time, discharges to emit the main flash at a time of exposure. In the wireless slave mode, the flash device 50 is used as a slave flash device, which is not connected to the camera body 10 in use. Accordingly, the wireless controller mode and the wireless master mode can be set only when the flash device 50 is used as an external flash device, while the wireless slave mode can be set only when the flash device 50 is used as a slave flash device.

The wireless mode setting switch 63c is valid only when the main switch 64 is in the aforementioned position WL.

The system selector switch 63d is valid only when the flash device 50 serves as slave flash device, and is operated to set either an old-system compatible mode or a new-system compatible mode. In the old-system compatible mode, the slave flash device emits the main flash at a time of exposure upon receiving a single flash emission (light signal) emitted by the built-in flash of the camera body 10 or the external flash device. In the new-system compatible mode, the slave flash device emits the main flash at a time of exposure upon receiving more than one light signal (wireless signal) successively.

The flash device 50 is provided with a wireless light-receiving circuit 58, an auto flash circuit 70 and an information display panel 72 such as an LCD panel which are connected to the flash CPU 65 via groups of ports Pe, Pf and Pg, respectively. The wireless light-receiving circuit 58 processes the output of a light-receiving element 57 connected to the wireless light-receiving circuit 58. The auto flash circuit 70 processes the output of a light-receiving element 71 connected to the auto flash circuit 70. The information display panel 72 indicates various information such as photometering-range checking information. The light-receiving element 57, which is connected to the wireless light-receiving circuit 58, operates to receive a flash emission of the built-in flash or the external flash device when the flash device 50 serves as slave flash device. The light-receiving element 71, which is connected to the auto flash circuit 70, operates to detect the amount of the main flash emission of the flash device 50 in the auto flash photometering mode.

The flash CPU 65 is provided with a voltage step up circuit 66 which multiplies the voltage of the battery 51, and a state-of-charge detecting circuit 69. The voltage step up circuit 66 is connected to the flash CPU 65 via a port P2 thereof. The state-of-charge detecting circuit 69 is connected to the flash CPU 65 via an A/D conversion port Pad thereof. The voltage multiplied by the voltage step up circuit 66 is supplied to a main capacitor 79 via a diode 67, and also to the state-of-charge detecting circuit 69 via a diode 68 at the same time. A terminal voltage HV across the main capacitor 79 can be detected via the state-of-charge detecting circuit 69 only when the voltage step up circuit 66 is in operation.

The flash device 50 is provided with a 30-volt generating circuit 77, a level shift circuit 78 and a trigger circuit 80, which are connected to ports P4, P5 and P3 of the flash CPU 65, respectively. The 30-volt generating circuit 77 generates a voltage of 30 volts output from a terminal 30 Vout of the 30-volt generating circuit 77 with the aforementioned terminal voltage HV as a power source if a signal 30 Von which is output from the port P4 of the flash CPU 65 to be input to the 30-volt generating circuit 77 is "1". The voltage of 30 volts output from the 30-volt generating circuit 77 is supplied to the level shift circuit 78.

The level shift circuit 78 applies the voltage of 30 volts, which is supplied from the 30-volt generating circuit 77, to a gate IGBTg of an IGBT 83 to switch the IGBT 83 ON when the port P5 of the flash CPU 65 is "1", i.e., a signal IGBTon input from the flash control circuit 65 is "1". On the other hand, the level shift circuit 78 operates to switch the IGBT 83 OFF when the port P5 of the flash control circuit 65 is "0", i.e., when the signal IGBTon input from the flash control circuit 65 is "0".

The trigger circuit 80 applies an oscillating high voltage to a trigger electrode XeT of the xenon flashtube 82 to render xenon gas filled therein in an excitation state. In this excitation state, the electric charges accumulated in the main capacitor 79 are discharged via a coil 81, the xenon flashtube 82 and the IGBT 83 at the time the IGBT 83 is switched ON to thereby activate the xenon flashtube 82 to flash.

The flash device 50 is provided with a comparator 75, the non-inverting input terminal of which is connected to a D/A conversion port Pda of the flash CPU 65. The flash device 50 is provided with a capacitor 73 and a resistor 74 which are connected to ports P6 and P7, respectively. A terminal of the capacitor 73 and the resistor 74 is connected to the inverting input terminal of the comparator 75. A terminal of a light-receiving element 85 for detecting the amount of the flash emission discharged from the xenon flashtube 82 is also connected to the inverting input terminal of the comparator 75. The light-receiving element 85 is positioned so as to receive the flash emission of the xenon flashtube 82 directly via the protection glass 55b, and outputs a photocurrent corresponding to the amount of the received light.

The comparator 75 compares a predetermined voltage FPlvl input from the D/A conversion port Pda with a voltage PDfl corresponding to the output of the light-receiving element 85. Subsequently, the comparator 75 outputs a low-level signal "0" if the voltage PDfl is smaller than the voltage FPlv1, or outputs a high-level signal "1" if the voltage PDfl is equal to or greater than the voltage FPlv1. The output of the comparator 75 is supplied to the level shift circuit 78 via a resistor 76. The level shift circuit 78 inputs the output of the comparator 75 as a signal IGBTctl to switch the IGBT 83 ON or OFF.

Figure 34:
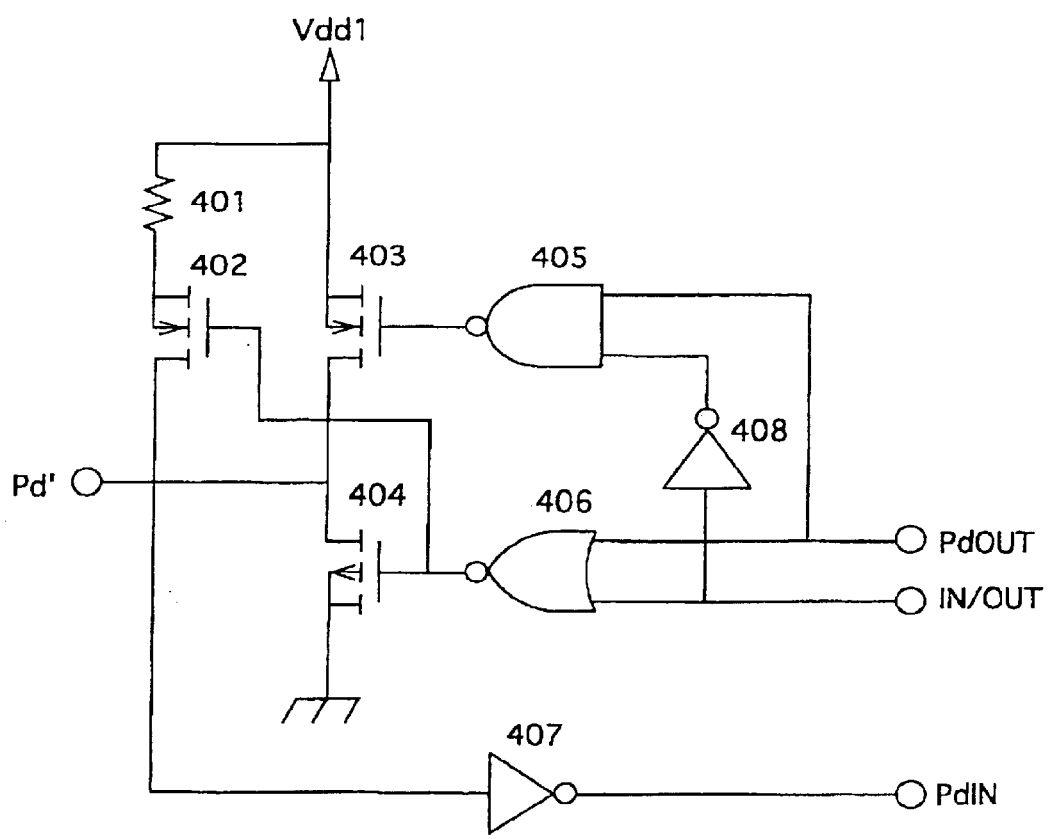
FIG. 34 is a circuit diagram of an embodiment of each of four specific I/O ports of the CPU of the flash device.

The basic structure of the flash device 50 has been discussed above. The groups of ports Pd (I/O ports Pd1, Pd2, Pd3 and Pd4) of the flash CPU 65 will be hereinafter discussed in detail. FIG. 34 shows an embodiment of each of the ports Pd1, Pd2, Pd3 and Pd4. A port Pd' shown in FIG. 34 represents each of the ports Pd1, Pd2, Pd3 and Pd4 since all the ports Pd1, Pd2, Pd3 and Pd4 have the same structure. Accordingly, each of the ports Pd1, Pd2, Pd3 and Pd4 will be hereinafter discussed as the port Pd' in detail with reference to FIG. 34.

The drain of each of a p-channel MOSFET 402, a p-channel MOSFET 403 and a n-channel MOSFET 404 is connected to the port Pd'. The source of the p-channel MOSFET 402 is connected to a constant-voltage line Vdd1 via a pull-up resistor 401, while the gate of the p-channel MOSFET 402 is connected to the output terminal of a two-input NOR gate 406. The source of the p-channel MOSFET 403 is connected to the constant-voltage line Vdd1, while the gate of the p-channel MOSFET 403 is connected to the output terminal of a two-input NAND gate 405. The source of the n-channel MOSFET 404 is connected to ground, while the gate of the n-channel MOSFET 404 is connected to the output terminal of the two-input NOR gate 406. One of the two input terminals of the two-input NOR gate 406 is connected to an I/O port switch terminal IN/OUT, while the other input terminal of the two-input NOR gate 406 is connected to an output terminal PdOUT. One of the two input terminals of the two-input NAND gate 405 is connected to the output terminal of an inverter 408, while the other input terminal of the two-input NAND gate 405 is connected to the output terminal PdOUT. The output of the I/O port switch terminal IN/OUT is input to the input terminal of the inverter 408. The port Pd' is connected to an input terminal PdIN via an inverter 407.

In the above described embodiment of the port Pd', the n-channel MOSFET 404 is in the OFF state because the output of the two-input NOR gate 406 is "0" regardless of the state of the output terminal PdOUT when the I/O port switch terminal IN/OUT is "1". In addition, the output of the two-input NAND gate 405 is "1", while the p-channel MOSFET 403 is in the OFF state. Therefore, the signal output from the output terminal PdOUT is not output to a port Pd'. In this case, since the p-channel MOSFET 402 is in the OFF state, the port Pd' is pulled up by the pull-up resistor 401. Namely, the state of input of the port Pd' is captured and taken into the flash CPU 65 from the input terminal PdIN via the inverter 407.

The signal output from the port Pd' is "0" when the I/O port switch terminal IN/OUT is "0" because the n-channel MOSFET 404 and the p-channel MOSFET 403 are in the ON state and the OFF state, respectively, if the output terminal PdOUT is "0". On the other hand, the signal output from the port Pd' is "1" when the I/O port switch terminal IN/OUT is "0" because the n-channel MOSFET 404 and the p-channel MOSFET 403 are in the OFF state and the ON state, respectively, if the output terminal PdOUT is "1". Accordingly, each of the group of ports Pd serves as an input port and an output port when the I/O port switch terminal IN/OUT is "1" and "0", respectively.

On the basis of the above described structures of the camera body 10 and the flash device 50, fundamental operations of the camera body will be hereinafter discussed with reference to the flow charts shown in FIGS. 10A through 19.

Camera Main Process

Figure 10A:
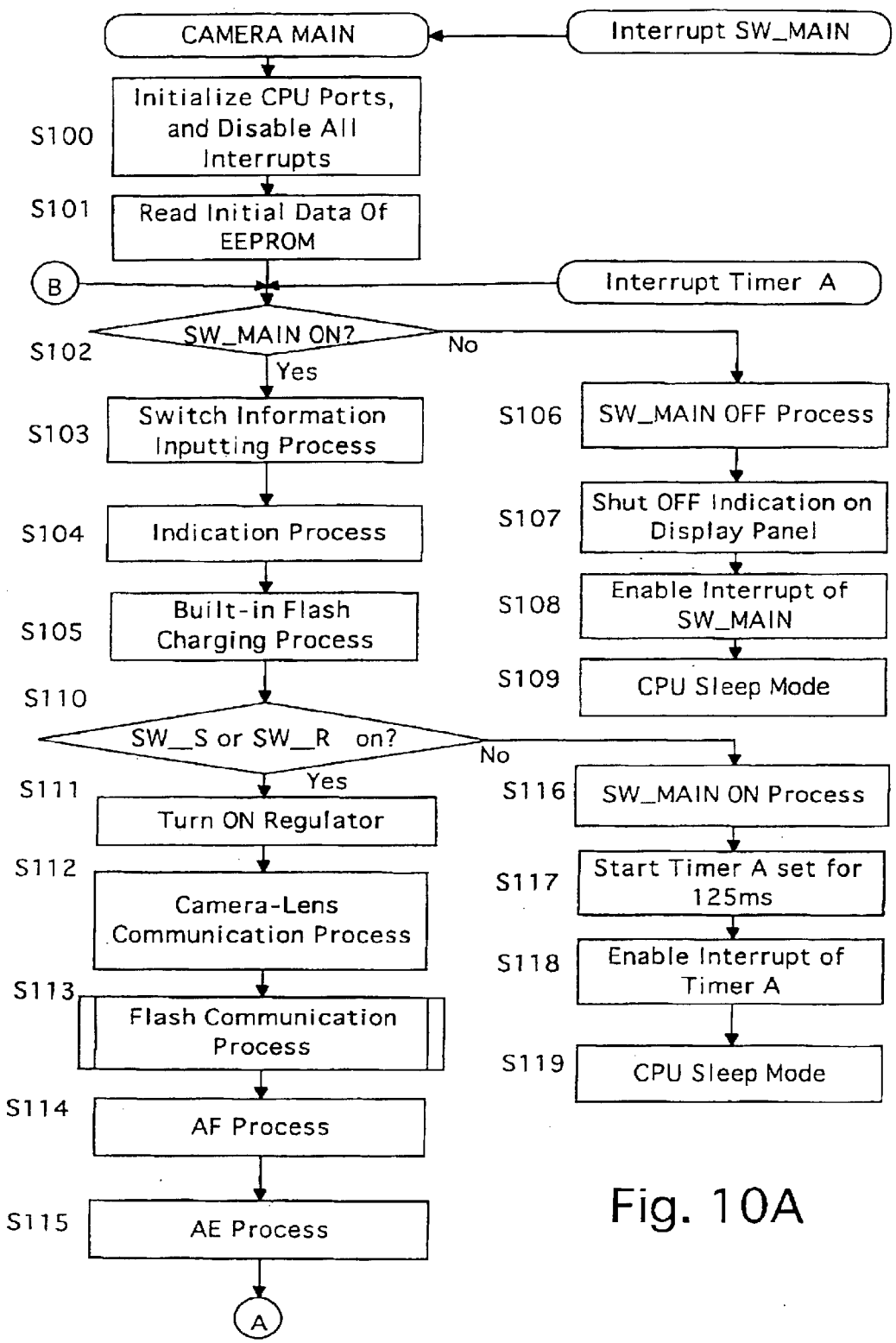
FIGS. 10A and 10B show a flow chart for a camera main process performed by a CPU of the camera body.
Figure 10B:
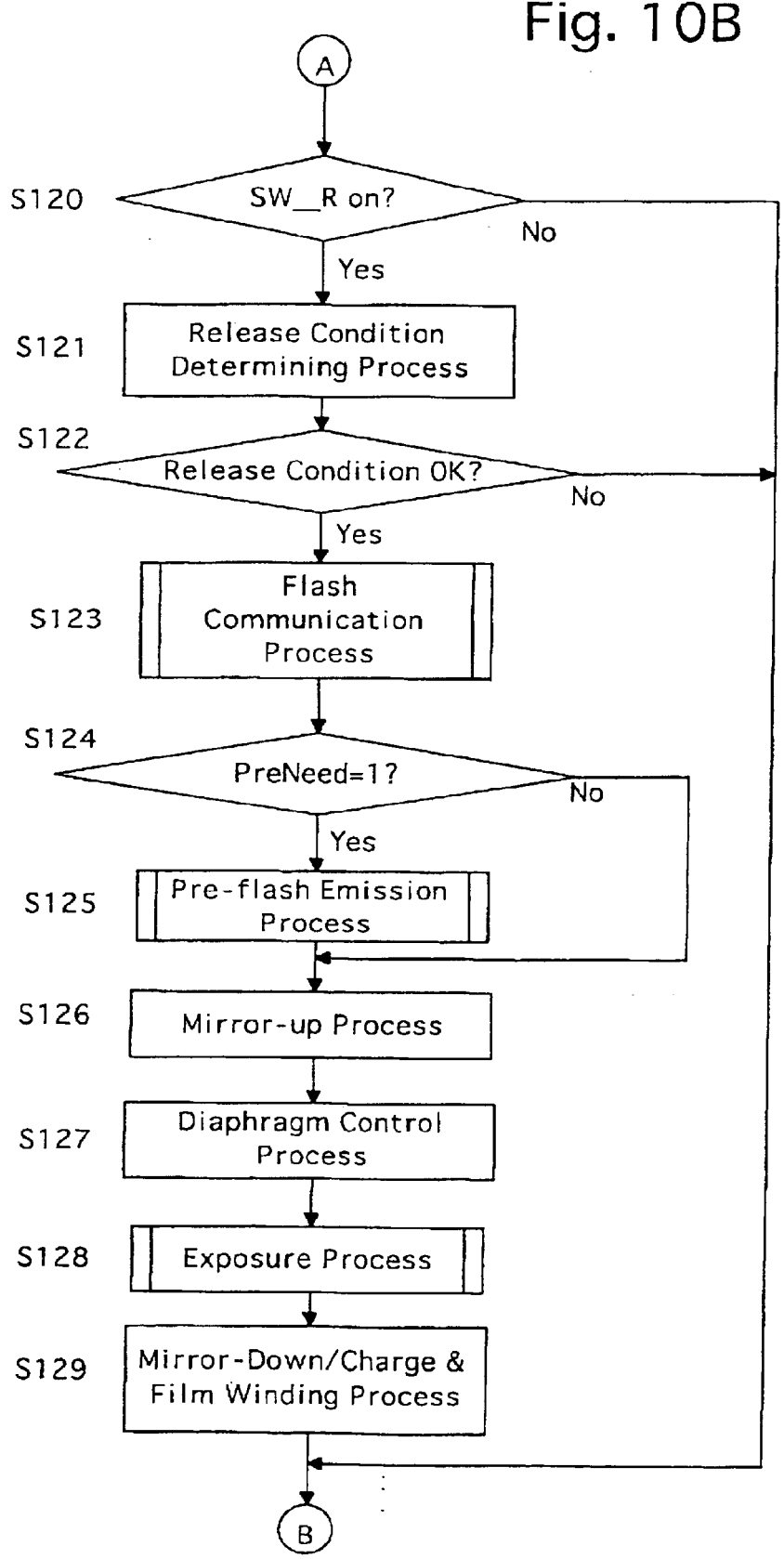

FIGS. 10A and 10B are a flow chart for a camera main process performed by the CPU 13 of the camera body 10. Immediately after the battery 1 is loaded in the camera body 10, control enters the camera main process after the CPU 13 is initialized. In the camera main process, firstly each port of the CPU 13 is initialized (step S100), and the CPU 13 has communication with the EEPROM 6 to read out initial data therefrom (step S101). Subsequently, it is determined whether the main switch SWM is ON (step S102).

If the main switch SWM is not ON (if NO at step S102) a main switch OFF process is performed (step S106) and subsequently the display indicated on the information display panel 5 is turned OFF (step S107). The main switch OFF process is performed to stop the voltage step-up process of the regulator 2, and to stop the charging operation for charging the built-in flash if it is in the process of charging. Subsequently, an interrupt of the main switch SWM is enabled (step S108), and the CPU 13 enters a sleep mode (step S109). In the sleep mode at step S109, since an interrupt of the main switch SWM is enabled, an interrupt occurs and control returns to the operation at step S100 if the main switch SWM is turned ON again.

If it is determined at step S102 that the main switch is ON (if YES at step S102), various modes and functions are set in accordance with the. state of each switch of the group of information setting switches 9 (step S103). Subsequently, the information on the set modes and functions and also various photographic information such as the aforementioned photometering-range checking information are indicated on the information display panel 5 (step S104). Subsequently, a built-in flash charging process is performed (step S105). In the built-in flash charging process, it is determined whether the camera body 10 is in a predetermined condition (e.g., a condition that the main switch SWM was just turned ON, the built-in flash just discharged, or the retractable built-in flash was just popped up from the retracted position). if the predetermined condition is satisfied, a capacitor (not shown) provided in the built-in flash circuit 14 for supplying power to the xenon flashtube 21 is charged.

Subsequently, it is determined whether the photometering switch SWS or the release switch SWR is ON (step S110). If neither the photometering switch SWS nor the release switch SWR is ON (if NO at step S110), a main switch ON process is performed (step S116). In the main switch ON process, predetermined processes which includes a process of stopping the voltage step-up operation of the regulator 2 are performed if the built-in flash is not in the process of charging. Subsequently, a timer A set for 125 ms is started (step S117), an interrupt of the timer A is enabled (step S118), and the CPU 13 enters the sleep mode (step S119). In the sleep mode at step S119, since an interrupt of the timer A is enabled, an interrupt occurs upon the timer A lapsing, and control returns to the operation at step S102. Therefore, in a state where the main switch SWM is ON, and at the same time, both the photometering switch SWS and the release switch SWR are OFF, the operations at steps S102 through S110 and steps S116 through 119 are performed every 125 ms.

If either the photometering switch SWS or the release switch SWR is ON (if YES at step S110), the output port P13 is changed to "0" to thereby start the voltage step-up operation of the regulator 2 (step S111). With this operation, the output voltage Vdd of the regulator 2 is maintained at a constant voltage even if the voltage across the battery 1 drops. Subsequently, a camera-lens communication process is performed (step S112). In the camera-lens communication process, the CPU 13 communicates with the photographing lens (not shown) mounted on the camera body 10 via the camera-lens communication interface 7 to read information (lens information) of the photographing lens. The lens information read at step S112 includes information on an f-number AVmin at full aperture, photometering correction information Avc, focal length information f, and a distance value (distance information) Dv. After the camera-lens communication process at step S112, a flash communication process ("Flash Communication Process" shown in FIG. 11) in which the CPU 13 communicates with the external flash device via the terminal connectors 4 and 56 is performed (step S113) In the flash communication process, CF (camera-to-flash) information is output to the external flash device while FC (flash-to-camera) information (shown in Tables 1 and 2) is input from the external flash device.

Subsequently, an AF process in which the CPU 13 inputs a video signal from the phase detection type AF circuit 16 to calculate the amount of defocus is performed (step S114) In the AF process, an AF motor (not shown) is driven by an amount corresponding to the calculated amount of defocus to move a focusing lens group (not shown) of the interchangeable lens to an axial position where an in-focus state is obtained. After the AF process is performed, an AE process is performed (step S115). In the AE process, the CPU 13 inputs a photometric signal corresponding to the output of the TTL nine-segment photometering sensor 22 from the TTL photometering circuit 19 to determine an optimum shutter speed and an optimum aperture value in accordance with the input photometric signal, the current exposure mode, lens information and flash information. In the AE process it is determined whether the flash device 50 needs to discharge at a shutter release.

After the AE process is performed, it is determined whether the release switch SWR is ON (step S120). Control returns to step S102 if the release switch SWR is not ON (if NO at step S120). If the release switch SWR is ON (if YES at step S120), a release condition determining process in which it is determined whether a predetermined release condition is satisfied is performed (step S121). The predetermined release condition can be, e.g., a condition wherein the object is in focus if an in-focus priority mode has been set as an AF exposure mode. Alternatively, the predetermined release condition can be a condition wherein the built-in flash has been fully charged if a release prohibition mode, in which a shutter release is prohibited if the object brightness is low and the built-in flash has not been fully charged, has been selected as a photographic mode.

If the aforementioned release condition is not satisfied (if NO at step S122), control returns to step S102. If the aforementioned release condition is satisfied (if YES at step S122), the flash communication process ("Flash Communication Process" shown in FIG. 11) is again performed as a final flash communication process before a shutter release (step S123). Subsequently, it is determined whether a pre-flash emission is necessary, i.e., whether a PreNeed flag is 1. If the PreNeed flag is 1 (if YES at step S124), a pre-flash emission process ("Pre-Flash Emission Process" shown in FIGS. 12 and 13) is performed (step S125). If the PreNeed flag is 0 (if NO at step S124) control skips the pre-flash emission process, thus proceeding straight from step S124 to step S126.

At step S126 a mirror-up process in which a mirror motor (not shown) is actuated via the motor control circuit 15 to move up a quick-return mirror (not shown) is performed. Subsequently, an iris diaphragm (not shown) of the interchangeable lens is stopped down (step S127) via the iris-diaphragm control circuit 17 by an amount corresponding to the aperture value determined in the AE process. Subsequently, an exposure process (exposure operation) is performed (step S128) ("Exposure Process" shown in FIGS. 17 and 18). In the exposure process, the focal plane shutter is released via the shutter control circuit 18 in accordance with the shutter speed determined in the AE process. Subsequently, upon the completion of the operation of the focal plane shutter, a mirror-down/charge process and a film winding process are performed (step S129). In the mirror-down/charge process, the mirror motor is driven to return the quick-return mirror back to the initial position. In the film winding process, a film motor is driven to wind a film by one frame. Subsequently, control returns to step S102.

Flash Communication Process

Figure 11:
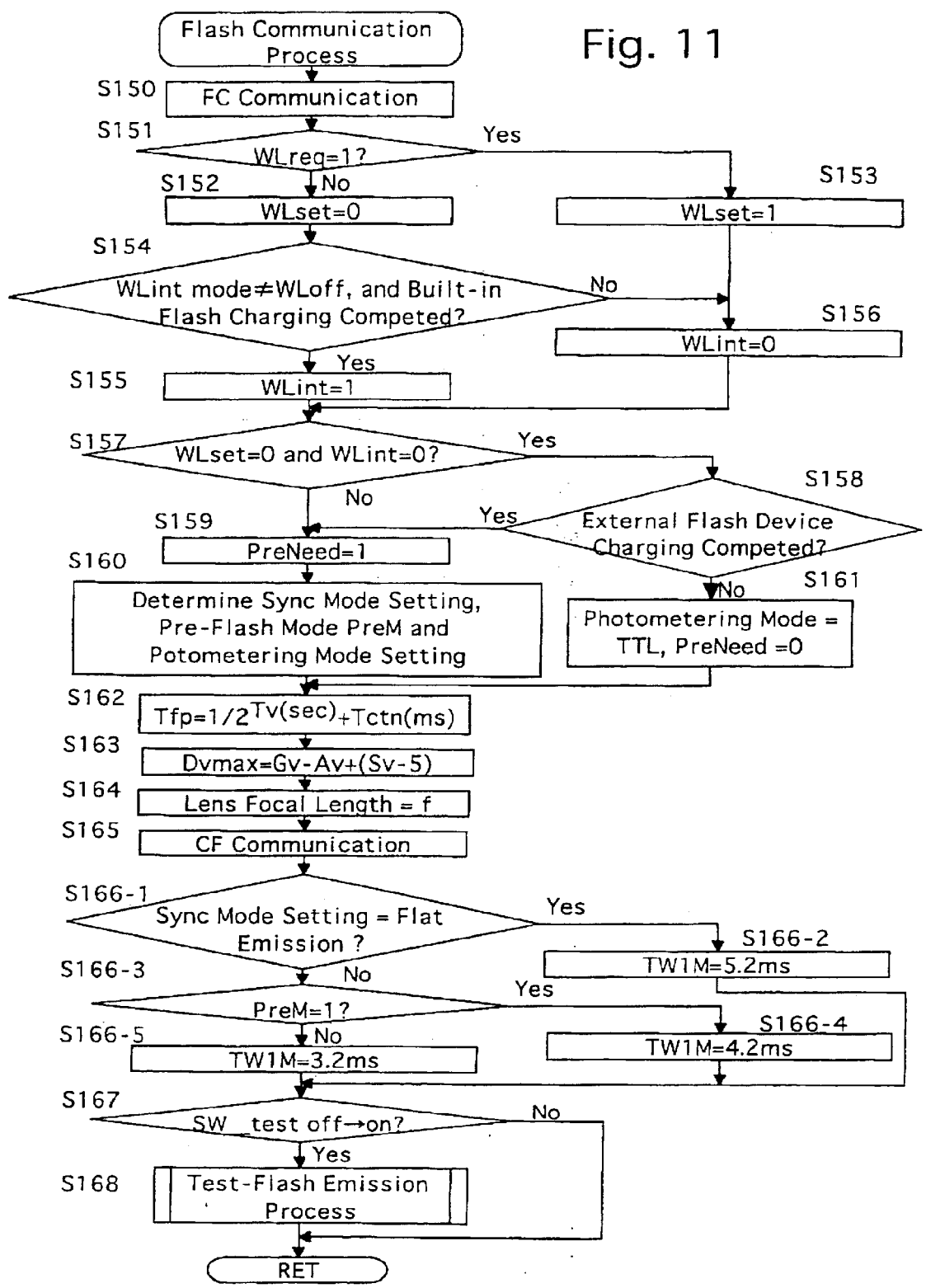
FIG. 11 is a flow chart for a flash communication process performed by the CPU of the camera body.

The flash communication process performed at steps S113 and S123 will be hereinafter discussed in detail with reference to FIG. 11. In this process, firstly the CPU 13 performs an FC communication in which the CPU 13 has communication with the flash CPU 65 of the external flash device to input FC information (shown in Tables 1 and 2) from the external flash device (step S150). Initial data of the FC communication includes a specified code. If the CPU 13 cannot receive the specified code properly, the CPU 13 determines that an external flash device is not coupled to the camera body 10. In this case, the CPU 13 does not perform any communication operation in any one of the following communications: a CF communication, a mode-4 communication and a mode-3 communication.

After the FC communication is performed, it is determined whether a WLreq flag is 1 (step S151). The WLreq flag is set to 1 if the main switch 64 is in the WL (wireless) position and if the wireless mode setting switch 63c is in the position of either the wireless controller mode or the wireless master mode. If the WLreq flag is 1 (if YES at step S151), a WLset flag is set to 1 (step S153). The WLset flag is set to 1 when the slave flash device is controlled by wireless via the external flash device. Subsequently, a WLint flag is set to 0 (step S156), and control proceeds to step S157. The WLint flag is set to 1 when the slave flash device is controlled by wireless via the built-in flash of the camera body 10. In the present embodiment, since the WLint flag is always set to 0 at step S156 if the WLset flag is set to 1 at step S153, the WLint flag and the WLset flag never become 1 at the same time. The wireless control using the built-in flash as a wireless remote controller is effective only when a wireless control using the external flash device as a wireless remote controller is not performed.

If the WLreq flag is not 1, namely, if no external flash device 50 is connected to the camera body 10 or if the main switch 64 of the external flash device 50 connected to the camera body 10 is not in the WL position (if NO at step S151), the WLset flag is set to 0 (step S152) Subsequently, it is determined whether the WLoff mode, in which the flash operation of the slave flash device is disabled, is currently set and whether the built-in flash has been fully charged (step S154). If the WLoff mode has not been set and if the built-in flash has been fully charged (if YES at step S154), the WLint flag is set to 1 (step S155). On the other hand, if the WLoff mode has been set or if the built-in flash has not been fully charged (if NO at step S154), the WLint flag is set to 0 (step S156), and control proceeds to step S157.

It is determined at step S157 whether each of the WLset flag and the WLint flag is 0. If no slave flash device is controlled by wireless via either the built-in flash or external flash device (if YES at step S157), it is determined via a charge completion signal included in the FC information input at step S150 whether the external flash device has been fully charged (step S158). If the external flash device has not been fully charged, the TTL photometering mode. is selected as a photometering mode setting, while the PreNeed flag is set to 0 (step S161), and control proceeds to step S162. If either the WLset flag or the WLint flag is not 0 (if NO at step S157), control proceeds to step S159. If the external flash device has been fully charged (if YES at step S158), control proceeds to step S159.

At step S159 the PreNeed flag is set to 1. Subsequently, the sync mode setting, a pre-flash emission mode PreM and the photometering mode setting are determined with reference to Tables 4-1, 4-2 and 4-3 in accordance with the sync mode request, the charge completion signal and whether or not the slave flash device is controlled by wireless (step S160). The details of this process at step 160 will be discussed later. The pre-flash emission mode PreM includes a first pre-flash emission mode in which all the flash devices except the built-in flash are activated to emit a pre-flash at the same time, and a second pre-flash emission mode in which all the flash devices except the built-in flash are activated to emit a pre-flash in a predetermined order. The pre-flash emission mode PreM is set to 0 if the first pre-flash emission mode is set, or 1 if a second pre-flash emission mode is set.

After the process at step S160, a uniform flash-emission duration Tfp (ms) is set (step S162). The uniform flash-emission duration Tfp (ms) is calculated at step S162 using the following equation:

$$Tfp = \frac{1}{2}^{Tv} + Tctn$$

wherein Tctn represents the duration of a movement of the leading curtain of the focal plane shutter; and APEX value Tv represents the time value (shutter speed).

Subsequently, a maximum flash photometering distance Dvmax is set (at step S163). The maximum flash photometering distance Dvmax is determined from the following equation:

$$Dvmax = Gv - Av + (Sv - 5)$$

wherein Dvmax represents the distance value according to the APEX system; Gv represents the guide number value according to the APEX system; Av represents the aperture value according to the APEX system; and Sv represents the film speed value according to the APEX system.

Subsequently, the focal length information f included in the lens information read at step S112 is set (step S164). Thereafter, the CF communication, in which the CF information determined in the above described processes is transmitted to the external flash device, is performed (step S165).

After the CF communication is performed, a wireless signal interval TW1M is set so as to correspond to the currently-set flash mode setting, and is stored in the RAM 13a via operations at steps S166-1 through S166-5. The wireless signal interval TW1M, which is stored in the RAM13a, represents the time interval at which the built-in flash or the external flash device is activated to emit two successive low flash emissions serving as a wireless signal (a pre-flash emission command wireless signal) which is transmitted to the slave flash device. The slave flash device reads the command provided by the wireless signal in accordance with the wireless signal interval TW1M.

After the CF communication is performed, firstly, it is determined at step S166-1 whether the sync mode setting designates the flat emission mode (the uniform flash-emission mode). If the sync mode setting designates the flat emissionmode (if YES at step S166-1), the wireless signal interval TWLM is set to 5.2 ms (step S166-2), and control proceeds to step S167. If the sync mode setting does not designate the flat emission mode (if NO at step S166-1), it is determined whether the pre-flash emission mode PreM is 1 (step S166-3). If the pre-flash emission mode PreM is 1 (if YES at step S166-3), the wireless signal interval TW1M is set to 4.2 ms (step S166-4), and control proceed to step S167. If the pre-flash emission mode PreM is not 1 (if NO at step S166-3), the wireless signal interval TW1M is set to 3.2 ms (step S166-5).

It is determined at step S167 whether the test-flash setting switch of the group of information setting switches 9 has been switched from OFF to ON (step S167). If the test-flash setting switch has been switched from OFF to ON (if YES at step S167), a test-flash emission process ("Test-Flash Emission Process" shown in FIG. 19) is performed (step S168), and control returns to the camera main process. If the test-flash setting switch has not been switched from OFF to ON (if NO at step S167), control skips the operation at step S168 and returns to the camera main process.

Table 1 below shows an embodiment of the FC information which is transmitted from the external flash device to the camera body 10.

TABLE 1

| No. | FC INFORMATION | CONTENT |
|---|---|---|
| 1 | Charge Completion Signal | Charge |
| 2 | Photometering Mode Request | TTL, Auto, Manual |

TABLE 1-continued

| No. | FC INFORMATION | CONTENT |
|---|---|---|
| 3 | Sync Mode Request | Leading Curtain, Successive Sync Flash, Flat Emission |
| 4 | Wireless Mode Request | WLreq |
| 5 | Gno | Gv |
| 6 | Photometering Range Check | Correct, Far, Near |
| 7 | Bounce | Bounce |

In Table 1, data corresponding to a photometering mode (a TTL photometering mode, the auto flash photometering mode or a manual photometering mode) having been set on the external flash device is set as a photometering mode request. Wireless mode request is represented by the WLreq flag. The guide number value (APEX value) Gv which represents a guide number Gno corresponding to the illumination angle of the external flash device is set as Gno information. "Correct", "Near" or "Far" is set as the photometering-range checking information in accordance with a time from the moment the external flash device inputs a flash start command from the camera body 10 to the moment the external flash device inputs a flash stop command from the camera body 10 when the external flash device discharges. A Bounce flag which represents bounce information is set at 1 when a head of the external flash device is tilted or swiveled upward to give a bounce flash to the object.

Table 2 below shows an embodiment of data of the sync mode request and the charge completion signal.

TABLE 2

| Bit No. | 3 | 2 | 1 | 0 |
|---|---|---|---|---|
| Charge Completion Signal | WL (Wireless) | Flat Emission | Successive Sync Flash | Leading Curtain |
| Sync Mode Request | | Flat Emission | Successive Sync Flash | Leading Curtain |

Three-bit data defines the sync mode request. One of the three bit positions of the three-bit data, which corresponds to the sync mode request set on the external flash device, is set to 1. On the other hand, four-bit data defines the charge completion signal. One of the four bit positions of the four-bit data which corresponds to the sync mode request is set to 0 if the flash charging has been completed. The charge completion signal of "1" takes precedence over the charge completion signal of "0". For instance, in the case where more than one external flash device with the same sync mode request is connected to the camera body 10, the aforementioned one of the four bit positions of charge completion signal, which corresponds to the sync mode request, is set to 0 only when all the external flash devices connected to the camera body 10 have been fully charged. Bit 3 of the charge completion signal is provided for wireless control using the external flash device, and is set to 0 when the external flash device has been charged to a certain level which makes it possible to control the slave flash device by wireless.

When the wireless mode setting switch 63c is in the position to select the wireless controller mode, only the bit position of the charge completion signal which corresponds to the wireless control is set to 0. However, when the wireless mode setting switch 63c is in the position to select the wireless master mode, each of the two bit positions of the charge completion signal which respectively correspond to the wireless control and the sync mode request is set to 0.

Table 3 below shows an embodiment of the CF information which is transmitted from the camera body 10 to the external flash device.

TABLE 3

| No. | CF INFORMATION | CONTENT |
|---|---|---|
| 10 | Photometering Mode Setting | TTL, Manual, Light-Magnification, NA |
| 11 | Sync Mode Setting | Leading Curtain, Successive, Flat Emission, NA |
| 12 | Wireless Mode Setting | WLset |
| 13 | Flash Mode Setting | Pre-Flash, Flat Emission, Test, Light-Magnification, NA |
| 14 | Pre-Flash Emission Mode | PreM |
| 15 | Pre-Flash Emission Intensity | PreP |
| 16 | Pre-Flash Emission Duration | PreT |
| 17 | Duration of Uniform Flash Emission | Tfp |
| 18 | Flash Emission Magnification | Mv1, Mv2 |
| 19 | Maximum Flash Photometering Distance | Dvmax |
| 20 | Lens Focal Length | 20, 24, 28, 35, 50, 70, 85 |

The photometering mode setting has precedence over the photometering mode request, which is transmitted from the external flash device. Namely, even if the manual photometering mode has been set via the photometering mode request setting switch 63a on the camera body 10, the flash CPU 65 sets the TTL photometering mode if the photometering mode setting designates the TTL photometering mode. However, the flash CPU 65 sets a photometering mode corresponding to the photometering mode request if the photometering mode setting designates an NA mode. The sync mode setting has precedence over the sync mode request issued by the external flash device because the camera body 10 (the CPU 13) determines an appropriate mode to communicate with more than one external flash device if more than one external flash device is connected to the camera body 10. Likewise, the wireless mode setting has precedence over the wireless mode request issued by the external flash device.

The operation at step S160 for determining the sync mode setting, the pre-flash emission mode PreM and the photometering mode setting will be hereinafter discussed in detail. Each of the sync mode setting, the pre-flash emission mode PreM and the photometering mode setting is determined with reference to Tables 4-1, 4-2 and 4-3 in accordance with the sync mode request, the charge completion signal, and the presence or absence of the wireless control for the slave flash device.

Items of the sync mode request in each of Tables 4-1, 4-2 and 4-3 will be hereinafter discussed. In the case of "Presence" in the item "Flash Charge Completion", a symbol "○" represents the presence of the charge completion signal, a symbol "X" represents the absence of the charge completion signal, and "□" represents the condition regardless of the presence or absence of the charge completion signal.

Each of the sync mode request and the charge completion signal is information which is transmitted from the external flash device to the camera body 10. On the other hand, each of the sync mode setting, the pre-flash emission mode PreM and the photometering mode-setting is information which is transmitted from the camera body 10 to the external flash device.

TABLE 4-1

| SYNC MODE REQUEST | | | Charge | NO WIRELESS CONTROL | | | |
|---|---|---|---|---|---|---|---|
| Leading Curtain *1 | Successive | Flat Emission | Completion Signal | Sync Mode Setting | PreM | Photometering Mode Setting | |
| ○ | X | ■ | 1 | Leading Curtain | 0 | TTL | |
| ○ | ○ | ■ | | Successive | 1 | TTL | |
| X | ○ | ■ | | Leading Curtain | 0 | TTL | |
| X | X | ○ | | Flat Emission or Leading Curtain | 0 | Light-Magnification or TTL | |
| ○ and/or ○ and/or ○ | | | 0 | | 0 | NA | |

Tables 4-1 shows the case where the wireless control for the slave flash device is not performed. Accordingly, the case where no wireless control for controlling the slave flash device is performed will be hereinafter discussed.

"Sync Mode Setting" is generally set to designate "Leading Curtain" (the leading curtain sync flash mode). "Sync Mode Setting" is set to designate "Successive" (the successive sync flash mode) on condition that no wireless control for controlling the slave flash device is performed, that the flash device 50 with "Sync Mode Request" requesting "Leading Curtain" and another flash device 50 with "Sync Mode Request" requesting "Successive" are connected to the camera body 10, and that these flash devices 50 have been fully charged. However, if "Sync Mode Request" is set to request "Flat Emission" (the flat emission mode), "Sync Mode Setting" is set to designate "Flat Emission" when the shutter speed of the camera body 10 is equal to or faster than the flash synchronization speed, or "Sync Mode Setting" is set to designate "Leading Curtain" when the shutter speed of the camera body 10 is slower than the flash synchronization speed.

"Photometering mode setting" is generally set to designate "TTL" (TTL photometering mode) This is because the TTL photometering mode has characteristics superior to the object at a long distance, the object at a short distance and the object having a high brightness, as compared with "Light-Magnification" (a light-magnification photometering mode). However, if "Sync Mode Request" requests "Flat Emission", "Photometering mode setting" is set to designate "Light-Magnification" when the shutter speed of the camera body 10 is equal to or faster than the flash synchronization speed, or "Photometering mode setting" is set to designate "TTL" when that the shutter speed of the camera body 10 is slower than the flash synchronization speed.

The pre-flash emission mode PreM is determined in accordance with the sync mode setting. Namely, the pre-flash emission mode PreM is set at 1 only when "Sync Mode Setting" designates "Successive". The pre-flash emission mode PreM is 1 when the aforementioned second pre-flash emission mode has been selected, wherein the flash device 50 in which "Sync Mode Request" requests "Leading Curtain" is activated to emit a pre-flash a first time, and subsequently the flash device 50 in which "Sync Mode Request" requests "Successive" is activated to emit a pre-flash a second time. The pre-flash emission mode PreM is 0 when the aforementioned first pre-flash emission mode, in which all the flash devices except the built-in flash are driven to emit a pre-flash at the same time, has been selected.

Since no flash is discharged in the case of the "Flash Charge Completion Signal" being "0", each of the "Sync Mode Setting" and "Photometering mode setting" is set to "NA", while the pre-flash emission mode PreM is set to 0. It should be noted that a similar control is also performed for the built-in flash in the item bearing a symbol "*1".

TABLE 4-2

| BUILT-IN FLASH | SYNC MODE REQUEST | | | Charge Completion Signal | WIRELESS CONTROL | | |
|---|---|---|---|---|---|---|---|
| | Leading Curtain | Successive | Flat Emission | | Sync Mode Setting | PreM | Photo-metering Mode Setting |
| ○ | ■ | ■ | ■ | 1 | Leading Curtain | 0 | TTL |
| X | ○ and/or ○ | | ■ | | Leading Curtain | 1 | Light-Magnification |
| X | X | X | ○ | | Flat Emission or Leading Curtain | 1 | Light-Magnification |
| ■ | ○ and/or ○ | | ■ | 0 | Leading Curtain | 1 | NA |
| ■ | X | X | ○ | | Flat Emission or Leading Curtain | 1 | NA |

TABLE 4-3

| WLint Mode | SYNC MODE REQUEST | | | Charge Completion Signal | WIRELESS CONTROL | | |
|---|---|---|---|---|---|---|---|
| | Leading Curtain | Successive | Flat Emission | | Sync Mode Setting | PreM | Photo-metering Mode Setting |
| WLC | ■ | ■ | ■ | 1 | Leading Curtain | 1 | Light-Magnification |
| WLFP | ■ | ■ | ■ | | Flat Emission or Leading Curtain | 1 | Light-Magnification |
| WLM | ■ | ■ | ■ | | Leading Curtain | 0 | TTL |

Table 4-2 shows the case where the wireless control for controlling the slave flash device is performed with the use of the external flash device. Tables 4-3 shows the case where the wireless control for controlling the slave flash device is performed with the use of the built-in flash in each of the above described three modes of the WLint mode: the WLC mode, the WLFP mode and the WLM mode. In these cases, "Sync Mode Setting" is generally set to designate "Leading Curtain", similar to the case shown in Table 4-1. However, similar to the case shown in Table 4-1, if "Sync Mode Request" requests "Flat Emission", "Sync Mode Setting" is set to designate "Flat Emission" when the shutter speed of the camera body 10 is equal to or faster than the flash synchronization speed, or "Sync Mode Setting" is set to designate "Leading Curtain" when the shutter speed of the camera body 10 is slower than the flash synchronization speed.

"Photometering mode setting" is generally set to designate "Light-Magnification". However, if the wireless control is performed in the WLM mode, in which the built-in flash discharges at a shutter release, "Photometering mode setting" is set to designate "TTL" since it is hard for the built-in flash to provide a pre-flash emission. The photometering mode setting is effective against the external flash device connected to the camera body 10. In other words, all the slave flash devices are controlled solely with "Light-Magnification".

The pre-flash emission mode PreM is determined regardless of the sync mode setting in accordance with whether the built-in flash is to discharge for an exposure. Namely, the pre-flash emission mode PreM is set to 0 if the wireless control is performed in the WLM mode, or 1 if the wireless control is performed in any other mode (i.e., the WLC mode or the WLFP mode) than the WLM mode.

The pre-flash emission process performed at step S125 will be hereinafter discussed in detail with reference to the flow chart shown in FIGS. 12 and 13. The pre-flash emission process is performed to make the flash device 50 discharge before the main flash emission in order to determine the light amount of the main flash emission. In the pre-flash emission process, firstly, it is determined whether the WLset flag or the WLint flag is 1 (step S200). If either the WLset flag or the WLint flag is 1 (if YES at step S200), this indicates that the wireless control needs to be performed, so that a pre-flash intensity PreP is set to 1, and at the same time, a pre-flash duration PreT is set to 1 (step S203). Subsequently, control proceeds to step S204.

If neither the WLset flag nor the WLint flag is 1 (if NO at step S200), it is determined whether the distance value Dv included the lens information read at step S112 exceeds 3 (=2.8 meters), or whether a brightness value Bv determined under available light in the AE process at step S115 exceeds 6 (step S201-1). Each of the distance value Dv and the brightness value Bv is an APEX value.

If the distance value Dv exceeds 3 or the brightness value Bv exceeds 6 (if YES at step S201-1), the pre-flash intensity PreP is set to 1 (step S201-2). This is because the brightness of the reflected light of a distant object reaching the camera body 10 is generally low and further because there is a high possibility of the pre-flash emission being interrupted by available light if the object brightness is high.

On the other hand, if the distance value Dv does not exceed 3 while the brightness value Bv does not exceed 6 (if NO at step S201-1), the pre-flash intensity PreP is set to ½ (step S201-3). This is for the purpose of reducing the power consumption of the external flash device by reducing the intensity of the pre-flash because the brightness of the reflected light of a short-distant object reaching the camera body 10 is generally high, and further, because there is little possibility of the pre-flash emission being interrupted by available light even if the object brightness is low.

Subsequently, it is determined whether the sum of the distance value Dv and the f-number AVmin at full aperture is smaller than 8 (step S202-1). If the sum is smaller than 8 (if YES at step S202-1), the pre-flash duration PreT is set to 1 (step S202-2). If the sum is equal to or greater than 8 (if NO at step S202-1), the pre-flash duration PreT is set to 2 (step S202-3).

The amount of the received pre-flash is inverse proportional to the distance value Dv and the f-number AVmin at full aperture. Therefore, a substantial delay in response of the light reception occurs since as the distance value Dv or the f-number Avmin become larger, the amount of the received pre-flash light becomes smaller. Therefore, if the sum of the distance value Dv and the f-number AVmin at full aperture is not smaller than 8, the pre-flash duration PreT is set double so that the pre-flash can be photometered properly even if such a delay in response of the light reception occurs.

Subsequently, the flash mode setting is set to designate the pre-flash emission mode (step S204), and is transmitted as CF information from the camera body 10 to the external flash device via the CF communication (step S205). After the CF communication is performed, it is determined whether the WLint flag is 1 (step S206). If the WLint flag is not 1 (if NO at step S206), the mode-4 communication is performed to transmit a pulse signal having four successive pulses to the external flash device (step S207). The external flash device emits a pre-flash upon receipt of the pulse signal having four successive pulses. However, if the WLset flag is 1, the external flash device emits two successive low flash emissions serving as the aforementioned wireless signal (pre-flash emission command wireless signal) which is transmitted to the slave flash device, and thereafter the external flash device emits a pre-flash at substantially the same time as a pre-flash emitted by the slave flash device.

Figure 6:
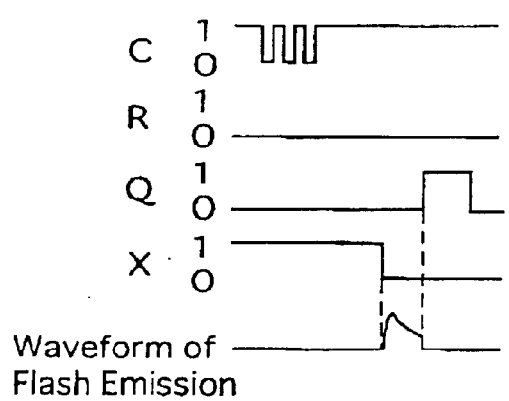
FIG. 6A is a communication sequence chart for signals transmitted to an external flash device by wire and for a flash emission when a sync mode setting designates the leading curtain sync flash mode and when a mode-3 communication is carried out.
FIG. 6B is a communication sequence chart for signals transmitted to an external flash device by wire and for first and second flash emissions when the sync mode setting designates the successive sync flash mode and when a mode-3 communication is carried out.
FIG. 6C is a communication sequence chart for a pulse signal transmitted to an external flash device by wire and for a uniform flash-emission at a time of the main flash exposure when the sync mode setting designates the uniform flash-emission mode and when a mode-4 communication is carried out.
FIG. 6D is a communication sequence chart for a pulse signal transmitted to an external flash device by wire and for first and second pre-flash emissions when the flash mode setting designates the pre-flash emission mode and when a mode-4 communication is carried out.
FIG. 6E is a communication sequence chart for a pulse signal having four successive pulses which is output from the camera body to an external flash device, and for a wireless signal (a pre-flash emission command wireless signal, a test-flash emission command wireless signal or a uniform flash-emission command wireless signal) transmitted to the slave flash device when a mode-4 communication is carried out.
FIG. 6F is a communication sequence chart for a pulse signal having four successive pulses which is output from the camera body to an external flash device, and for a light-magnification command wireless signal transmitted to the slave flash device and the light-magnification command wireless signal received by the slave flash device, when the flash mode setting designates the light-magnification flash mode and when the mode-4 communication is carried out.
Figure 6:
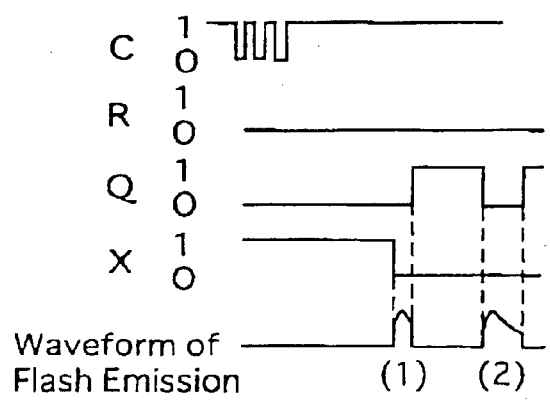
Figure 6:
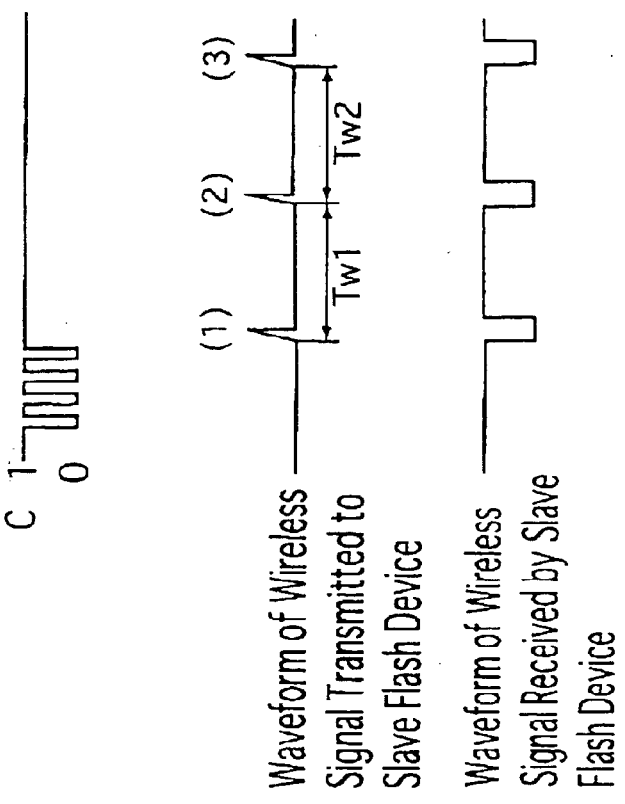
Figure 6:
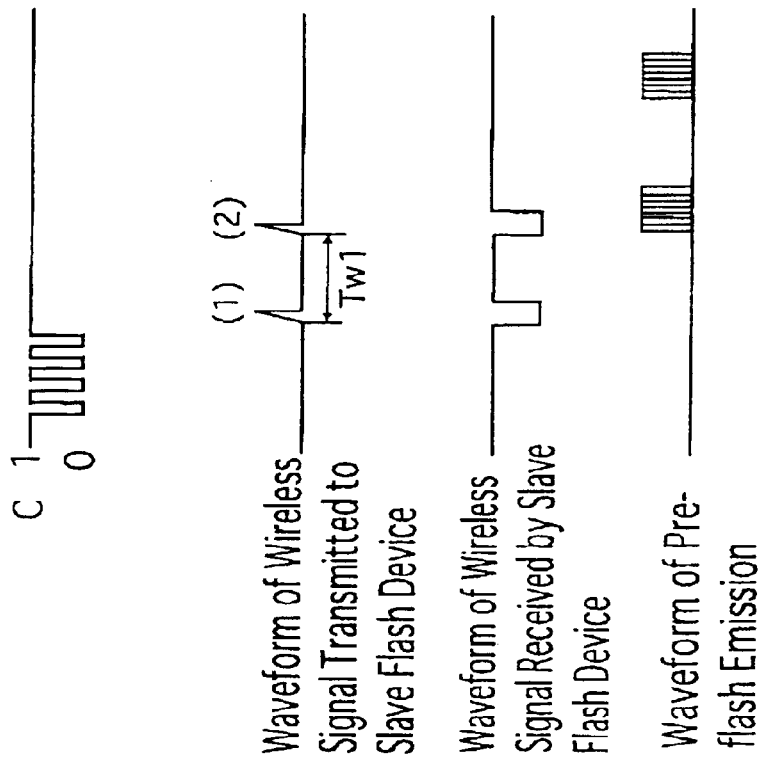

FIG. 6D shows the waveform of two pre-flash emissions. If the pre-flash emission mode PreM is 0 (the first pre-flash emission mode), all the flash devices except the built-in flash are driven to emit a single pre-flash at the same time (see the left pulse (1) in FIG. 6D). If the pre-flash emission mode PreM is 1 (the second pre-flash emission mode), all the flash devices except the built-in flash are driven to emit a pre-flash in a predetermined order so as to emit two pre-flash emissions in total in accordance with the sync mode request set on each flash device. Two pulses (1) and (2) shown in FIG. 6D represent such two pre-flash emissions (first and second pre-flash emissions). In FIG. 6D, a time "Tint" represents the time interval between the two pre-flash emissions, which is set at 2.5 ms in this particular embodiment.

On the other hand, if the WLint flag is 1 (if YES at step S206), a timer B is set for the value of the wireless signal interval TW1M from which the value of the time necessary for the mode-4 communication is subtracted, and the timer B is started (step S208). The wireless signal interval TW1M is a value stored in the RAM 13a in the flash communication process shown in FIG. 11. After the timer B is started, a built-in flash low flash emission process is performed (step S209), and subsequently it is determined whether a timer-B lapsed flag is 1 (step S210). If the timer-B lapsed flag is not 1 (if NO at step S210), control repeats the checking operation at step S210. If the timer-B lapsed flag is 1 (if YES at step S210), control proceeds to step S211. In the built-in flash low flash emission process, the built-in flash is activated to emit a low flash emission for 30 $\mu s$ as a wireless signal which is transmitted to the slave flash device. The timer-B lapsed flag changes from 0 to 1 upon the expiration of the timer B.

If the timer-B lapsed flag is 1 (if YES at step S210) the mode-4 communication is performed to make the external flash device start emitting a pre-flash (step S211), and subsequently the built-in flash low flash emission process is performed again (step S212). Subsequently, control proceeds to step S213-1 shown in FIG. 13.

The built-in flash low flash emission process is performed twice successively, firstly at step S209 and subsequently at step S212, at the wireless signal interval TW1M, which is stored in the RAM 13a. Therefore, by performing the mode-4 communication at step S211 upon the expiration of the timer B, the built-in flash low flash emission process at step S212 and the mode-4 communication at step S211 are completed at substantially the same time, and thereafter each of the external flash device and the slave flash device emits a pre-flash in synchronization with each other.

FIG. 6E shows the waveform of a wireless signal (the pre-flash emission command wireless signal, a test-flash emission command wireless signal or a uniform flash-emission command wireless signal) transmitted to the slave flash device, the waveform of the wireless signal received by the slave flash device, and the waveform of the two pre-flash emissions. A wireless signal interval TW1 shown in FIG. 6E represents the actual interval (measured value) between two successive low flash emissions (wireless signal) received by the light-receiving element 57, which corresponds to the value of the wireless signal interval TW1M stored in the RAM 13a.

In the present embodiment of the flash photography system, the wireless signal interval TW1M varies so as to correspond to the command provided by the wireless signal emitted by the built-in flash of the camera body 10 or the external flash device. The slave flash device reads the command by reading the wireless signal interval TW1 of the two successive low flash emissions emitted by built-in flash of the camera body 10 or the external flash device.

When the wireless signal interval TW1 is 3.2 ms, the pre-flash emission mode PreM is set at 0, and therefore the slave flash device is activated to emit a pre-flash in the first pre-flash emission mode. In this case, all the flash devices except the built-in flash are activated to emit a single pre-flash at the same time. When the wireless signal interval TW1 is 4.2 ms, the pre-flash emission mode PreM is set at 1, and therefore the slave flash device is activated to emit a pre-flash in the second pre-flash emission mode. In this case, the slave flash device with the sync mode request having been set to the leading curtain sync flash mode emits a pre-flash in the first place, and another slave flash device with the sync mode request having been set to the successive sync flash mode emits a pre-flash in the second place.

When the wireless signal interval TW1 is 5.2 ms, the sync mode request is set to the flat emission mode while the pre-flash emission mode PreM is 1, and therefore the slave flash device is activated to emit a pre-flash in the second pre-flash emission mode. When the wireless signal interval TW1 is 6.2 ms, the flash mode setting is set to designate a test flash mode while the pre-flash emission mode PreM is 1, and therefore the slave flash device is activated to emit a test flash emission in the second pre-flash emission mode.

It is determined at step S213-1 whether the WLset flag is 1. If the WLset flag is not 1 (if NO at step S213-1), control skips the operation at step S213-2, thus proceeding straight from step S213-1 to step S214. If the WLset flag is 1 (if YES at step S213-1), control waits a time corresponding to the wireless signal interval TW1M (step S213-2). The waiting operation at step S213-2 is performed for the purpose of waiting for the low flash emission of the external flash device (the transmission of the pre-flash emission command wireless signal by the external flash device) to be completed.

Subsequently, a pre-flash data determination process ("Pre-Flash Data Determination Process" shown in FIG. 14) is performed (step S214). In the pre-flash data determination process, two flashlight-emitting magnifications Mv (Mv1 and Mv2) and two TTL correction values (APEX values) Fc (Fc1 and Fc2) are calculated in accordance with the amount of the light which is received by the TTL nine-segment photometering sensor 22 at a time of a pre-flash emission. After the pre-flash data determination process is completed, it is determined whether the sync mode setting designates the successive sync flash mode (step S215).

If the sync mode setting designates the successive sync flash mode (if YES at step S215), two TTL correction values (APEX values) Fc1 and Fc2 and two flashlight-emitting magnifications Mv1 and Mv2 are all reset so that the ratio of the amount of the first pre-flash emission to the amount of the second pre-flash emission becomes ⅓ to ⅔ (step S216). More specifically, at step S216 the value of "Fc1−1.58" and the value of "Fc2−1.58" are respectively stored as the TTL correction values (APEX values) Fc1 and Fc2 in the RAM 13a. At the same time, the value of "Mv1−1.58" and the value of "Mv2−1.58" are respectively stored as the flashlight-emitting magnifications Mv1 and Mv2 in the RAM 13a.

If the sync mode setting does not designate the successive sync flash mode (if NO at step S215), it is determined whether a predetermined built-in flash discharge condition is satisfied (step S215-1). If the predetermined built-in flash discharge condition is satisfied (if YES at step S215-1), the value of "−1.58" and the value of "Mv1−1.58" are respectively stored as the TTL correction value (APEX value) Fc1 and the flashlight-emitting magnification Mv1, so that the ratio of the amount of the main flash emission of the built-in flash to the amount of the main flash emission of the slave flash device becomes ⅓ to ⅔ (step S215-2).

Subsequently, the flash mode setting is set to designate a light-magnification flash mode (step S217), and is transmitted as CF information from the camera body 10 to the external flash device via the CF communication (step S218). After the CF communication is performed, it is determined whether the WLint flag is 1 (step S219). If the WLint flag is 1 (if YES at step S219), the wireless signal interval TW1M and a wireless signal interval TW2M are calculated from the following equations:

$TW1M=2$ ms$+(Mv1+5)\times128/1000$ (ms) and $TW2M=2$ ms$+(Mv2+5)\times128/1000$ (ms)

and are written over the previous wireless signal interval TW1M and the previous wireless signal interval TW2M, respectively, in the RAM 13a (step S220).

Subsequently, it is determined whether the PreM is 0 (step S221-1). If the PreM is 0 (if YES at step S221-1) the built-in flash is activated to emit a low flash emission twice successively at the wireless signal interval TWLM stored in the RAM 13a to emit a light signal as a light-magnification command wireless signal (step S221-2) and subsequently control returns to the camera main process. Upon receipt of the light-magnification command wireless signal, the slave flash device sets the flashlight-emitting magnification Mv at the flashlight-emitting magnification Mv1.

On the other hand, if the PreM is 1 (if NO at step S221-1), the built-in flash is activated to emit a low flash emission three times successively to emit a light signal as a light-magnification command wireless signal in such a manner that the first interval between the first two low flash emissions becomes identical to the wireless signal interval TW1M stored in the RAM 13a and that the latter interval between the latter two low flash emissions become identical to the wireless signal interval TW2M stored in the RAM 13a (step S221-3), and subsequently control returns to the camera main process. The light-magnification command wireless signal includes the data of the flashlight-emitting magnifications Mv1 and Mv2. The slave flash device sets the flashlight-emitting magnification Mv in accordance with the set sync mode request. Namely, the slave flash device with the sync mode request requesting the leading curtain sync flash mode sets the flashlight-emitting magnification Mv at the flashlight-emitting magnification Mv1, while the slave flash device with the sync mode request requesting the successive sync flash mode sets the flashlight-emitting magnification Mv at the flashlight-emitting magnification Mv2.

FIG. 6F shows the waveform of the light-magnification command wireless signal transmitted to the slave flash device, and the waveform of the light-magnification wireless signal received by the slave flash device. Two wireless signal intervals TW1 and TW2 shown in FIG. 6F represent the actual intervals (measured values), which correspond to the values of the two wireless signal intervals TW1M and TW2M stored in the RAM 13a, respectively.

If the WLint flag is not 1 (if NO at step S219), it is determined whether the WLset flag is 1 (step S222). If the WLset flag is not 1 (if NO at step S222), control returns to the camera main process. If the WLset flag is 1 (if YES at step S222), the mode-4 communication is performed to make the external flash device emit a low flash emission to emit a light signal as light-magnification command wireless signal (step S223), and subsequently control returns to the camera main process.

Pre-Flash Data Determination Process

Figure 14:
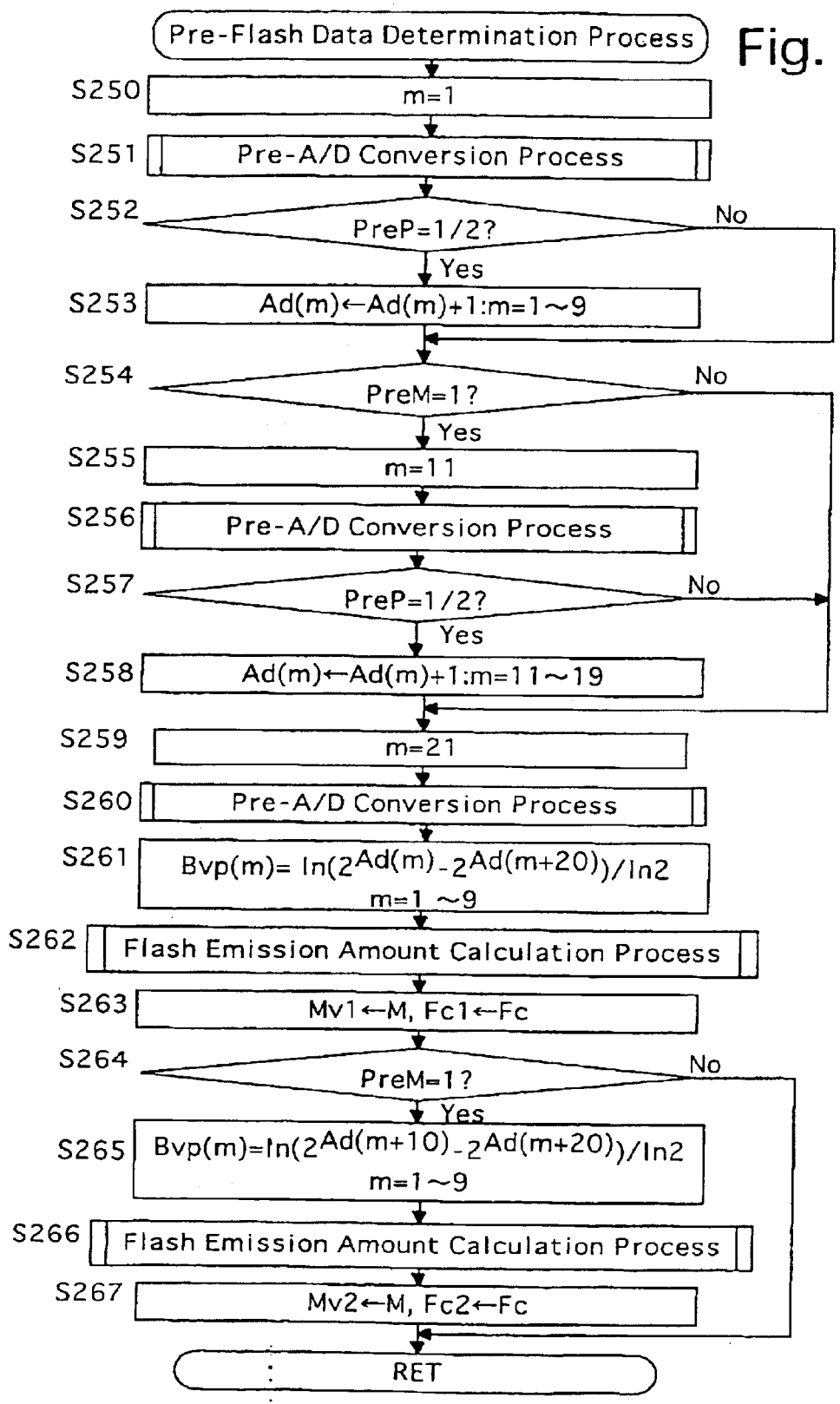
FIG. 14 is a flow chart for a pre-flash data determination process performed by the CPU of the camera body.

The pre-flash data determination process performed at step S214 will be hereinafter discussed in detail with reference to the flow chart shown in FIG. 14. In this process, firstly a variable m is set to 1 (step S250) and subsequently a pre-A/D conversion process ("Pre-A/D Conversion Process" shown in FIG. 15) is performed (step S251). In the pre-A/D conversion process, the output voltage corresponding to the photocurrent of each zone sensor 22_n (n=1~9) of the nine-segment photometering sensor 22 is converted from analogue to digital more than one time successively, and this successive converting operation is repeated a predetermined number of cycles.

After the pre-A/D conversion process is performed, it is determined whether the pre-flash intensity PreP is ½ (step S252). If the pre-flash intensity PreP is ½ (if YES at step S252), the pre-A/D converted data Ad (m) is replaced with the pre-A/D converted data Ad(m) obtained in the pre-A/D conversion process at step S251 to which 1 (one) is added, and is stored in the RAM 13a (step S253), wherein "m" represents the aforementioned variable (m=1~9).

The operation at step S253 is performed for the purpose of compensating for the A/D converted data Ad(m) obtained when the pre-flash intensity PreP is ½, which is smaller than that obtained when pre-flash intensity PreP is 1 by 1 EV. If the pre-flash intensity PreP is not ½ (if NO at step S252), control proceeds straight from step S252 to step S254.

It is determined at step S254 whether the pre-flash intensity PreP is 1. If the pre-flash intensity PreP is not 1 (if NO at step S254), control proceeds to step S259. If the pre-flash intensity PreP is 1 (if YES at step S254), the variable m is set to 11 (step S255), and the pre-A/D conversion process is performed (step S256). The operations at step S255 and S256 are performed to obtain pre-flash data at the second pre-flash emission. Subsequently, it is determined whether the pre-flash intensity PreP is ½ (step S257). If the pre-flash intensity PreP is ½ (if YES at step S257), the pre-A/D converted data Ad (m) is replaced with the pre-A/D converted data Ad(m) to which 1 (one) is added, and is stored in RAM 13a (step S258), wherein "m" represents the aforementioned variable (m=11~19). If the pre-flash intensity PreP is not ½ (if NO at step S257), control proceeds straight from step S257 to step S259.

Subsequently, the variable m is set to 21 (step S259) and the pre-A/D conversion process is performed (step S260). The operations at step S259 and S260 are performed to obtain A/D conversion data in a state with no flash emission, i.e., only with available light. Subsequently, at step S261 a first pre-flash brightness Bvp(m) is calculated and stored in RAM 13a for each of the nine different zone sensors 22_1 through 22_9 of the TTL nine-segment photometering sensor 22 via the following equation:

$Bvp(m)=\ln(2^{Ad(m)}-2^{Ad(m+20)})/\ln 2$ wherein "m" represents the aforementioned variable (m=1~9).

Namely, in the operation at step S261, a photocurrent which is generated solely the first pre-emission is calculated by subtracting a photocurrent generated only by available light from a photocurrent generated by both the first pre-flash emission and available light, and the value of the calculated photocurrent is logarithmic-compressed again to obtain the first pre-flash brightness Bvp(m) due to only the first pre-flash emission.

Subsequently, a flash emission amount calculation process ("Flash Emission Amount Calculation Process" shown in FIG. 16) is performed using the pre-flash brightness Bvp(m) (step S262), and subsequently the calculated flashlight-emitting magnification Mv and the calculated TTL correction value (APEX value) Fc are stored as Mv1 and Fc1 in the RAM 13a (step S263). Subsequently it is determined whether the pre-flash intensity PreP is 1 (step S264). If the pre-flash intensity PreP is not 1 (if NO at step S264), control returns to the camera main process. If the pre-flash intensity PreP is 1 (if YES at step S264), at step S265 a second pre-flash brightness Bvp(m) is calculated and stored in the RAM 13a for each of the nine different zone sensors 22_1 through 22_9 of the TTL nine-segment photometering sensor 22 via the following equation:

$$Bvp(m) = \ln(2^{Ad(m+10)} - 2^{Ad(m+20)})/\ln 2$$

wherein "m" represents the aforementioned variable (m=1~9).

In the operation at step S265, the second pre-flash brightness Bvp(m) (wherein m=1~9) is determined in accordance with the pre-A/D converted data Ad(11)~Ad(19) obtained in the second pre-A/D conversion process. Subsequently, the flash emission amount calculation process is performed using the second pre-flash brightness Bvp(m) obtained at step S265 (step S266). Subsequently, the calculated flashlight-emitting magnifications Mv and the calculated TTL correction value (APEX value) Fc are stored as Mv2 and Fc2 in the RAM 13a (step S267). Subsequently, control returns to the camera main process.

Pre-A/D Conversion Process

Figure 15:
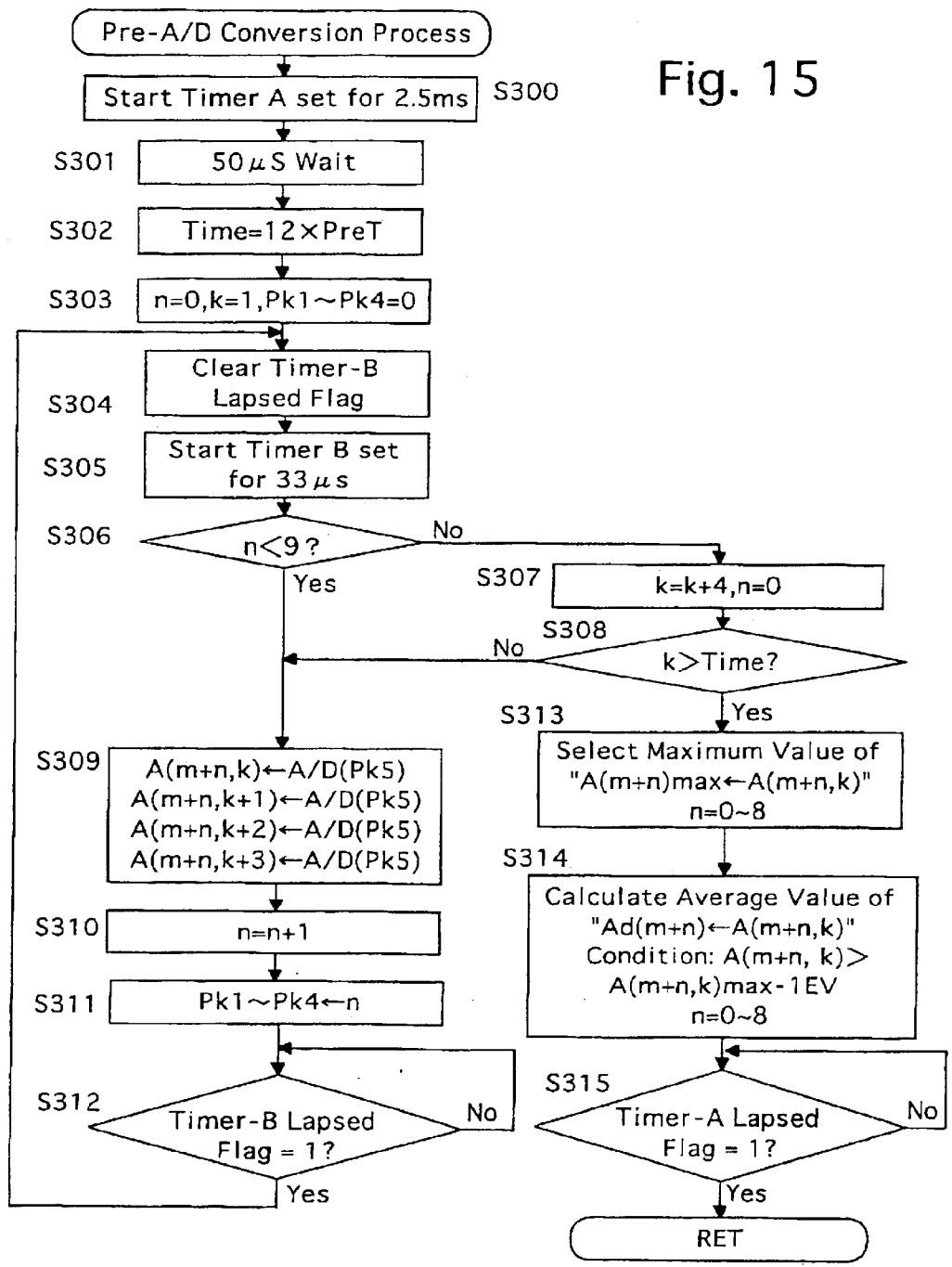
FIG. 15 is a flow chart for a pre-A/D conversion process performed by the CPU of the camera body.

The pre-A/D conversion process performed at steps S251, S256 and S260 will be hereinafter discussed in detail with reference to the flow chart shown in FIG. 15. In this process, firstly, the timer A set for 2.5 ms is started (step S300), and subsequently control waits 50 μs for the pre-emission to be stable (step S301). Subsequently, a number of A/D conversions "Time" is set to the value corresponding to the pre-flash duration PreT multiplied by 12 (step S302). At step S303, a variable n is set to 0, a variable k is set to 1, and each of the first through four ports PK1 through Pk4 of the group of ports Pk is set to "0" to output a signal of "0". The first through four ports PK1 through Pk4 of the group of ports Pk are connected to the selector 102 of the TTL photometering circuit 19. In a state where the output signals of the first through four ports PK1 through Pk4 are all "0", the first zone sensor 22_1 of the nine-segment photometering sensor 22 is selected by the selector 102, and an output voltage corresponding to the photocurrent output from the first zone sensor 22_1 is output to the A/D conversion port Pk5 of the CPU 13 (see FIG. 2).

Subsequently, the timer-B lapsed flag is set to 0 (step S304), the timer B set for 33 μs is started (step S305), and it is determined whether the variable n is less than 9 (step S306). If the variable n is less than 9 (if YES at step S306), the input voltage of the A/D conversion port Pk5 is converted from analogue to digital four times successively, and these four A/D converted values are stored in four addresses A(m+n, k), A(m+n, k+1), A(m+n, k+2) and A(m+n, k+3), respectively (step S309). The variable m at step S309 corresponds to the variable m at step S250, S255 or S259 in the pre-flash data determination process shown in FIG. 14.

After the operation at step S309, the variable n is incremented by one (step S310). Subsequently, a four-bit signal corresponding to the variable n is output to the first through four ports PK1 through Pk4 to select the zone sensor 22_(n+1) of the nine-segment photometering sensor 22 (step S311). Subsequently, it is determined whether the timer-B lapsed flag is 1 (step S.312). Control repeats the operation at step S312 until the timer-B lapsed flag becomes 1. If the timer-B lapsed flag is 1 (if YES at step S312), control returns to the operation at step S304, and thereafter the operations at steps S304, S305, S306, S309, S310, S311 and S312 are repeated until it is determined at step S306 that the variable n is not less than 9. Accordingly, the A/D conversion, which is carried out four times, of the output voltage corresponding to the photocurrent of each of the nine zone sensors 22_1 through 22_9 of the nine-segment photometering sensor 22 is carried out (i.e., is carried out nine times), switching from one zone sensor to a subsequent zone sensor at an interval of 33 μs, to thereby constitute one A/D conversion cycle, wherein the nine sets of four A/D converted values are stored in the RAM 13a.

If it is determined at step S306 that the variable n is not less than 9, four is added to the variable k, while the variable n is set to 0 (step S307). This signifies an end of one A/D conversion cycle. Subsequently, it is determined whether the variable k is equal to or greater than the number of A/D conversions 'Time' set at step S302 (step S308). If the variable k is not equal to or greater than the number of A/D conversions 'Time' (if NO at step S308), control proceeds to step S309 to perform the operations at steps S309 through S312 and step S304 through 308. Namely, another A/D conversion cycle is carried out. If the pre-flash duration PreT is 1, three A/D conversion cycles are carried out. Therefore, twelve A/D converted values (data) of each zone sensor 22_n are obtained. The processing time for this A/D conversion from step S302 through step S314 is approximately 900 μs, and the operations from step S301 through step S314 is completed before the lapse of 50 μs of the pre-flash duration PreT (1 ms). On the other hand, if the pre-flash duration PreT is 2, six of the A/D conversion cycles are carried out. In this case, twenty four A/D converted values (data) of each zone sensor 22_n are obtained.

If the variable k is equal to or greater than the number of A/D conversions 'Time' (if YES at step S308), the maximum value corresponding to the maximum intensity is selected from among the A/D converted values stored in the addresses A(m+n, k) for each variable n (=0~8), and the selected maximum value for each variable n (=0~8) is stored in a corresponding address A(m+n)max (step S313). Subsequently, at step S314, an average value of the A/D converted values among the A/D converted values stored in the addresses A(m+n, k) whose difference from the corresponding maximum value selected and stored in the addresses A(m+n)max at step S313 is within 1 EV is determined for each zone sensor 22_(n+1) (n=0~8), and is stored in the RAM 13a as the pre-A/D converted data Ad (m+n) (n=0~8. The reason why the A/D converted values among the A/D converted values stored in the addresses A(m+n, k) whose difference from the corresponding maximum value selected and stored in the addresses A(m+n)max at step S313 is equal to or smaller than 1 EV are removed is that the amount of the reflected light of the object reaching the camera is small, to thereby cause a substantial delay in response of the light reception if the sum of the distance value Dv and the f-number AVmin at full aperture is greater than a predetermined value, i.e., that precise A/D converted data cannot be obtained due to such a substantial delay.

Subsequently, it is determined whether the timer-A lapsed flag is 1 (step S315). Control repeats the checking operation at step S315 until the timer-A lapsed flag becomes 1. If the timer-A lapsed flag is 1 (if YES at step S315), control returns to the pre-flash data determination process shown in FIG. 14. It takes precisely 2.5 ms for the pre-A/D conversion process described above to be completed.

Figure 31:
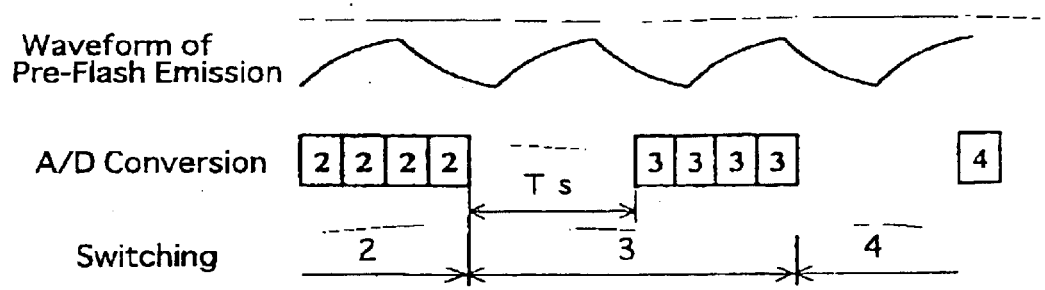
FIG. 31 is a diagram illustrating the sequence of the A/D conversion operation performed in the camera body.

FIG. 31 shows an enlarged schematic view of a part of the waveform of the voltage PDfl shown in FIG. 7, which corresponds to the output of the light-receiving element 85. The ripple frequency of the waveform of the voltage PDfl is approximately 20 μs to 40 μs. In the above described pre-A/D conversion process, the processing time for the operation at step S309 in which the output voltage corresponding to the photocurrent of each zone sensor 22_n of the nine-segment photometering sensor 22 is converted from analogue to digital four times successively is approximately 16 μs since the processing time for each of the four A/D conversions at step S309 is approximately 4 μs. This processing time of approximately 16 μs substantially corresponds to a half period of the ripple frequency of the waveform of the pre-flash emission. Therefore, there is a high possibility of the A/D conversion operation at step S309 being performed for a half period of the ripple frequency of the waveform of the pre-flash emission which that includes a peak and a bottom thereof. This makes it possible to obtain precise values in the A/D conversion operation. Due to such reasons, an A/D conversion is performed four times successively in the A/D conversion operation at step S309.

Flash Emission Amount Calculation Process

The flash emission amount calculation process performed at steps S262 and S266 will be hereinafter discussed in detail with reference to the flow chart shown in FIG. 16. In this process, firstly it is determined whether the distance value Dv is available (step S350). The distance value Dv is input at step S112 in the camera-lens communication process in the case where an interchangeable lens which can have communication with the camera body 10 via the camera-lens communication interface 7 is mounted to the camera body 10. Therefore, if it is determined that the distance value Dv is not available, the CPU 13 determines that the currently-mounted interchangeable lens is a conventional type which cannot have communication with the CPU 13 of the camera body 10. The distance value Dv is an APEX value.

If the distance value Dv is available (if YES at step S350), it is determined whether the Bounce flag is 1 (step S351). The Bounce flag is set at 1 when a head of the external flash device is tilted or swiveled upward to give bounced light to the object. If the Bounce flag is not 1 (if NO at step S351), it is determined whether either the WLset flag or the WLint flag is 1 (step 352). If neither the WLset flag nor the WLint flag is 1 (If NO at step S352), namely, if wireless control is not performed, it is determined whether the distance value Dv is smaller than −1 (=0.7 meters) (step S353).

If the distance value Dv is available (if YES at step S350), or if the Bounce flag is not 1 (if NO at step S351), of if a wireless control is not performed (if NO at step S352) and the distance value Dv is not smaller than −1 (if NO at step S353), a reference pre-flash brightness value Bvpc when a pre-flash emission is projected toward an object having a reference reflectivity is determined at step S354 using the following equation:

$$Bvpc = Ks - Avmin - Dv$$

wherein "Avmin" represents the f-number at full aperture, and "Ks" represents the constant determined from the following equation:

$$Ks = Bvps + Dvs$$

wherein "Dvs" represents the reference distance value according to the APEX system, and "Bvps" represents the brightness value when a pre-flash emission is projected toward an object having a reference reflectivity which is located at the reference distance value Dvs, in the case where the pre-flash intensity PreP is set at 1. "Bvps−Avmin" represents the pre-flash brightness value photometered via the nine-segment photometering sensor 22 when the object brightness at a pre-flash is the aforementioned reference pre-flash brightness value Bvps.

If the distance value Dv is not available (if NO at step S350), or if the Bounce flag is 1 (if YES at step S351), or if a wireless control is performed (if YES at step S352), or if the distance value Dv is smaller than −1 (if YES at step S353), the reference pre-flash brightness value Bvpc is calculated without using the distance value Dv (steps S355 and S356). This is because there are some conditions (e.g., a condition wherein a head of the external flash device is tilted or swiveled upward to produce bounced flash, or wherein a wireless control is performed, or wherein the object is located behind the minimum distance in the illumination range of the flash system, etc.) which do not agree with the relationship between the distance value Dv and the pre-flash emission.

In the operation at step S355, a maximum pre-flash brightness Bvp(m)max is selected from among the nine pre-flash brightness values Bvp(m) obtained via the nine different zone sensors 22_1 through 22_9 of the TTL nine-segment photometering sensor 22 (the variable m=1~9) and the identification number or numbers of one or more zone sensors of the TTL nine-segment photometering sensor 22 whose difference in brightness value from the maximum pre-flash brightness Bvp(m)max is smaller than 5 EV are stored in a register X in the CPU 13. The brightness value 5 EV which determines the range of the difference in brightness value from the maximum pre-flash brightness Bvp (m) max corresponds to the latitude of a typical negative film. Such a brightness value can be suitably adjusted to, e.g. 3 EV, according to the film type in use. The reason why one or more zone sensors of the TTL nine-segment photometering sensor 22, whose difference in brightness value from the maximum pre-flash brightness Bvp(m)max is equal to or greater than 5 EV, are removed is that the object positioned to correspond to one zone sensor at which such a pre-flash brightness is obtained is located far away from the object corresponding to the maximum pre-flash brightness Bvp(m)max and is therefore considered to have little influenced by flash light emission.

Subsequently, in the operation at step S356, a minimum pre-flash brightness Bvp(m)min is selected from among pre-flash brightness value or values Bvp(x) obtained via one or more zone sensors of the number or numbers selected at step S355, and the reference pre-flash brightness value Bvpc is calculated at step S356 using the following equation:

$$Bvpc = (Bvp(x)max + Bvp(x)min)/2.$$

Each of the maximum pre-flash brightness Bvp(m)max and the minimum pre-flash brightness Bvp(m)min is within the latitude of film in use due to the operation at step S355. If the minimum pre-flash brightness Bvp(m)min is not obtained at step S356, the reference pre-flash brightness value Bvpc is regarded to be equal to the maximum pre-flash brightness Bvp(m)max.

After the reference pre-flash brightness value Bvpc has been determined, the identification number or numbers of one or more zone sensors of the TTL nine-segment photometering sensor 22 whose difference in brightness value from the reference pre-flash brightness value Bvpc is greater than −2 EV and smaller than +2 EV are stored in a register Y in the CPU 13 (step S357). This operation at step S357 is performed for the purpose of removing the object having an excessively high reflectivity or located behind the minimum distance in the illumination range of the flash system, or the object having an excessively low reflectivity or located far away from the maximum distance in the illumination range of the flash system.

Subsequently, it is determined whether a number has been registered in the register Y (step S358). If one or more numbers have been registered in the register Y (if YES at step S358), the average value of pre-flash brightness values Bvp(y) obtained via those zone sensors of the TTL nine-segment photometering sensor 22 whose numbers have been registered in the register Y is calculated, and is stored in the RAM 13a as a calculated pre-flash brightness value (an average pre-flash brightness value) Bvptyp (step S359). If no number has been registered in the register Y (if NO at step S358), the reference pre-flash brightness value Bvpc is stored in the RAM 13a as the calculated pre-flash brightness value (an average pre-flash brightness value) Bvptyp (step S360).

The flashlight-emitting magnification Mv is calculated at step S361 via the following equation:

$$Mv = Tv + Av + Avc - Sv - Bvptyp - Avmin$$

wherein "Tv" represents the optimum time value (optimum shutter speed) according to the APEX system (however, Tv is regarded to be equal to Tvx if the time value Tv is smaller than the flash sync speed); "Av" represents the aperture value according to the APEX system; "Avc" represents the photometering correction information; and "Sv" represents the film speed value according to the APEX system.

After the flashlight-emitting magnification Mv has been calculated, a TTL correction calculation is performed (steps S362 to S365). In this calculation, firstly ratio data D(n) is calculated at step S362 using the following equation:

$$D(n) = 2^{(Bvp(n) - Bvptyp)}.$$

The ratio data D(n) shows how many times the pre-flash brightness value Bvp(n) at a photometering zone n (n=1~9) of the TTL nine-segment photometering sensor 22 is greater than the calculated pre-flash brightness value Bvptyp.

Subsequently, the ratio data D(n) is substituted into the following equation (1) to determine an estimated receiving light amount (a relative output) F that the TTL direct photometering sensor 23 receives from the pre-flash brightness value Bvp(n) at each zone sensor 22_(n) of the TTL nine-segment photometering sensor 22 (step S363). Subsequently, the ratio data D(n) of the photometering zone n which has not been stored in the register Y is reset to 1 (a specified value), and all the ratio data D(n) are substituted into the following equation (1) to determine a reference receiving light amount Ftyp (step S364).

$$F = 36 \times D(5) + 12 \times (D(2) + D(4) + D(6) + D(8)) + 4 \times (D(1) + D(3) + D(7) + D(9)) \quad (1)$$

Subsequently, the ratio of the estimated receiving light amount F to the reference receiving light amount Ftyp is regarded as a TTL correction value (APEX value) Fc, and accordingly the TTL correction value (APEX value) Fc is calculated at step S365 using the following equation:

$$Fc = \ln(F/Fype)/\ln 2$$

Subsequently, control returns to the pre-flash data determination process shown in FIG. 14.

The coefficient of the ratio data D(n) at each photometering zone n in the above equation (1) is referred herein to as a weighting factor.

The weighting factors, which are respectively assigned to the nine different zone sensors 22_1 through 22_9 of the TTL nine-segment photometering sensor 22, are determined in accordance with the distribution sensitivity of the TTL direct photometering sensor 23.

FIG. 8B is a graph showing the distribution of the light received by the TTL direct photometering sensor 23 in the horizontal direction across the center of the TTL nine-segment photometering sensor 22. In FIG. 8B, the vertical axis represents the amount of the light received by the TTL direct photometering sensor 23, while the horizontal axis corresponds to the horizontally-aligned fourth, fifth and sixth photometering zones 4, 5 and 6 of the TTL nine-segment photometering sensor 22 shown in FIG. 8A. The distribution of the light received by the TTL direct photometering sensor 23 in the horizontal direction across the center of the TTL nine-segment photometering sensor 22 is regarded to be identical to that in the vertical direction across the center of the TTL nine-segment photometering sensor 22. Namely, the same IS distribution as that shown in FIG. 8B can be obtained if the horizontal axis of FIG. 8B is made to correspond to the vertically-aligned second, fifth and eighth photometering zones 2, 5 and 8 of the TTL nine-segment photometering sensor 22 shown in FIG. 8A.

FIG. 8C is a diagram showing the amount of the light received by the TTL direct photometering sensor 23 via each of the nine different photometering zones 1 through 9 as a percentage (%) relative to the total amount of the light received by the TTL direct photometering sensor 23. In the present embodiment of the flash photography system, the percentage represents the aforementioned weighting factor. Namely, 36% of the sensitivity is given to the output of the zone sensor 22_5 of the TTL nine-segment photometering sensor 22, 12% of the sensitivity is given to the output of each of the zone sensors 22_2, 22_4, 22_6 and 22_8 of the TTL nine-segment photometering sensor 22, and 4% of the sensitivity is given to the output of each of the zone sensors 22_1, 22_3, 22_7 and 22_9 of the TTL nine-segment photometering sensor 22. The function for determining the aforementioned relative output F of the TTL direct photometering sensor 23 is expressed by the above equation (1).

A specific example of the flash emission amount calculation process shown in FIG. 16 will be hereinafter discussed. FIG. 9A shows a case where the main object is located to correspond to only a central part (which includes the fifth and eighth photometering zones 5 and 8) of the TTL nine-segment photometering sensor 22 while the background is located far away from the object. FIG. 9B is a diagram showing the brightness determined with the TTL nine-segment photometering sensor 22 at each of the nine different photometering zones 1 through 9 thereof, in the particular case shown in FIG. 9A at the pre-flash emission, wherein the values shown in FIG. 9B are reference pre-flash brightness values Bvpc. In this particular case shown in FIGS. 9A and 9B, if the object brightness is photometered via the TTL direct photometering sensor 23 and if exposure control is carried out simply by using the output of the TTL direct photometering sensor 23, the main object will be overexposed since the reflected light from the periphery of the object is little.

FIG. 9C shows a case where the main object is located to correspond to a major part (which includes the first, second, fourth, fifth, seventh and eighth photometering zones 1, 4, 5, 7 and 8) of the TTL nine-segment photometering sensor 22 while an object having a high reflectivity such as a mirror or the like exits in the background (which includes the third, fourth and fifth photometering zones 3, 6 and 9) of the main object. FIG. 9D is a diagram showing the brightness (i.e., the reference pre-flash brightness values Bvpc) determined with the TTL nine-segment photometering sensor 22 at each of the nine different photometering zones thereof, for the particular case shown in FIG. 9C at the pre-flash emission. In this particular case shown in FIGS. 9C and 9D, if the object brightness is photometered via the TTL direct photometering sensor 23 and if exposure control is carried out simply by using the output of the TTL direct photometering sensor 23, the main object will be underexposed since the reflected light from the periphery of the object is excessively great.

Figure 16:
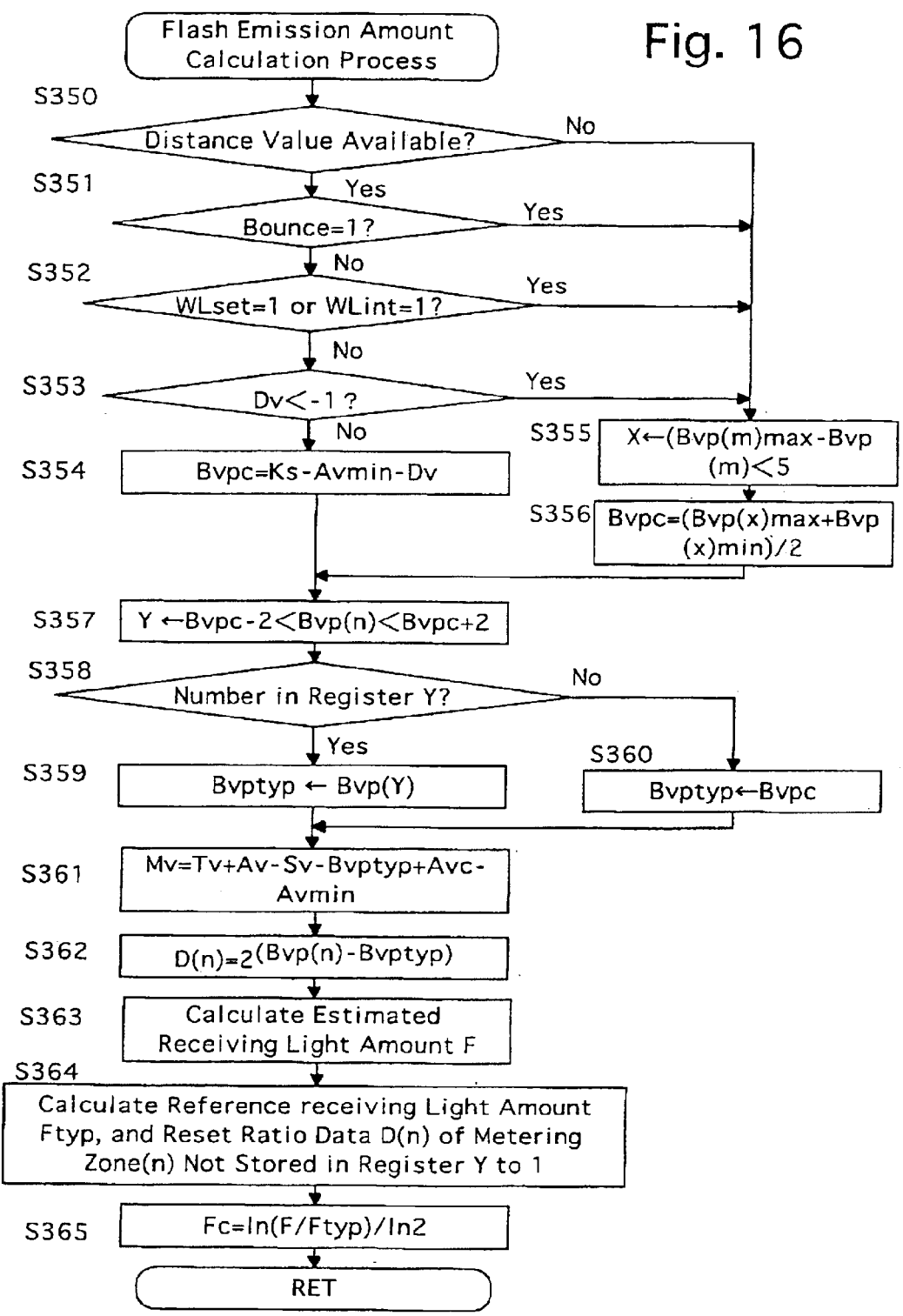
FIG. 16 is a flow chart for a flash emission amount calculation process performed by the CPU of the camera body.

If the flash emission amount calculation process shown in FIG. 16 is performed on condition shown in FIG. 9A or 9C, the results shown in Table 5 below are obtained. However, such results are obtained on the following condition:

$Ks=12$, $Avmin=4$, $Dv=4$, $Tv=7$, $Av=6$, $Avc=0$, and $Sv=5$.

TABLE 5

|  | Bvpc | Y | Bvptyp | Mv | F | Ftyp | Fc |
|---|---|---|---|---|---|---|---|
| FIG. 9A | 4 | 5,8 | 3.5 | 0.5 | 68.6 | 111.4 | −0.70 |
| FIG. 9C | 4 | 1,2,4,5,7,8 | 4 | 0 | 240 | 100 | 1.26 |

As can be understood from the results shown in Table 5, the exposure compensation has underexposed the main object by 0.7 EV in the case shown in FIG. 9A, and that the exposure compensation has overexposed the main object by 1.26 EV in the case shown in FIG. 9C. Accordingly, correct exposure can be attained even if an object having a high reflectivity such as a mirror, or the like exits, in the vicinity of the main object, or even if the main object is relatively small with respect to the background.

The Exposure Process

Figure 17:
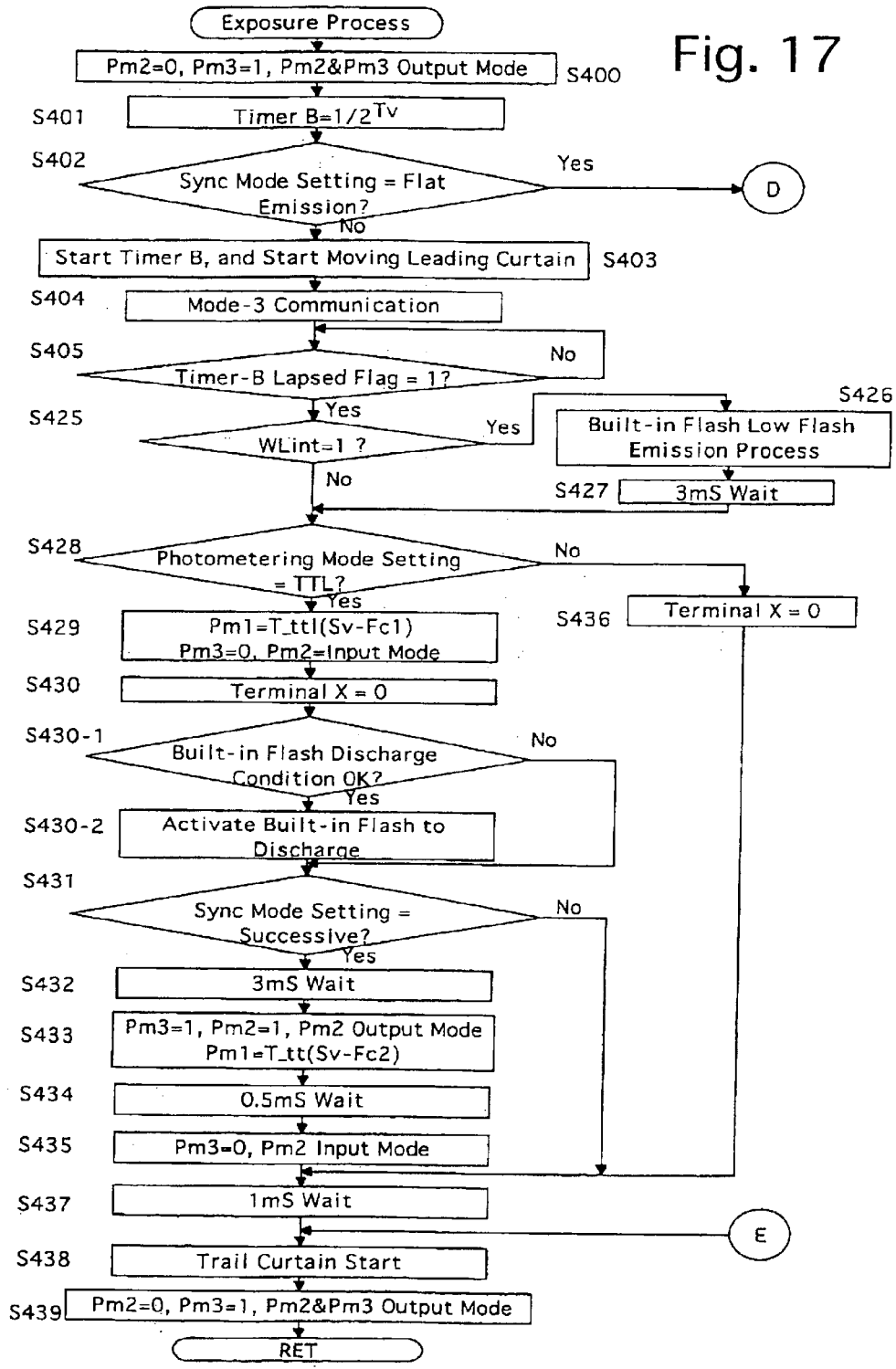
FIG. 17 is the first half of a flow chart for an exposure process performed by the CPU of the camera body.

The exposure process performed at step S128 in the camera main process will be hereinafter discussed in detail with reference to the flow chart shown FIGS. 17 and 18.

In the exposure process, firstly, the output ports Pm2 and Pm3 are set to "0" and "1", respectively (step S400) Due to this operation at step S400, the MOS_SW 200 is switched ON to thereby cause the integrating capacitor 201 to discharge in the TTL direct photometering circuit 20 (see FIG. 3). In this state, the terminal Q of the terminal connector 4 is in a communication available state since the transistor 206 is OFF. The operation at step S400 is also performed in the CPU's port initialization operation at step S100.

Subsequently, the timer B is set for an exposure time $\frac{1}{2}^{Tv}$ (step S401), and it is determined whether the sync mode setting designates the flat emission mode (step S402).

The cases where the sync mode setting designates a mode other than the flat emission mode, the flash device 50 discharges to emit the main flash emission in the normal flash emission mode, i.e., not in the flat emission mode.

If the sync mode setting does not designate the flat emission mode (if NO at step S402), the timer B is started in order to cause the leading curtain to start moving (step S403). Subsequently, mode-3 communication is performed (step S404). In the mode-3 communication, a pulse signal having three successive pulses is output to the external flash device. Upon receipt of the pulse signal having three successive pluses, the external flash device prepares for the main flash discharge in the normal mode. FIG. 6A shows the signals input to the terminals C, R, Q and X of the terminal connector 56 and for a flash emission when the sync mode setting designates the leading curtain sync flash mode. FIG. 6B shows the signals input to the terminals C, R, Q and X of the terminal connector 56 and for flash emissions when the sync mode setting designates the successive sync flash mode.

After the mode-3 communication is performed, it is determined whether the timer-B lapsed flag is 1 (step S405) If the timer-B lapsed flag is not 1 (if NO at step S405), control repeats the checking operation at step S405. If the timer-B lapsed flag is 1 (if YES at step S405), it is determined whether the WLint flag is 1 (step S425). If the WLint flag is not 1 (if NO at step S425), control skips the operations of steps S426 and S427, and proceeds straight from step S425 to step S428. If the WLint flag is 1 (if YES at step S425), the built-in flash is activated to emit a single low flash to transmit a wireless signal serving as the main-flash emission command wireless signal to the slave flash device (step S426). Subsequently, control waits 3 ms (step S427). Subsequently, control proceeds to step S428. Upon receipt of the main-flash emission command wireless signal, the slave flash device starts emitting the main flash with the set flashlight-emitting magnification Mv.

Subsequently, it is determined whether the photometering mode setting designates the TTL photometering mode (step S428). In the present embodiment of the flash photography system, the built-in flash is activated to discharge for the main exposure if a predetermined built-in flash discharge condition is satisfied (step S430-1) on condition that the sync mode setting designates a mode other than the flat emission mode and that the photometering mode setting designates the TTL photometering mode. The predetermined built-in flash discharge condition is that the built-in flash has been popped up and also fully charged.

If the photometering mode setting does not designate the TTL photometering mode (if NO at step S428), the terminal X is set to "0" (step S436). Immediately after the terminal X becomes "0", the external flash device starts discharging (see FIG. 6A). In this case, the external flash device is in one of the following flash modes: the light-magnification flash mode (see step S217), an auto flash mode, or a manual flash mode, which has been determined via information which has been previously transmitted (either by hard connection or by wireless control). After the terminal X is set to "0" at step S436, control waits 1 ms (step S437) and subsequently the trailing curtain is released to start moving (step S438) Subsequently, the ports Pm2 and Pm3 are initialized (step S439), and control returns to the camera main process.

If the photometering mode setting designates the TTL photometering mode (if YES at step S428), a voltage value corresponding to D/A data T_ttl(Sv-Fc1) is read out from a D/A data table T_ttl(x) to be output to the D/A conversion port Pm1 of the group of ports Pm of the CPU 13, the output port Pm3 is set to "0", and the port Pm2 is set to serve as an input port (step S429). The above-mentioned D/A data table T_ttl(x) corresponds to an APEX value x. Furthermore, the D/A data T_ttl(Sv-Fc1) corresponds to D/A data at the time the APEX value x is equal to the sum of the film speed value Sv and the TTL correction value Fc1. Subsequently, the terminal X is set to "0" to thereby cause the external flash device to discharge (step S430), and it is determined whether the aforementioned predetermined built-in flash discharge condition is satisfied (step S430-1). If the predetermined built-in flash discharge condition is satisfied (if YES at step S430-1), the xenon flashtube 21 is also activated to discharge via the built-in flash circuit 14 (step S430-2). If the predetermined built-in flash discharge condition is not satisfied (if NO at step S430-1), control skips step S430-2 and advances to step S431.

Setting the output port Pm3 to "0" at step S429 causes the MOS_SW 200 of the TTL direct photometering circuit 20 to be switched OFF. In this state, since the flash has not yet discharged, the output of the operational amplifier 202 is "0" while the output of the comparator 203 is also "0". Thereafter, if the external flash device and the built-in flash discharge at steps S430 and S430-2, respectively, the TTL direct photometering sensor 23 receives light (object light) reflected by film surface to output a photocurrent corresponding to the amount of the received light. The integrating capacitor 201 integrates (accumulates) this photocurrent. As a result, the output voltage of the operational amplifier 202 rises. Thereafter, if the output voltage of the operational amplifier 202 reaches the output voltage corresponding to the D/A data T_ttl(Sv-Fc1) of the D/A conversion port Pm1, the output of the comparator 203 changes to "0" to "1". This causes the output of the transistor 206 to change from low to high, thus causing the terminal Q to change from "0" to "1" to quench the discharge of each of the external flash device and the built-in flash.

It is determined at step S431 whether the sync mode setting designates the successive sync flash mode. In a state where the sync mode setting designates the successive sync flash mode, wireless control is not performed, more than one external flash device is connected to the camera body 10, and the sync mode requests from the external flash devices are not all the same; some of them request the leading curtain sync flash mode and others the successive sync flash mode. If the sync mode setting designates the successive sync flash mode (if YES at step S431), the flash device(s) with the sync mode request requesting the leading curtain sync flash mode discharges a first time, while another flash device(s) with the sync mode request requesting the successive sync flash mode discharges a second time. The amount of the first flash discharge (see the waveform of a first flash emission (1) in FIG. 6B) and the amount of the second flash discharge (see the waveform of a second flash emission (2) in FIG. 6B) are controlled so as to have the ratio of (⅓) to (⅔). It should be noted that the built-in flash is activated to discharge simultaneously with the first flash emission of the external flash device whose sync mode request requests the leading curtain sync flash mode.

If the sync mode setting designates the successive sync flash mode (if YES at step S431), control waits 3 ms (step S432). Upon the lapse of 3 ms, the output port Pm2 is set to "1", the output port Pm3 is set to "1", and a voltage corresponding to a D/A data T_ttl(Sv-Fc2) is read out from the D/A data table T_ttl(x) to be output to the D/A conversion port Pm1 (step S433). The D/A data T_ttl(Sv-Fc2) corresponds to D/A data at the time the APEX value x is equal to the sum of the film speed value Sv and the TTL correction value Fc2. Subsequently, control waits 0.5 ms with the terminal Q remaining at "1" (step S434). The operation at step S434 is performed to make preparations for the second flash emission. Upon the lapse of 0.5 ms, the output port Pm3 is set to "0", and the port Pm2 is set to serve as an input port (step S435). This sets the terminal X to "0" to thereby cause the external flash device to discharge to emit the second flash emission. Immediately after the output voltage of the operational amplifier 202 reaches the output voltage T_ttl(Sv-Fc2) of the D/A conversion port Pm1 due to the second flash emission, the terminal Q changes from "0" to "1" to quench the discharge of each of the external flash device and the built-in flash. After the operation at step S435, control waits 1 ms (step S437) and subsequently the trailing curtain of the focal plane shutter is released to start moving (step S438). Subsequently, the ports Pm2 and Pm3 are initialized (step S439), and control returns to the camera main process.

If the sync mode setting does not designate the successive sync flash mode (if NO at step S431), control proceeds from step S431 to step S437, so that the second flash discharge is not performed. Thereafter, control waits 1 ms (step S437) and subsequently the trailing curtain of the focal plane shutter is released to start moving (step S438). Subsequently, the ports Pm2 and Pm3 are initialized (step S439), and control returns to the camera main process. In the case where wireless control is performed, the successive sync flash mode is never designated (step S431, NO).

Figure 18:
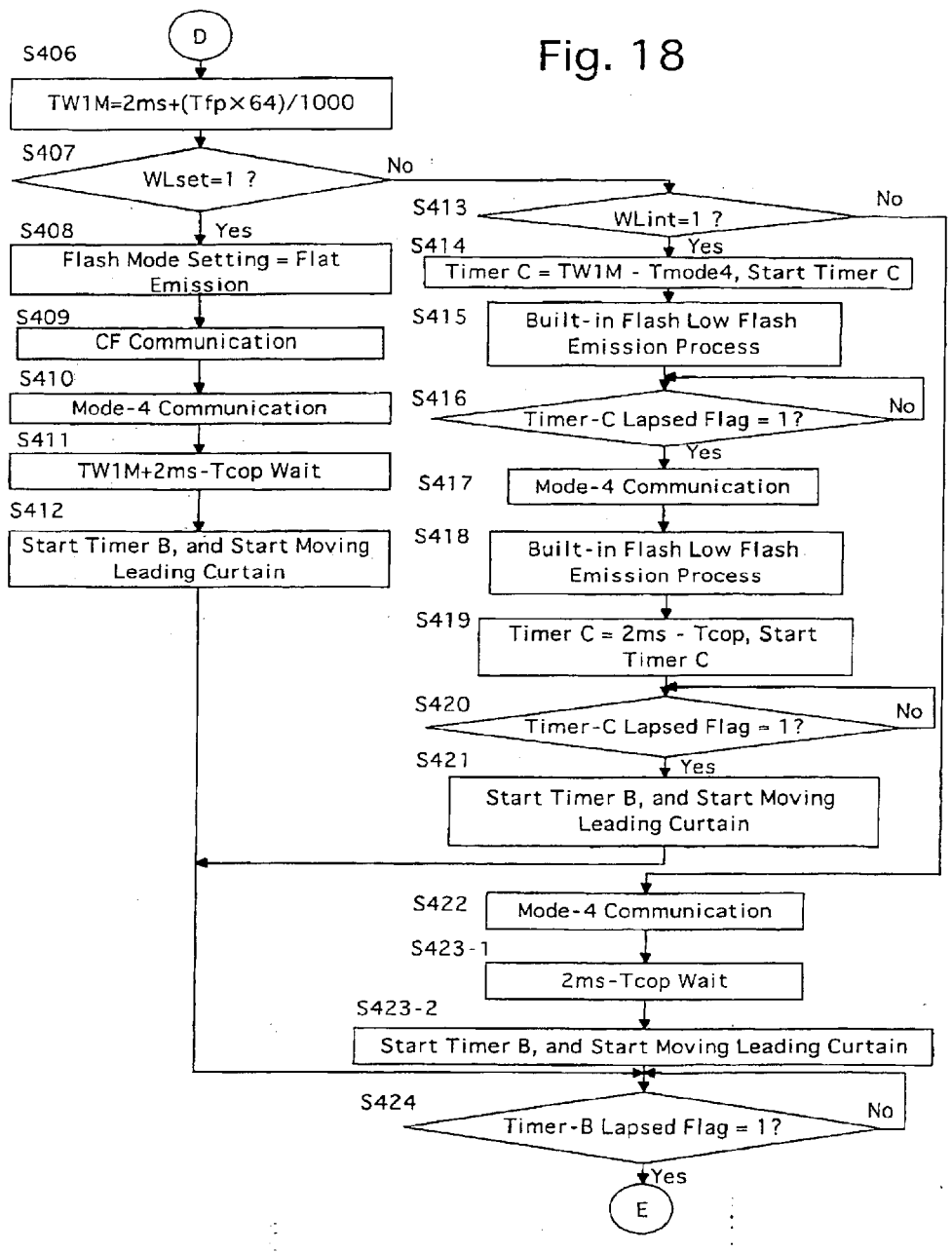
FIG. 18 is the second half of the flow chart for the exposure process.

The cases where it is determined at step S402 that the sync mode setting does not designate the flat emission mode have been discussed above. if it is determined at step S402 that the sync mode setting designates the flat emission mode, control proceeds from step S402 to step S406 shown in FIG. 18. At step S406, the wireless signal interval TW1M serving as the main-flash emission command wireless signal is determined from the following equation:

$$TW1M = 2 + (Tfp \times 64)/1000 \ (ms), \text{ and is stored in the RAM } 13a.$$

Subsequently, it is determined whether the WLset flag is 1 (step S407). If the WLset flag is 1 (if YES at step S407), the flash mode setting is set to designate the flat emission mode (step S408), and is transmitted as CF information from the camera body 10 to the external flash device via the CF communication (step S409). Subsequently, the mode-4 communication is performed (step S410). In the mode-4 communication, a pulse signal having four successive pulses is output to the external flash device. Upon receipt of the pulse signal having four successive pulses, the external flash device firstly emits two successive low flash emissions at the wireless signal interval TW1M determined at step S406, and subsequently emits a uniform flash-emission simultaneously with the uniform flash-emission of the slave flash device. FIG. 6C shows the waveform of the uniform flash-emission at the time of the main flash exposure when the flash mode setting designates the flat emission mode. The duration ("Tmain" shown in FIG. 6C) of the uniform flash-emission interval corresponds to the wireless signal interval TW1M determined at step S406.

Subsequently, control waits for a time [(TW1M+2 ms−Tcop) ms] (step S411) in order to complete the transmission of the main-flash emission command wireless signal in order to start the uniform flash-emission 2 ms before the leading curtain of the focal plane shutter starts moving. "Tcop" at step S411 represents the time lag of the leading curtain of the shutter between the moment the leading curtain is commanded to start moving and the moment the leading curtain actually starts moving.

Subsequently, the timer B is started in order to make the leading curtain start moving (step S412). Subsequently, it is determined whether the timer-B lapsed flag is 1 (step S424). If the timer-B lapsed flag is not 1 (if NO at step S424), control repeats the checking operation at step S424. If the timer-B lapsed flag is 1 (if YES at step S424), control proceeds to step S438 shown in FIG. 17 at which the trailing curtain is released to start moving. Subsequently, the ports Pm2 and Pm3 are initialized (step S439), and control returns to the camera main process.

If the WLset flag is not 1 (if NO at step S407), control proceeds to step S413. At step S413 it is determined whether the WLint flag is 1. If the WLint flag is 1 (if YES at step S413), the timer C is set for a time (TW1M—Tmode4), and the timer C is started (step S414). "Tmode4" at step S414 represents the time necessary for the mode-4 communication. After the timer C is started, the built-in flash low flash emission process is performed to activate the built-in flash to emit a low flash emission for 30 μs as a wireless signal which is transmitted the slave flash device (step S415). Subsequently, it is determined whether a timer-C lapsed flag is 1 (step S416). If the timer-C lapsed flag is not 1 (if NO at step S416), control repeats the checking operation at step S416. If the timer-C lapsed flag is 1 (if YES at step S416), the mode-4 communication is performed to command the external flash device to emit a uniform flash-emission (step S417) and subsequently the built-in flash low flash emission process is performed again to activate the built-in flash to emit a low flash emission for 30 μs as a wireless signal which is transmitted the slave flash device (step S418). Since the mode-4 communication at step S417 and the operation of transmitting the main-flash emission command wireless signal to the slave flash device are completed at substantially the same time due to the operations at steps S414 through S418, the external flash device and the slave flash device start emitting a uniform flash-emission at the same time.

Subsequently, the timer C is set for a time [(2 ms−Tcop) ms], the timer-C lapsed flag is set to 0, and the timer C is started (step S419). Subsequently, it is determined whether the timer-C lapsed flag is 1 (step S420). If the timer-C lapsed flag is not 1 (if NO at step S420), control repeats the checking operation at step S420. The reason why control waits at step S420 is to complete the transmission of the main-flash emission command wireless signal 2 ms before the leading curtain of the focal plane shutter starts moving. If the timer-C lapsed flag is 1 (if YES at step S420), the timer B set at step S401 is started in order to make the leading curtain start moving (step S421). Subsequently, it is determined whether the timer-B lapsed flag is 1 (step S424). If the timer-B lapsed flag is not 1 (if NO at step S424), control repeats the operation at step S424. If the timer-B lapsed flag is 1 (if YES at step S424), control proceeds to step S438 at which the trailing curtain of the focal plane shutter is released to start moving. Subsequently, the ports Pm2 and Pm3 are initialized (step S439), and control returns to the camera main process.

If the WLint flag is not 1 (if NO at step S413), namely, if a wireless control is not performed, the mode-4 communication is performed (step S422), and control waits a time [(2 ms−Tcop) ms] (step S423-1). The reason why control waits this time at step S423-1 is to start the uniform flash-emission of the external flash device 2 ms before the leading curtain of the focal plane shutter starts moving. After the lapse of the time [(2 ms−Tcop) ms] at step S423-1, the timer B set at step S401 is started to make the leading curtain start moving (step S423-2). Subsequently, it is determined whether the timer-B lapsed flag is 1 (step S424). If the timer-B lapsed flag is not 1 (if NO at step S424), control repeats the checking operation at step S424. If the timer-B lapsed flag is 1 (if YES at step S424), control proceeds to step S438 shown in FIG. 17 at which the trailing curtain is released to start moving. Subsequently, the ports Pm2 and Pm3 are initialized (step S439), and control returns to the camera main process.

Test-Flash Emission Process

Figure 19:
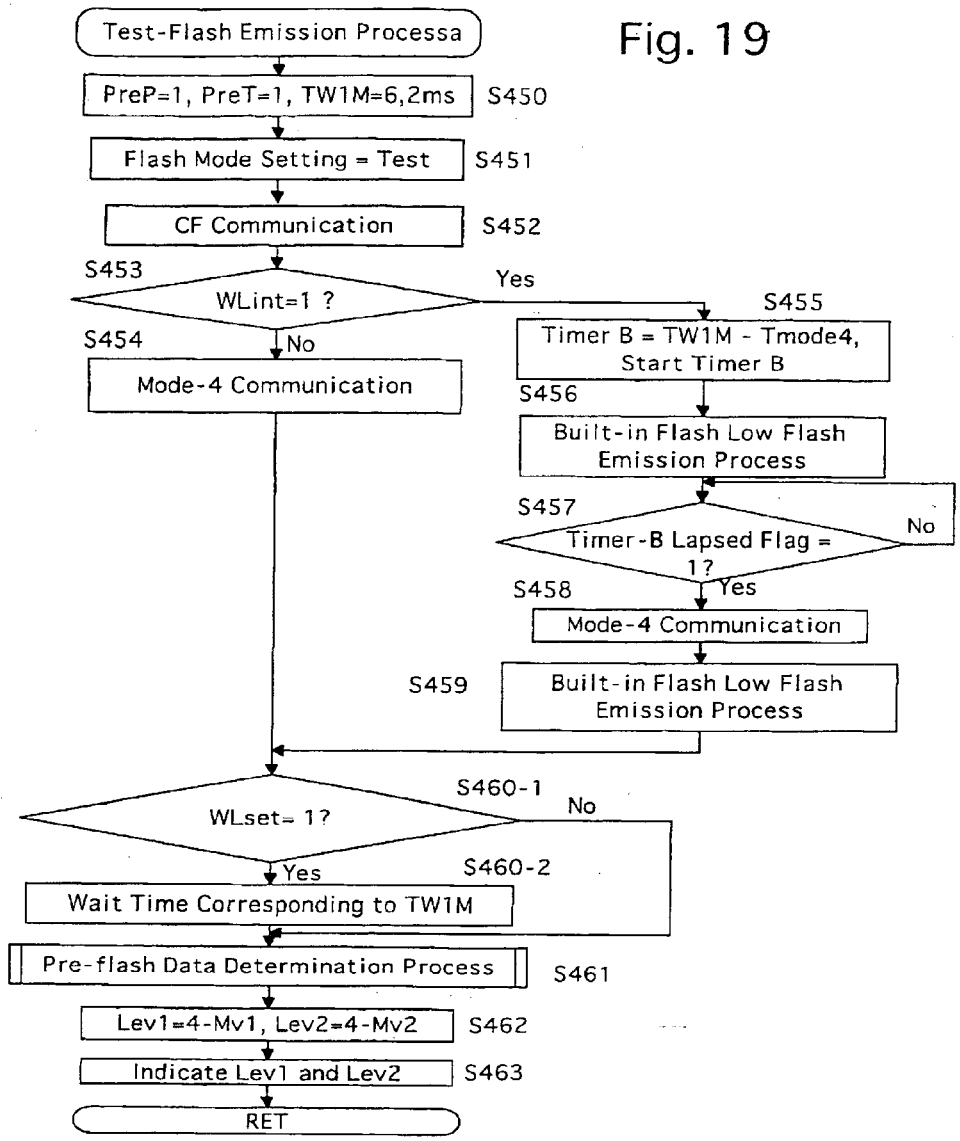
FIG. 19 is a flow chart for a test-flash emission process performed by the CPU of the camera body.

The test-flash emission process performed at step S168 will be hereinafter discussed in detail with reference to the flow chart shown FIG. 19. In the test-flash emission process, the flash device 50 (the external flash device and/or the slave flash device) discharges only for the purpose of checking the operating distance of the flash device 50. The test-flash emission process is performed when the test-flash setting switch of the group of information setting switches 9 is switched ON.

In the test-flash emission process, each of the pre-flash intensity PreP and the pre-flash duration PreT is set to 1, and the wireless signal interval TW1M is set to 6.2 ms (step S450). Subsequently, the flash mode setting is set to designate the test flash mode (step S451), and is transmitted as CF information from the camera body to the external flash device via the CF communication (step S452). After the CF communication is performed, it is determined whether the WLint flag is 1 (step S453).

If the WLint flag is not 1 (if NO at step S453), the mode-4 communication is performed to command the external flash device to emit a test flash emission (step S454), and subsequently control proceeds to step S460-1.

On the other hand, if the WLint flag is 1 (if YES at step S453), the timer B is set for the value of the wireless signal interval TW1M from which the value of the time necessary for the mode-4 communication is subtracted, and the timer B is started (step S455). After the timer B is started, the built-in flash low flash emission process is performed to drive the built-in flash to emit a low flash emission for 30 μs as a wireless signal which is transmitted the slave flash device (step S456), and subsequently it is determined whether the timer-B lapsed flag is 1 (step S457). If the timer-B lapsed flag is not 1 (if NO at step S457), control repeats the operation at step S457. If the timer-B lapsed flag is 1 (if YES at step S457), the mode-4 communication is performed again (step S458), and subsequently the built-in flash low flash emission process is performed again (step S459). Subsequently, control proceeds to step S460-1. Since the mode-4 communication at step S459 and the operation of transmitting the test-flash emission command wireless signal to the slave flash device are completed at substantially the same time due to the operations at steps S455 through S459, the external flash device and the slave flash device start emitting a test flash emission at the same time.

It is determined at step S460-1 whether the WLset flag is 1. If the WLset flag is 1 (if YES at step S460-1), control waits a time corresponding to the wireless signal interval TW1M stored in the RAM 13a (step S460-2). The waiting operation at step S460-2 is performed for the purpose of waiting for the transmission of the test-flash emission command wireless signal by the external flash device to be completed. If the WLset flag is not 1 (if NO at step S460-1), control skips the operation at step S460-2, and proceeds straight from step S460-1 to step S461.

Subsequently, the pre-flash data determination process ("Pre-Flash Data Determination Process" shown in FIG. 14) is performed (step S461). Subsequently, two test light-magnifications Lev1 and Lev2 are calculated in accordance with the two flashlight-emitting magnifications Mv1 and Mv2 which have been calculated in the pre-flash data determination process (step S462). Subsequently, the calculated test light-magnifications Lev1 and Lev2 are indicated on the information display panel 5 (step S463), and control returns to the camera main process. In the present embodiment of the flash photography system, the test light-magnifications Lev1 and Lev2 are calculated using the following equations:

$Lev1=4-Mv1$, and $Lev2=4-Mv2$.

Fundamental operations of the flash device 50 will be hereinafter discussed with reference to the flow charts shown in FIGS. 20 through 29.

Flash Main Process

Figure 20:
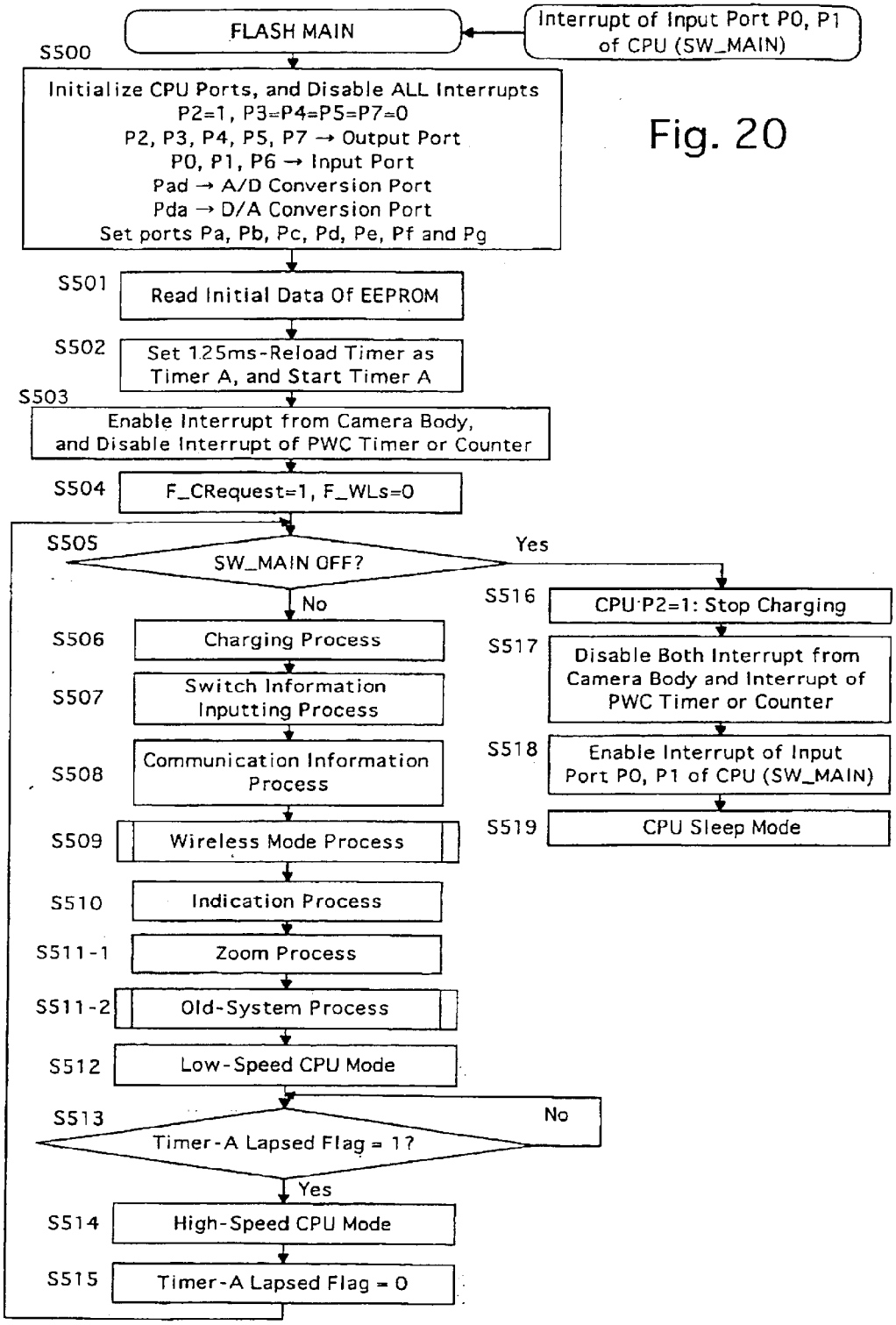
FIG. 20 is a flow chart for a flash main process performed by a CPU of the flash device.

FIG. 20 is a flow chart for a flash main process performed by the flash CPU 65 of the flash device 50. Immediately after the battery 51 is loaded in the flash device 50, control enters the flash main process after the flash CPU 65 is initialized.

In the flash main process, firstly all interrupts are disabled, and each port of the flash CPU 65 is initialized (step S500). Subsequently, the flash CPU 65 has communication with the EEPROM 60 to read out initial data therefrom via the group of ports Pc (step S501). Subsequently, a reload timer set for 125 ms is set as a timer A, and the timer A is started (step S502). Subsequently, an interrupt from the camera body 10 is enabled, while an interrupt of a PWC timer (or counter) for measuring a time interval between low flash emissions (light signals) that the light-receiving element 57 of the flash device 50 receives is disabled (step S503). Subsequently, an F_CRequest flag is set to 1 while an F_WLs flag is set to 0 (step S504). The F_CRequest flag is set to 1 when it is necessary to charge the main capacitor 79 up to the maximum. The F_WLs flag is set to 1 when the wireless mode setting for the slave flash device has been completed.

Subsequently, it is determined whether the main switch 64 is OFF by checking the level of each of the input ports P0 and P1 (step S505). If the main switch 64 is OFF (if YES at step S505), both the input ports P0 and P1 are "1". If the main switch 64 is OFF (if YES at step S505), the output port P2 is set to "1" to stop the operation voltage step up circuit 66 (step S516). Subsequently, both a communication interrupt from the camera body and an interrupt of the PWC timer are disabled (step S517), an ON-interrupt of each of the input ports P0 and P1 is enabled (step S518), and the flash CPU 65 enters a sleep mode (step S519). In the sleep mode at step S519, since an ON-interrupt of each of the input ports P0 and P1 is enabled, an interrupt occurs and control returns to the operation at step S500 if the main switch 64 is switched to the ON or WL (wireless) position.

If the main switch 64 is not OFF, namely, if the main switch 64 is in the ON position or the WL position (if NO at step S505), a charging process of charging the main capacitor 79 is performed (step S506). In the charging process, the output port P2 is set to "0" to actuate the voltage step up circuit 66 to charge the main capacitor 79 via the diode 67. Immediately after the main capacitor 79 starts being charged, a voltage Hv' which is identical to the terminal voltage across the main capacitor 79 is input to the state-of-charge detecting circuit 69. The voltage Hv' input to the state-of-charge detecting circuit 69 is divided via resistors provided in the state-of-charge detecting circuit 69 to be output as an output voltage RLS from the state-of-charge detecting circuit 69 to be input to the flash CPU 65 via the A/D conversion port Pad thereof. In the present embodiment of the flash photography system, the resistance ratio in the state-of-charge detecting circuit 69 is determined so that the output voltage RLS becomes 3.3V when the input voltage Hv' is 330V and so that the output voltage RLS becomes 2.7V when the input voltage Hv' is 270V. Furthermore, a Charge flag is set to 1 if the output voltage RLS becomes equal to or greater than 2.7V, and the charging operation stops if the output voltage RLS becomes equal to or greater than 3.3V.

After the charging process is performed, a switch setting information input process for inputting the switch settings set via the group of information setting switches 63 is performed (step S507) and subsequently a communication information process is performed (step S508) In the communication information process, each flash mode is reset in accordance with the CF information (see Table 3), which is transmitted from the camera body 10 to the external flash device (the flash device 50), while the set FC information (see Tables 1 and 2) is output to the camera body 10. The FC information includes photometering-range checking information for confirming the photometering distance range, and is transmitted to the camera body 10.

Subsequently, a wireless mode process ("Wireless Mode Process" shown in FIG. 21) is performed (step S509). In the wireless mode process, a wireless mode (a wireless slave mode, the old-system compatible mode, a wireless controller mode or a wireless control disabled mode) is set in accordance with the wireless mode setting input in the communication information process at step S508. Subsequently, an indication process in which the flash information processed via the operations at steps 506 through S509 are indicated on the Information display panel 72 is performed (step S510). The information indicated on the Information display panel 72 at step S510 includes photometering mode information, sync mode information, wireless mode information, charge completion information, information on focal length that a flash emission can cover, maximum photometering distance information and minimum photometering distance information.

After the indication process is performed at step S510, a zoom process in which the light emitting unit 55 (see FIG. 4B) is moved in accordance with the lens focal length information input via the CF communication is performed (step S511-1) and subsequently an old-system process is performed (step S511-2). In the old-system process, the charge completion signal and an Fpulse signal which corresponds to the f-number set on the flash device 50 are transmitted to the camera body via the terminal connector 56 if the camera body is a conventional type which cannot have communication with the flash CPU 65.

After the old-system process is performed, the flash CPU 65 enters a low speed CPU mode (step S512) and subsequently it is determined whether the timer-A over flag is 1 (step S513) If the timer-A lapsed flag is not 1 (if NO at step S513), control repeats the operation at step S513. If the timer-A lapsed flag is 1 (if YES at step S513), the flash CPU 65 enters a high speed CPU mode (step S514). Subsequently, the timer-A lapsed flag is set to 0 (step S515) and subsequently control returns to the operation at step S505. Accordingly, the timer A, which is set for 125 ms, restarts every time it expires, so that the operations at steps S505 through S515 are performed every 125 ms.

Wireless Mode Process

Figure 21:
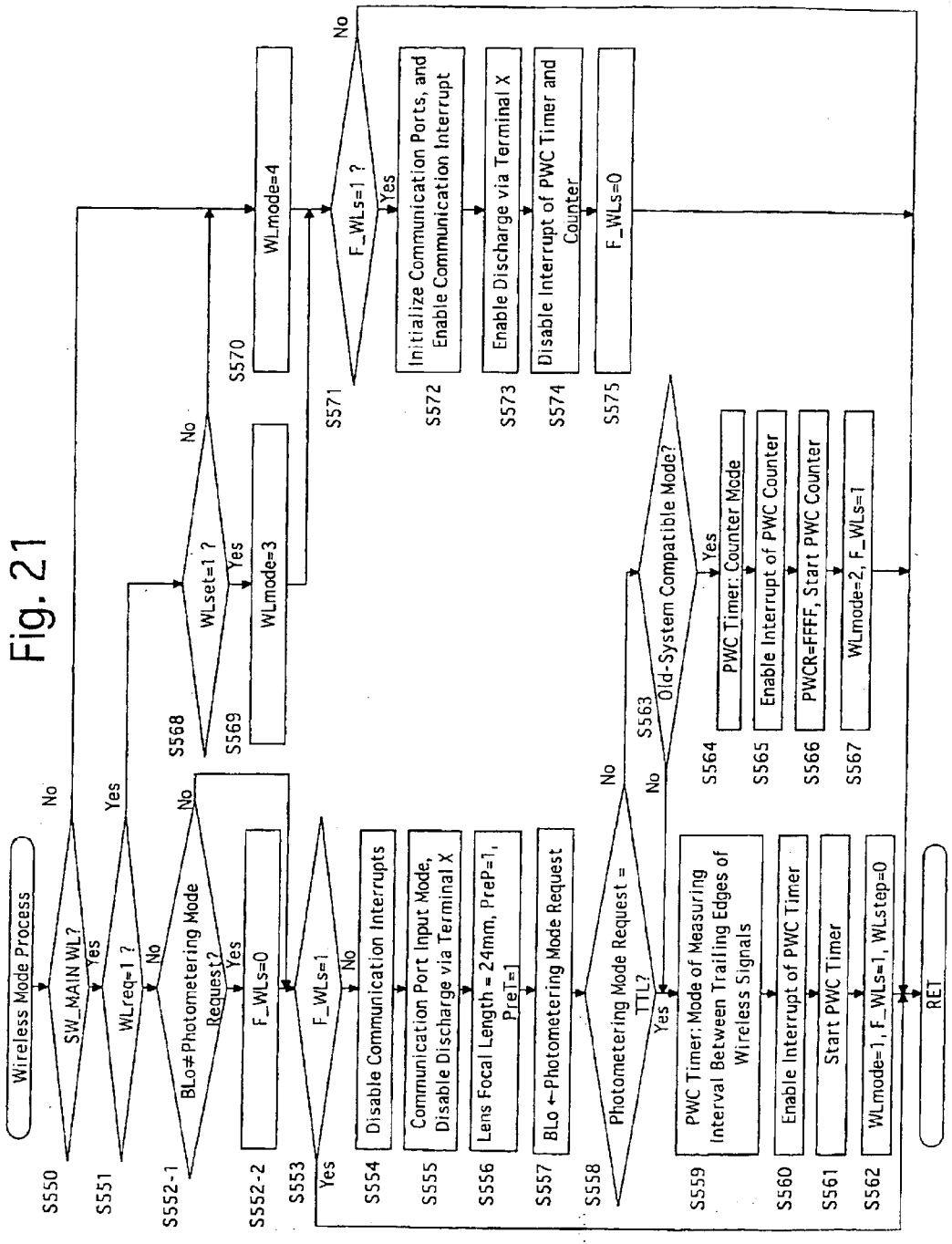
FIG. 21 is a flow chart for a wireless mode process performed by the CPU of the flash device.

The wireless mode process performed at step S509 will be hereinafter discussed in detain with reference to the flow chart shown FIG. 21. In this process, firstly, it is determined whether the main switch 64 is in the WL position by checking the level of the input port P1 (step S550). The input port 21 is "0" if the main switch 64 is in the WL position.

If the main switch 64 is in the WL position (if YES at step S550) it is determined whether the WLreq flag is 1 (step S550). The WLreq flag is set to 1 when the wireless mode is either the wireless controller mode or the wireless master mode. Namely, the flash device 50 serves as external flash device if the WLreq flag is 1, or as slave flash device if the WLreq flag is not 1.

If the WLreq flag is not 1 (if NO at step S551), it is determined whether a photometering mode request BLo which has been previously stored last at step S557 is not equal to the currently-set photometering mode request (step S552-1). If it is the first time for control to enter the wireless mode process, the photometering mode request BLo is compared with a default value stored in the RAM 13a. If the photometering mode request BLo is not equal to the currently-set photometering mode request (if YES step at S552-1), the F_WLs flag is set to 0 to renew the photometering mode (step S552-2). If the photometering mode request BLo is equal to the currently-set photometering mode request (if NO at step S552-1), control proceeds from step S552-1 to step S553. It is determined at step S553 whether the F_WLs flag is 1. The F_WLs flag is set to 1 when the wireless mode setting for the slave flash device has been completed. If F_WLs flag is 1 (if YES at step S553), control returns to the flash main process shown in FIG. 20.

If F_WLs flag is not 1 (if NO at step S553), all communication interrupts are disabled (step S554). Subsequently, all the communication ports of the terminal connector 56, the camera-flash communication interface 59 and the group of ports Pd of the flash CPU 65 are all changed to input ports, while the discharge of the external flash device upon a change of the terminal X from "1" to "0" is disabled (step S555) (see FIG. 34). When the flash device 50 serves as slave flash device, it is generally the case the flash device 50 is fixed via a clip with a hot shoe (not shown) or via a flash stand with a hot shoe (not shown) that is available on the market. However, since various hot shoe accessories are available on the market, it is sometimes the case that a short circuit occurs when the flash device 50 outputs a signal or that the terminal X is turned ON accidentally when the base of the flash device 50 is fixed to a hot shoe. The operation at step S555 is performed to prevent the flash device 50 from being damaged due to such a short circuit and from discharging accidentally due to the terminal X being turned ON accidentally.

Subsequently, the lens focal length information is set to an initial value of 24 mm while each of the pre-flash intensity PreP and the pre-flash duration PreT is set to 1 (step S556). The current photometering mode request is stored in the RAM 13a as the aforementioned photometering mode request BLo (step S557). Subsequently, it is determined whether the photometering mode request requests the TTL photometering mode (step S558).

If the photometering mode request requests the TTL photometering mode (step S558), the discharging operation of the slave flash device is controlled in a first flash emission control mode. In the first flash emission control mode, the slave flash device receives the pre-flash emission command wireless signal, the light-magnification command wireless signal and the main-flash emission command wireless signal successively in that order, which are transmitted from the camera body 10, and controls the discharging operation of the slave flash device in accordance with the received signal.

However, if the photometering mode request requests the auto flash photometering mode or the manual photometering mode, the flash CPU 65 can control the amount of light of the flash emission independently without receiving any command wireless signals, so that the discharging operation of the slave flash device is controlled in a second flash emission control mode. In the second flash emission control mode, the slave flash device starts discharging immediately after the amount of the light received by the light-receiving element 57 reaches a predetermined value.

If the photometering mode request requests the TTL photometering mode (if YES at step S558), the measuring mode of the PWC timer is set to a mode of measuring an interval between trailing edges of low flash emissions (wireless signals) that the light-receiving element 57 of the flash device 50 receives (step S559). Subsequently, an interrupt of the PWC timer is enabled (step S560), and the PWC timer is started to thereby enter a state where light signal (wireless signal) can be received. Subsequently, the PWC timer is started (step S561), and a variable WLmode is set to 1, the F_WLs flag is set to 1, and a variable WLstep is set to 0 (step S562). Subsequently control returns to the flash main process shown in FIG. 20. The value of the variable WLmode represents the currently-set wireless mode. The variable WLmode of "1" represents the wireless slave mode. The value of the variable WLstep represents the state in receiving the wireless signal. The variable WLstep of "0" represents the standby state of receiving the pre-flash emission command wireless signal. The variable WLstep of "1" represents the standby state of receiving the light-magnification command wireless signal. The variable WLstep of "2" represents the standby state of receiving the main-flash emission command wireless signal.

After the operations at steps S559 through S562 are performed, an interrupt of the PWC timer occurs immediately after the first trailing edge of the waveform of the received wireless signal is given to the group of ports Pe of the flash CPU 65, i.e., immediately after the amount of the light received by the light-receiving element 57 reaches a predetermined value. If an interrupt of the PWC timer occurs, a PWC interrupt process ("PWC Interrupt Process" shown in FIGS. 27 and 28) starts. In the PWC interrupt process, it is determined that the received wireless signal represents which command (the pre-flash command, the light-magnification command, the main flash command or the test flash command) in accordance with data represented by the interval between two trailing edges of the received wireless signal, and predetermined operations are performed in accordance with the command represented by the received wireless signal.

If the photometering mode request does not request the TTL photometering mode (if NO at step S558), it is determined whether the old-system compatible mode has been set (step S563). In the present embodiment of the flash photography system, the new-system compatible mode, in which the slave flash device starts emitting the main flash at a time of exposure upon receiving more than one light signal (wireless signal) successively, and the old-system compatible mode, in which the slave flash device starts emitting the main flash at a time of exposure upon an amount of a single flash emission emitted by the built-in flash of the camera body 10 or the external flash device reaching a predetermined value, can be switched if the auto flash photometering mode or the manual photometering mode is selected via the photometering mode request setting switch 63a. The new-system compatible mode and the old-system compatible mode can be manually switched via the system selector switch 63d. The old-system compatible mode is selected by the user when a conventional camera which cannot transmit any wireless signal or cannot make the external flash device transmit any wireless signal is used, or when a conventional type flash device which cannot transmit any wireless signal is used as a master flash device or a controller flash. The new-system compatible mode and the old-system compatible mode can be stored in the EEPROM 60 as selection data which can be selected via, e.g., a multi-function select button.

If the old-system compatible mode has been set (if YES at step S563), the measuring mode of the PWC timer is set to a counter mode so that the slave flash device can start discharging in synchronization with a single low flash emission emitted by the built-in flash of the camera body 10 or the external flash device (step S564). Subsequently, an interrupt of a PWC counter is enabled (step S565). Subsequently, a register PWCR which represents a PWC counter value is loaded with FFFF, and the PWC timer is started (step S566). Subsequently, the variable WLmode is set to 2, and the F_WLs flag is set to 1 (step S567). Subsequently control returns to the flash main process shown in FIG. 20. The variable WLmode of "2" represents the old-system compatible mode. In the old-system compatible mode, the register PWCR is increased by one to thereby change the value of the register PWCR from FFFF to 0000 immediately after the light-receiving element 57 receives a single flash emission emitted by the built-in flash of the camera body 10 or the external flash device, i.e., immediately after the first trailing edge of the waveform of the received wireless signal shown in FIG. 6E or 6F is given to the group of ports Pe of the flash CPU 65. This change of the value of the register PWCR causes an interrupt of the PWC timer to occur, so that the PWC interrupt process shown in FIGS. 27 and 28 starts, thus causing the slave flash device to discharge.

If the new-system compatible mode has been set (if NO at step S563), control proceeds to step S559. In this case, the slave flash device emits the main flash at a time of exposure by receiving the pre-flash emission command wireless signal, the light-magnification command wireless signal and the main-flash emission command wireless signal successively in that order.

If the WLreq flag is 1 (if YES at step S551), it is determined whether the WLset flag is 1 (step S568). If the WLset flag is not 1 (if NO at step S568), control proceeds to step S570. If the WLset flag is 1 (if YES at step S568), the variable WLmode is set to 3 (step S569), and subsequently control proceeds to step S571. The variable WLmode "3" represents the mode in which the slave flash device is controlled by wireless.

If the main switch 64 is not in the WL position (if NO at step S550), control proceeds to step S570. At step S570 the variable WLmode is set to 4 and subsequently control proceeds to step S571. The variable WLmode "4" represents the mode in which wireless control is not performed. It is determined at step S571 whether the F_WLs flag is 1. If the F_WLs flag is not 1, control returns to the flash main process. If the F_WLs flag is 1 (if YES at step S571), control proceeds to step S572 to cancel the settings of the slave flash device. Namely, all the communication ports of the terminal connector 56 are initialized while all communication interrupts are enabled (step S572), the discharge of the flash device 50 upon a change of the terminal X from "1" to "0" is enabled (step S573), an interrupt of either the PWC timer or the PWC counter is disabled (step S574), and the F_WLs flag is set to 0 (step S575). Subsequently, control returns to the flash main process shown in FIG. 20.

In the above described wireless mode process, in the case where the flash device 50 serves as slave flash device, control proceeds from step S551 to step S552-1 to perform the operations at steps S552-1 through S567 since the WLreq flag is set to 0, i.e., since the main switch 64 is in the WL position and at the same time the wireless mode setting switch 63c is in the wireless slave mode.

In the case where the flash device 50 serves as external flash device and controls the slave flash device by wireless, control proceeds from step S551 to step S568 to perform the operations at steps S568, S569 and S570 through S575 since the WLreq flag is set to 1, i.e., since the main switch 64 is in the WL position and at the same time the wireless mode setting switch 63c is in either the wireless controller mode or the wireless master mode.

In the case where the flash device 50 serves as external flash device but does not control the slave flash device by wireless control, control proceeds from step S568 to step S570 to perform the operations at steps S570 through S575 since the main switch 64 is not in the WL position.

Communication Interrupt Process

Figure 22:
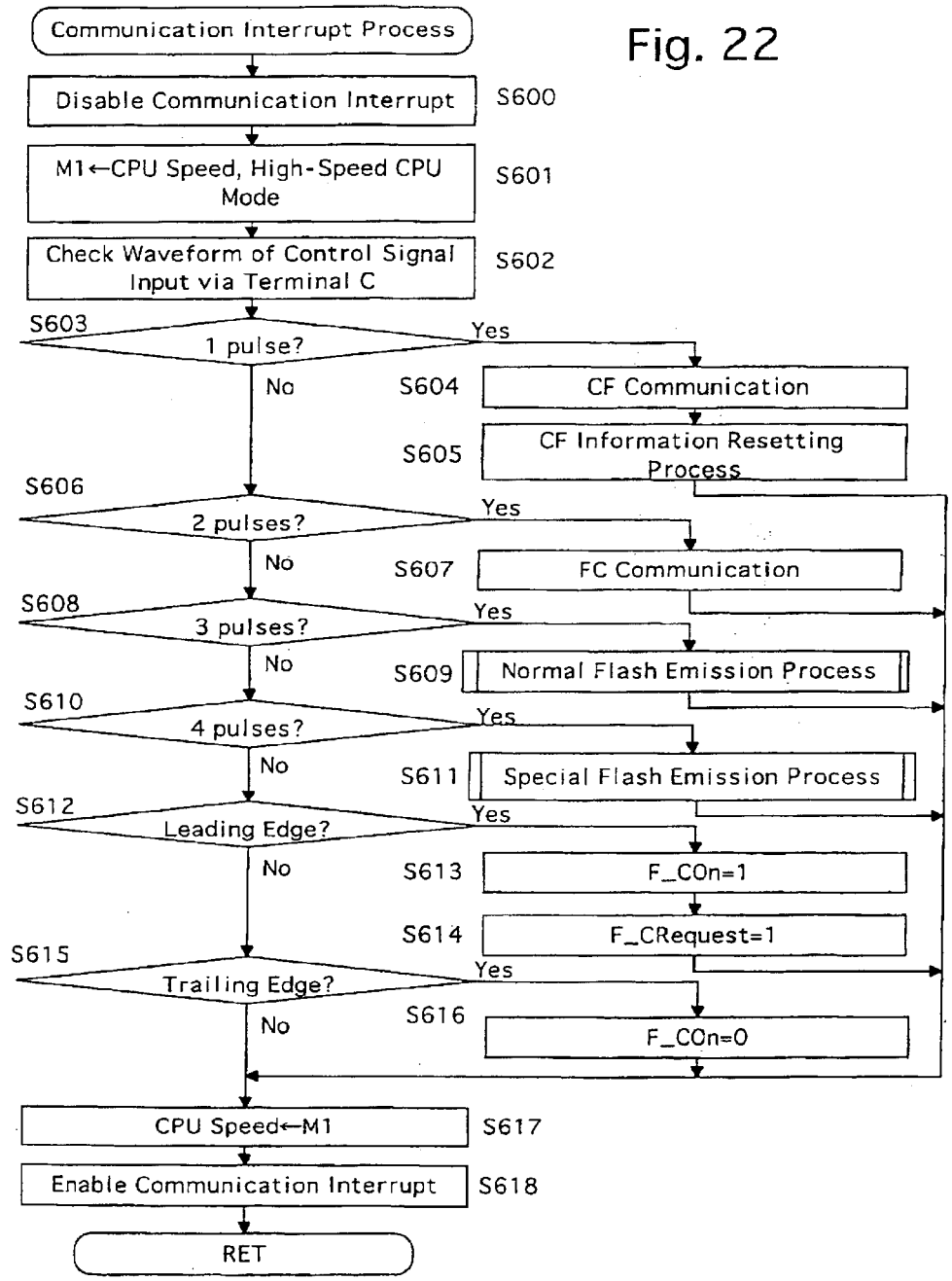
FIG. 22 is a flow chart for a communication interrupt process performed by the CPU of the flash device.

The communication interrupt process performed on condition that the main switch 64 is in either the ON position or the WL position will be hereinafter discussed in reference to the flow chart shown in FIG. 22 and the timing charts shown in FIGS. 5 and 6A through 6F. The communication interrupt process is performed upon the variation of the terminal C of the terminal connector 56 from "0" to "1" or from "1" to "0" since an interrupt from the camera body 10 is enabled at step S503.

In the communication interrupt process, firstly no communication interrupt from the camera body 10 is enabled to disable the subsequent communication interrupt from the camera body 10 (step S600) Subsequently, the current CPU speed of the flash CPU 65 is stored in a RAM 65a, while the flash CPU 65 enters the high speed CPU mode (step S601). Subsequently, the waveform of the control signal input from the camera body 10 via the terminal C of the terminal connector 56 is checked (step S602). The flash CPU 65 reads the contents of the communications by reading the waveform of the control signal input from the camera body 10, and performs the operations at and after step S603.

At step S603 it is determined whether the waveform of the input control signal carries only a single pulse. If YES at step S603, the CF communication in which CF information shown in Table 3 is input from the camera body 10 via the terminal Q of the terminal connector 56 in synchronization with the clock signal input to the terminal R of the terminal connector 56 is performed (step S604) (see (b) in FIG. 5). After the CF communication is performed at step S604, a CF information resetting process in which predetermined modes of the flash device 50 are reset in accordance with the input CF communication data is performed (step S605), and the CPU speed of the flash CPU 65 is changed to the CPU speed stored in the RAM 65a at step S601 (step S617) Subsequently, a communication interrupt from the camera body 10 is enabled (step S618) and control returns to the step where the communication interrupt occurs.

If NO at step S603, it is determined whether the waveform of the input control signal carries two successive pulses (step S606). If YES at step S606, the FC communication is performed, wherein FC information shown in Table 1 is output from the flash device 50 (external flash device) to the camera body 10 via the terminal Q of the terminal connector 56 in synchronization with the clock signal input to the terminal R of the terminal connector 56 (step S607)(see (c) in FIG. 5).

If NO at step S606, it is determined whether the waveform of the input control signal carries three successive pulses (step S608). If YES at step S608, a normal flash emission process ("Normal Flash Emission Process" shown in FIG. 26) is performed (step S609).

If NO at step S608, it is determined whether the waveform of the input control signal carries four successive pulses (step S610). If YES at step S610, a special flash emission process ("Special Flash Emission Process" shown in FIG. 23) is performed (step S611). In the special flash emission process, the flash device 50 performs predetermined operations in accordance with the currently-set flash mode setting.

If NO at step S610, it is determined whether the waveform of the input control signal carries only a leading edge (step S612). If YES at step S612 (see (a) in FIG. 5), an F_COn flag is set to 1 (step S613) and the F_CRequest is set to 1 (step S614). Subsequently, control proceeds to step S617. The F_COn flag is set to 1 and 0 when the camera is in a state of working and a non-working state, respectively.

If NO at step S612, it is determined whether the waveform of the input control signal carries only a trailing edge (step S615). If YES at step S615 (see (d) in FIG. 5), an F_COn flag is set to 0 (step S616). Subsequently, control proceeds to step S617. If the F_COn flag remains 0 for over a predetermined period of time (e.g., five minutes), the flash CPU 65 enters the sleep mode to reduce the power consumption thereof.

If NO at step S615 (i.e., if the waveform of the input control signal does not bear any of one through four pulses or even any leading or trailing edge), control proceeds to step S617 at which the CPU speed of the flash CPU 65 is changed to the CPU speed stored in the RAM 65a at step S601. Subsequently, a communication interrupt from the camera body 10 is enabled (step S618) and control returns to the step where the communication interrupt occurs.

Special Flash Emission Process

Figure 23:
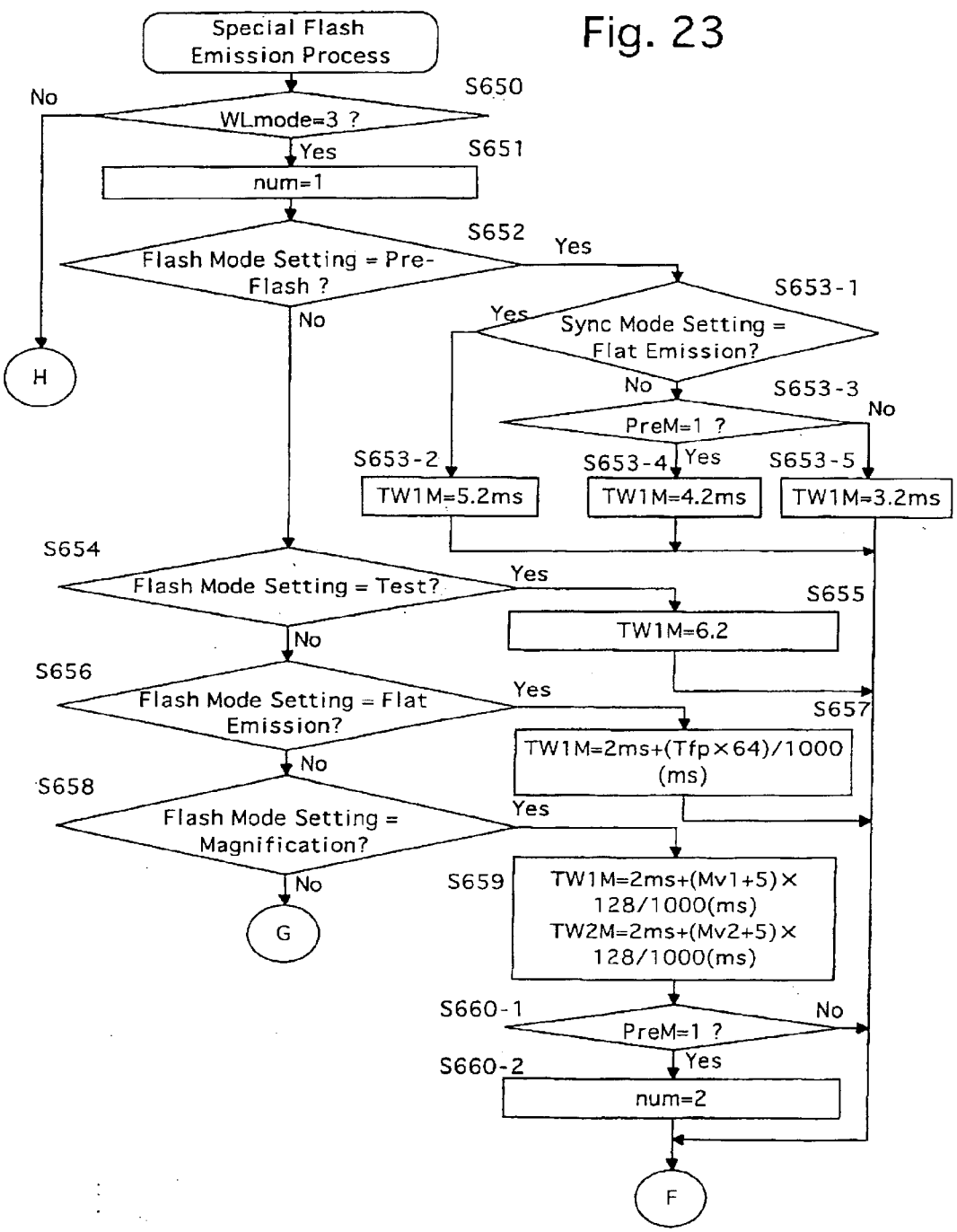
FIG. 23 is the first half of a flow chart for a special flash emission process performed by the CPU of the flash device.
Figure 24:
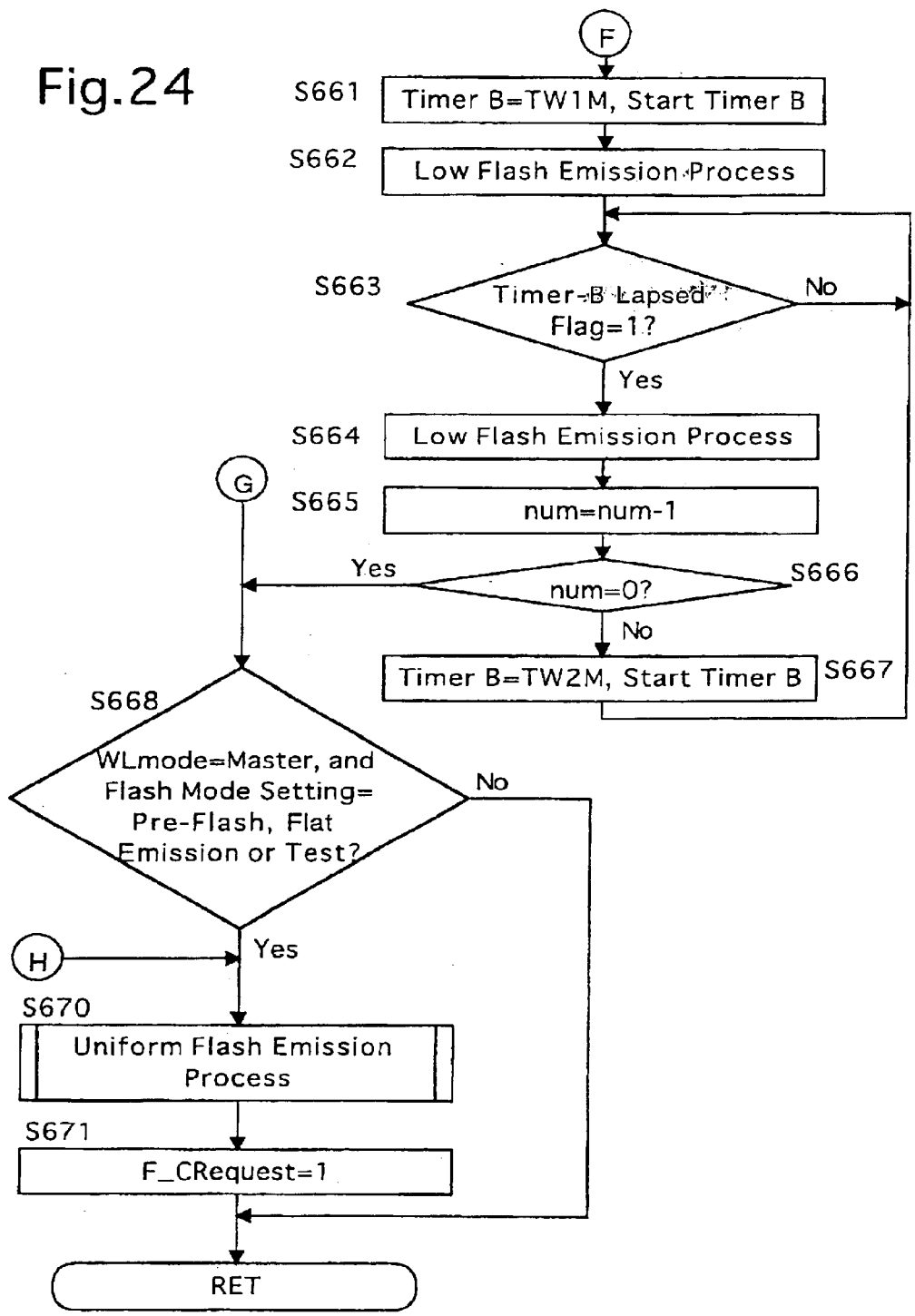
FIG. 24 is the second half of the flow chart for the special flash emission process.

The special flash emission process performed at step S611 will be hereinafter discussed in detail with reference to the flow chart shown FIGS. 23 and 24. The special flash emission process is performed when the flash device 50 inputs the waveform of the control signal carrying four successive pulses via the terminal C of the terminal connector 56. In the special flash emission process, firstly it is determined whether the variable WLmode is 3 (step S650). The variable WLmode "3" represents the mode in which the slave flash device is controlled by wireless control.

If the variable WLmode is 3 (if YES at step S650), a variable num is set to 1 (step S651), and subsequently the external flash device emits two successive low flash emissions serving as a wireless signal (a pre-flash emission command wireless signal) via operations at steps S652 through S667.

It is determined whether the flash mode setting designates the pre-flash emission mode (step S652). If the flash mode setting designates the pre-flash emission mode (if YES at step S652), it is determined whether the sync mode setting designates the flat emission mode (step S653-1). If the sync mode setting designates the flat emission mode (if YES at step S653-1), the wireless signal interval TW1M is set to 5.2 ms (step S653-2) and subsequently control proceeds to step S661 shown in FIG. 24. If the sync mode setting does not designate the flat emission mode (if NO at step S653-1), it is determined whether the pre-flash emission mode PreM is 1 (step S653-3). If the pre-flash emission mode PreM is 1 (if YES at step S653-3), the wireless signal interval TW1M is set to 4.2 ms (step S653-4) and subsequently control proceeds to step S661. If the pre-flash emission mode PreM is not 1 (if NO at step S653-3), the wireless signal interval TW1M is set to 3.2 ms (step S653-5) and subsequently control proceeds to step S661.

If the flash mode setting does not designate the pre-flash emission mode (if NO at step S652), it is determined whether the flash mode setting designates the test flash mode (step S654). If the flash mode setting designates the test flash mode (if YES at step S654), the wireless signal interval TW1M is set to 6.2 ms (step S655), and subsequently control proceeds to step S661.

If the flash mode setting does not designate the test flash mode (if NO at step S654), it is determined whether the flash mode setting designates the flat emission mode (step S656). If the flash mode setting designates the flat emission mode (if YES at step S656), the wireless signal interval TW1M is set at the value calculated from the aforementioned equation "TW1M=2 ms+(Tfp×64)/1000 (ms)" (at step S657), and subsequently control proceeds to step S661. "Tfp" in this equation designates the uniform flash-emission duration Tfp (ms). The uniform flash-emission duration Tfp of the slave flash device is determined by the wireless signal interval TW1M determined at step S406 if the flash mode setting designates the flat emission mode.

If the flash mode setting does not designate the flat emission mode (if NO at step S656), it is determined whether the flash mode setting designates the light-magnification flash mode (step S658). If the flash mode setting designates the light-magnification flash mode (if YES at step S658), the wireless signal interval TW1M is set to the value calculated from the aforementioned equation "TW1M=2 ms+(Mv1+5)×$^{128}$/$_{1000}$ (ms)", and subsequently the wireless signal interval TW2M is set to the value calculated from the aforementioned equation "TW2M=2 ms+(Mv2+5)×$^{128}$/$_{1000}$ (ms)" (step S659). Subsequently, it is determined whether the pre-flash emission mode PreM is 1 (step S660-1). If the pre-flash emission mode PreM is 1 (if YES at step S660-1), the variable num is set to 2, and subsequently control proceeds to step S661 shown in FIG. 24. If the pre-flash emission mode PreM is not 1 (if NO at step S660-1), control proceeds straight from step S660-1 to step S661 shown in FIG. 24.

If the flash mode setting does not designate the light-magnification flash mode (if NO at step S658) control proceeds to step S668.

Table 6 below shows the one-to-one correspondence between the flash mode setting and the wireless signal interval TW1M.

TABLE 6

| Flash Mode Setting | Condition | Interval [ms] | Wave form |
| --- | --- | --- | --- |
| Pre-Flash Emission Mode | PreM = 0 | 3.2 | Tw1 |
|  | PreM = 1 | 4.2 | Tw1 |
|  | Sync Mode Setting = Flat Emission | 5.2 | Tw1 |
| Test Flash Emission Mode |  | 6.2 | Tw1 |
| Light-Magnification Flash Emission Mode |  | WM = 2~3 | Tw1, Tw2 |
| Flat Emission | Sync Mode Setting = Flat Emission | WT = 2~3 | Tw1 |
| (Main Flash Emission)*1 | Flash Mode Other Than Flat Emission Mode |  | (1) *1 |

It should be noted that the item bearing a symbol "*1" in Table 6 represents the main-flash emission command wireless signal when the slave flash device is activated to emit the main flash in the normal flash emission mode. A single low flash emission of the built-in flash or the external flash device, which serves as the main-flash emission command wireless signal, is transmitted to the slave flash device after the pre-flash emission command wireless signal or the light-magnification command wireless signal is transmitted to the slave flash device. In each of FIGS. 6E and 6F, the first pulse (1) (the left pulse) in the waveform of the wireless signal corresponds to the main-flash emission command wireless signal.

At step S661, the timer B is set for the value of the wireless signal interval TW1M, and the timer B is started (step S661). After the timer B is started, a low flash emission process is performed (step S662). In the low flash emission process, the xenon flashtube 82 of the flash device 50 is activated to discharge to emit a low flash emission for 30 µs as a wireless signal which is transmitted the slave flash device. More specifically, in the flash emission process, the signal 30 Von, which is output from the output port P4 of the flash CPU 65 to be input to the 30-volt generating circuit 77, is set to "1", and at the same time the signal IGBTctl, which is output from the output port P5 to be input to the level shift circuit 78, is set to "1" to switch the IGBT 83 ON. In the ON state of the IGBT 83, a signal TRIGon, which is output from the output port P3 of the flash CPU 65 to be input to the trigger circuit 80, is set to "1" to thereby cause the xenon flashtube to start discharging. Thereafter, the signal IGBTctl is changed from "1" to "0" to switch the IGBT 83 OFF to thereby cause the xenon flashtube to stop discharging upon the lapse of 30 µs since the signal TRIGon was set to "1". In the operation at step S662, the xenon flashtube 82 of the flash device 50 is activated to discharge to emit the first low flash emission, which is represented by the first pulse (1) shown in FIG. 6E or 6F.

After the low flash emission process is performed at step S662, it is determined whether the timer-B lapsed flag is 1 (step S663). If the timer-B lapsed flag is not 1 (if NO at step S663), control repeats the checking operation at step S663. If the timer-B lapsed flag is 1 (if YES at step S663), the low flash emission process is performed again (step S664). In the operation at step S664, the xenon flashtube 82 of the flash device 50 is activated to discharge to emit the second low flash emission, which is represented by the second pulse (2) shown in FIG. 6E or 6F.

Subsequently, the variable num is decremented by one (step S665) and it is determined whether the variable num is 0 (step S666). If the variable num is not 0 (if NO at step S666), the timer B is set to the value of the wireless signal interval TW2M, and the timer B is started (step S667), and subsequently control returns to step S663 to emit the third low flash emission, which is represented by the third pulse (3) shown in FIG. 6F. If the variable num is 0 (if YES at step S666), control proceeds to step S668 since the wireless signal transmitting operation in the special flash emission process has been completed.

At step S668, it is determined whether the wireless master mode has been set via the wireless mode setting switch 63c and whether the currently-set flash mode setting designates one of the pre-flash emission mode, the flat emission mode, or the test flash mode. If the wireless master mode has been set and the currently-set flash mode setting designates the pre-flash emission mode, the flat emission mode or the test flash mode (if YES at step S668), a uniform flash-emission process (Uniform flash-emission Process" shown in FIG. 25) is performed in accordance with the flash mode setting (step S670) The operation at step S668 considers the case where the wireless master mode has been set and where more than one flash is used. After the uniform flash-emission process is performed, the F_CRequest flag is set to 1 (step S671), and control returns to the communication interrupt process shown in FIG. 22.

If the variable WLmode is not 3 at step S650, the uniform flash-emission process is performed in accordance with the flash mode setting (step S670), subsequently the F_CRequest flag is set to 1 (step S671) and subsequently control returns to the communication interrupt process shown in FIG. 22.

Uniform Flash-emission Process

The uniform flash-emission process performed at step S670 will be hereinafter discussed in detail with reference to the timing chart shown in FIG. 7 and the flow chart shown in FIG. 25.

In the uniform flash-emission process, firstly, a uniform flash-emission level (a pre-flash emission level) Vfp is calculated at step S700 using the following equation:

$$Vfp = Va \times T\_fire(zoom)$$

wherein "Va" represents the reference flash emission level; and "zoom" represents the zoom position (mm). T_fire(zoom) is calculated using the following equation:

$T\_fire(zoom) \approx (Gnos/Gno(zoom))^2$; wherein Gnos represents the reference guide number.

The reference guide number Gnos is a constant which can be freely set at any number. In the present embodiment of the flash photography system, the reference guide number Gnos is set at 36. Table 7 below shows the relationship among the zoom position (focal length), the guide number Gno and the T_fire(zoom). The guide number Gno of A-type flash is greater than that of B-type flash.

TABLE 7

| Flash Type | Zoom Position (mm) | 24 | 28 | 35 | 50 | 70 | 85 |
|---|---|---|---|---|---|---|---|
| A | Gno | 21 | 22 | 25 | 30 | 33 | 36 |
|   | T fire (zoom) | 2.9 | 2.7 | 2.1 | 1.4 | 1.2 | 1 |
| B | Gno | 35 | 36 | 39 | 44 | 47 | 50 |
|   | T fire (zoom) | 1.06 | 1 | 0.85 | 0.67 | 0.58 | 0.52 |

In Table 7, the reference guide number Gnos "36" is the reference guide number Gnos at the time a type-A flash device discharges at the maximum with the zoom position set at 85 mm, or at the time a type-B flash device discharges at the maximum with the zoom position set at 28 mm. The maximum guide number Gno varies in accordance with a variation of the zoom position, and is the value at the time each type flash discharges at the maximum at each zoom position. The reference flash emission level Va is a constant for correcting the dispersion of the amount of flash light emission emitted by each flash, and is stored in the EEPROM 60.

The zoom positions shown in Table 7 are determined by the flash CPU 65 so that an illumination angle suitable for the focal length of the photographing lens can be obtained. In the present embodiment of the flash photography system, the space between the Fresnel lens 55a and the light emitting unit 55 (see FIG. 4B) is represented by the zoom position (mm) which is the converted value of the focal length f. For instance, the zoom position is set at 24 mm when the focal length f of the photographic lens is 24 mm. In this case, the light emitting unit 55 is moved to a position where the space between the Fresnel lens 55a and the light emitting unit 55 corresponds to 24 mm (the focal length) of the photographing lens. If the flash device 50 is not connected to the camera body 10, the zoom position can be set freely by the user.

It can be understood from Table 7 that the guide number Gno increases while the T_fire (zoom) decreases as the zoom position moves away, i.e., as the focal length increases. According to the operation at step S700, since the uniform flash-emission level Vfp is inversely proportional to the value of the Gno, the uniform flash-emission level Vfp decreases as the zoom position moves away. Consequently, the illuminance with respect to the object at a specified distance becomes constant regardless of a variation of the zoom position, i.e., the effective guide number becomes constant if the distances between flash devices in use to the object art all the same.

In the present embodiment of the flash photography system, since the reference guide number Gnos is constant regardless of flash type, the T_fire(zoom) on the B-type flash, whose guide number is greater than that of the A-type flash, is smaller than the T_fire(zoom) on the A-type flash. Consequently, in the B-type flash, whose guide number is different from that of the A-type flash, the illuminance with respect to the object at a specified distance is constant regardless of a variation of the zoom position, i.e., the effective guide number is constant if the distances between flash devices in use to the object are all the same.

After the uniform flash-emission level Vfp has been set at step S700, it is determined whether the flash mode setting designates the flat emission mode (step S701). If the flash mode setting designates the flat emission mode (if YES at step S701), the operations at steps S702 through S707 are performed to make preparations for the main flash exposure. If the flash mode setting does not designate the flat emission mode (if NO at step S701), the operations at steps S708-1 through S713 are performed to make preparations for the pre-flash emission or the test flash emission.

If the flash mode setting designates the flat emission mode (if YES at step S701), the flashlight-emitting magnification Mv is set to the flashlight-emitting magnification Mv1 which has been input via CF communication (step S702). The flashlight-emitting magnification Mv1 is input by CF communication if the flash device 50 serves as an external flash device, and is set by the light-magnification command wireless signal if the flash device 50 serves as a slave flash device. Subsequently, it is determined whether the pre-flash emission mode PreM is 1 (step S703). The second pre-flash emission mode, in which all the flash devices except the built-in flash are driven to emit a pre-flash in a predetermined order, has been set when the pre-flash emission mode PreM is 1. If the pre-flash emission mode PreM is 1 (if YES at step S703), it is determined whether the sync mode request requests the successive sync flash mode (step S704). If the sync mode request requests the successive sync flash mode (if YES at step S704), the flashlight-emitting magnification Mv is set to the flashlight-emitting magnification Mv2 which has been input from via CF communication (step S705), and control proceeds to step S706. The flashlight-emitting magnification Mv2, similar to the flashlight-emitting magnification Mv1, is input by CF communication if the flash device 50 serves as an external flash device, and is set by the light-magnification command wireless signal if the flash device 50 serves as a slave flash device. If the pre-flash emission mode PreM is not 1 (if NO at step S703), or if the sync mode request does not request the successive sync flash mode (if NO at step S704) even if the pre-flash emission mode PreM is 1, control skips the operation at step S705, so that control proceeds straight from step S703 to S706 or from step S704 to S706. At step S706, the output level of the voltage FPlvl, which is to be output from the D/A conversion port Pda, is calculated using the following equation:

$$FPlvl = Vfp \times 2^{Mv};$$

and subsequently the voltage FPlvl is output from the D/A conversion port Pda to be supplied to the non-inverting input terminal of the comparator 75. Subsequently, the timer B is set for the sum of the uniform flash-emission duration Tfp and 3 ms, and subsequently the timer B is started (step S707). The time "3 ms" is added to the uniform flash-emission duration Tfp (mm) just in case the uniform flash-emission duration Tfp is insufficient.

On the other hand, if the flash mode setting does not designate the flat emission mode (if NO at step S701), it is determined whether the flash mode setting designates the test flash mode (step S708-1). If the flash mode setting designates the test flash mode (if YES at step S708-1), the output level of the voltage FPlvl is set to a voltage Vb, and subsequently the voltage FPlvl is output from the D/A conversion port Pda (step S708-2). The voltage Vb is determined so that the flash device 50 discharges at the inverse of specified times of the maximum light amount of the flash emission (Mv=0 EV) which can be emitted at each zoom position of the flash device 50. In the present embodiment of the flash photography system, the voltage Vb is determined so that the flash device 50 discharges at an $\frac{1}{16}$ (Mv=−4 EV) at each zoom position of the flash device 50. The voltage Vb is stored in the EEPROM 60. If the flash mode setting does not designate the test flash mode (if NO at step S708-1), the output level of the voltage FPlvl is calculated at step S708-3 using the following equation:

$$FPlvl = Vfp \times PreP;$$ and subsequently the voltage FPlvl is output from the D/A conversion port Pda.

Figure 12:
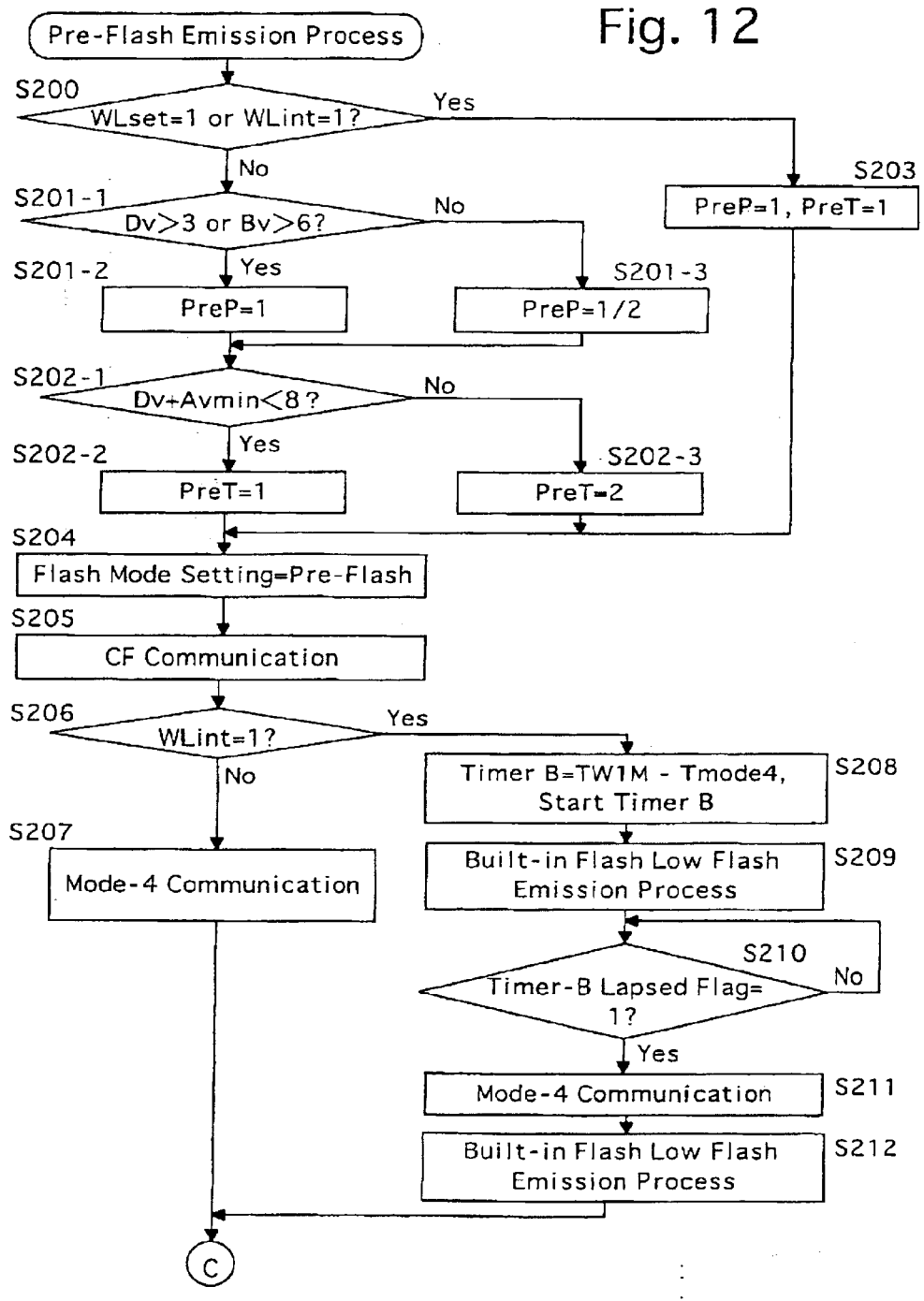
FIG. 12 is the first half of a flow chart for a pre-flash emission process performed by the CPU of the camera body.
Figure 13:
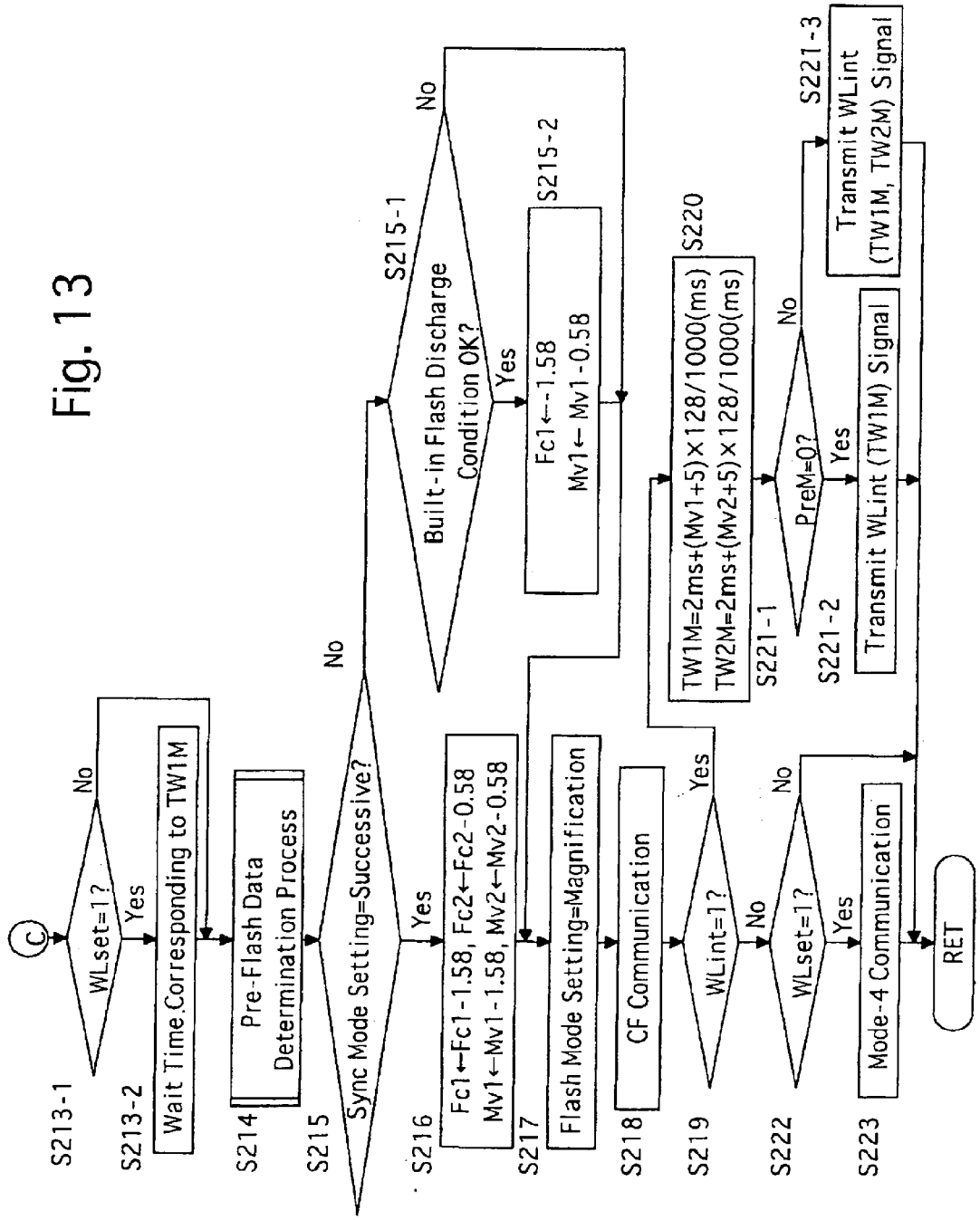
FIG. 13 is the second half of the flow chart for the pre-flash emission process.

The pre flash intensity PreP is determined via the above described operations at steps S202-1, S202-2 and S202-3 shown in FIG. 12.

Subsequently, it is determined whether the pre-flash emission mode PreM is 1 (step S709). If the pre-flash emission mode PreM is 1 (if YES at step S709), it is determined whether the sync mode request requests the successive sync flash mode (step S710).

If the sync mode request requests the successive sync flash mode (if YES at step S710), the timer B is set to 2.5 ms and started (step S711). Subsequently, it is determined whether the timer-B lapsed flag is 1 (step S712) If the timer-B lapsed flag is not 1 (if NO at step S712), control repeats the checking operation at step S712. If the timer-B lapsed flag is 1 (if YES at step S712), the timer B is set to the pre-flash duration PreT (step S713) and subsequently control proceeds to step S714.

If the pre-flash emission mode PreM is not 1 (if NO at step S709), or if the sync mode request does not request the successive sync flash mode (if NO at step S710), control skips the operations at steps S711 and S712, and therefore proceeds straight from step S709 to S713 or from step S710 to S713. In this case, the timer B is set for the pre-flash duration PreT at step S713 to emit the first pre-flash emission, which is represented by the first pulse (1) shown in FIG. 6D. Subsequently, control proceeds to step S714.

The time T0 shown in FIG. 7 shows an initial state of the uniform flash-emission process. In this initial state, the output ports P4 (the signal 30 Von), P5 (the signal IGBTctl) and P7 of the flash CPU 65 are all set to "0" via the operation at step S500. The port P6 is set to serve as an input port, while the voltage FPlvl is output from the D/A conversion port Pda to be input to the non-inverting input terminal of the comparator 75. In this state, no voltage is applied to the trigger electrode XeT of the xenon flashtube 82 since the output of the port P3, i.e., the signal TRIGon is "0", so that the xenon flashtube 82 does not discharge. Consequently, the voltage PDfl that is input to the inverting input terminal of the comparator 75 is "0" since no photocurrent is output from the light-receiving element 85, so that the output of the comparator 75 is "0".

At step S714 the output port P4, i.e., the signal 30 Von is changed from "0" to "1" (at a time T1 shown in FIG. 7). Upon this change of the signal 30 Von, a voltage of 30 volts is output from the 30-volt generating circuit 77 to be applied to the level shift circuit 78.

Subsequently, the output port P5, i.e., the signal IGBTctl is changed from "0" to "1" at step S715 (at a time T2 shown in FIG. 7). This causes the level shift circuit 76 to apply the voltage of 30V, which is given to the level shift circuit 76 from the 30-volt generating circuit 77, to the gate IGBTg of the IGBT 83 in order to switch the IGBT 83 ON.

Subsequently, the output port P3, i.e., the signal TRIGon is changed from "0" to "1" at step S716 (at a time T3 shown in FIG. 7). Upon this change of the signal TRIGon, the trigger circuit 80 applies an oscillating high voltage to the trigger electrode XeT of the xenon flashtube 82 to render xenon gas filled therein in an excitation state to thereby cause the xenon flashtube 82 to discharge. Namely, the electric charges accumulated in the main capacitor 79 are discharged via the coil 81, the xenon flashtube 82 and the IGBT 83.

Subsequently, the timer B which has been set at step S707 or S713 is started (step S717), the port P5, i.e., the signal IGBTctl is set to serve as an input port (step S718) and the output port P3, i.e., the signal TRIGon is set to "0" (step S719). The state of the port P5 after it has been set as input port at step S718 is equivalent to the state where the port P5 is electrically disconnected from each of the resistor 76 and the comparator 78. In this state, the output of the comparator 75 is input to the level shift circuit 78 as the signal IGBTctl. The reason why the port P5 is set to serve as an input port at step S718 is that the comparator 75 and other elements may malfunction due to the oscillating high voltage applied to the trigger electrode XeT of the xenon flashtube 82. However, the xenon flashtube 23 discharges stably even if such a malfunction occurs by changing the port P5 from an output port to an input port.

Upon a commencement of the discharge of the xenon flashtube 82 due to the operation at step S716, the voltage PDfl that corresponds to the amount of light emission of the xenon flashtube 82 is input to the inverting input terminal of the comparator 75. Subsequently, immediately after the voltage PDfl reaches the voltage FPlvl (at a time T4 shown in FIG. 7), the output of the comparator 75, i.e., the signal IGBTctl, changes from "1" to "0" to thereby switch the IGBT 83 OFF via the level shift circuit 78. In this state, the electric charges accumulated in the main capacitor 79 are stopped discharging via the IGBT 83, while the electric charges accumulated in the coil 81 are discharged via the xenon flashtube 82 and the diode 84. This reduces the amount of light emission of the xenon flashtube 82, and at the same time the voltage PDfl drops.

Subsequently, immediately after the voltage PDfl becomes smaller than the predetermined voltage FPlvl (at a time T5 shown in FIG. 7), the output, i.e., the signal IGBTctl of the comparator 75 changes from "0" to "1" to thereby switch the IGBT 83 ON. This causes the xenon flashtube 82 to resume discharging via the IGBT 83 to thereby increase the amount of light emission of the xenon flashtube 82. It is unnecessary to apply the oscillating high voltage to the trigger electrode XeT of the xenon flashtube 82 at the time T5 since the excitation state of the xenon flashtube 82 has continued at the time T5.

It is determined at step S720 whether the timer-B lapsed flag is 1. If the timer-B lapsed flag is not 1 (if NO at step S720), control repeats the checking operation at step S720. If the timer-B lapsed flag is 1 (if YES at step S720), control proceeds to step S721. The above described ON/OFF operation of the IGBT 83 is rapidly repeated until it is determined at step S720 that the timer-B lapsed flag is 1, and accordingly the amount of light emission of the xenon flashtube 82 is maintained substantially constant until the timer B (Tfp+3 ms) expires (see FIG. 6C).

If the timer-B lapsed flag is 1 (if YES at step S720) it is determined whether the output port P5, i.e., the signal IGBTctl, has changed from "1" to "0" (step S721). If the output port P5 has not yet changed from "1" to "0" (if NO at step S721), control repeats the checking operation at step S721. Namely, control waits until the input port P5, i.e., the signal IGBTctl, changes from "1" to "0" at step S721. This prevents the IGBT 84 from being damaged. If the signal IGBTctl of the output port P5 has changed from "1" to "0" (if YES at step S721), the port P5 is changed to an output port to output a signal of "0" to thereby switch the IGBT OFF (step S722). Subsequently, the F_CRequest flag is set to 1 (step S723) and control returns.

Due to the above described uniform flash-emission process, the flash device 50 discharges to emit a uniform flash-emission (as the main flash emission, the pre-flash emission or the test flash emission) so that the illuminance with respect to the object at a specified distance is constant regardless of a variation of the illumination angle of the flash device 50 or the maximum guide number. This establishes proportional relationship between the determined object brightness data and the photographic distance data on condition that the reflectivity of the object is constant. Therefore, the reflectivity of the object can be determined precisely, thus making it possible to attain correct exposure of the object. Accordingly, correct exposure can be attained for the main object even if a plurality of flash devices of different guide numbers are used at the same time. Furthermore, correct exposure can be attained on the main object if such a plurality of flash devices are controlled by wireless control.

Normal Flash Emission Process

Figure 26:
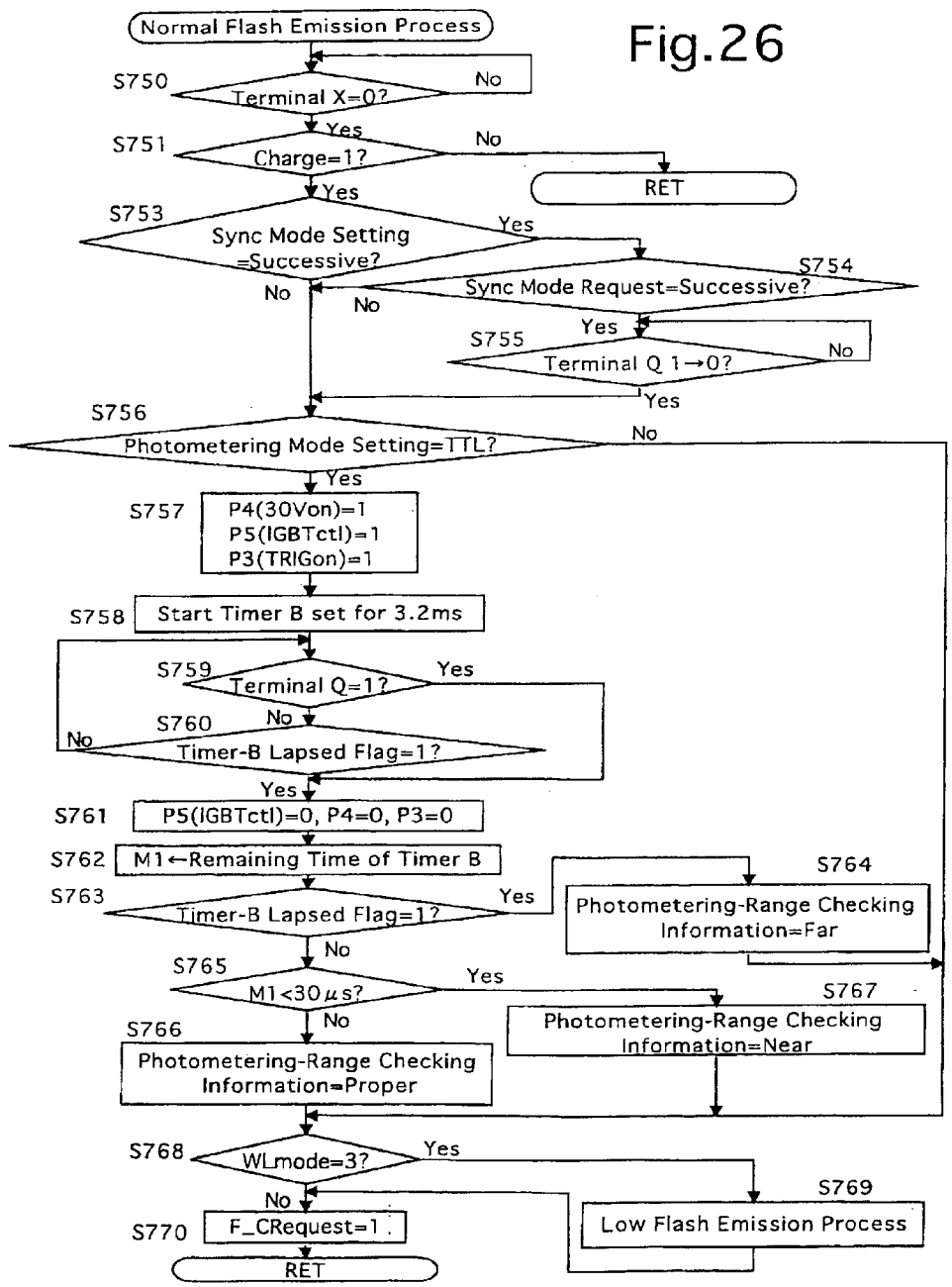
FIG. 26 is a flow chart for a normal flash emission process performed by the CPU of the flash device.

The normal flash emission process performed at step S609 will be hereinafter discussed in detail with reference to the timing charts shown in FIGS. 6A, 6B and the flow chart shown in FIG. 26. The normal flash emission process is performed when the control signal with three successive pulses, which represents the normal-flash-emission command signal, is input to the flash CPU 65 via the terminal C thereof on condition that the flash device 50 is coupled to the camera body 10 as external flash device (see FIGS. 6A and 6B).

In the normal flash emission process, firstly it is determined whether the terminal X is "0" (step S750). If the terminal X is not "0" (if NO at step S750), control repeats the checking operation at step S750 until the terminal X becomes "0". If the terminal X is "0" (if YES at step S750), it is determined whether the Charge flag is 1 (step S751). If the Charge flag is not 1 (if NO at step S751), i.e., if the flash charging operation has not yet completed, control returns to the communication interrupt process shown in FIG. 22. If the Charge flag is 1 (if YES at step S751), it is determined whether the sync mode setting designates the successive sync flash mode (step S753). If the sync mode setting designates the successive sync flash mode (if YES at step S753), it is determined whether the sync mode request requests the successive sync flash mode (step S754). If the sync mode request requests the successive sync flash mode (if YES at step S754), it is determined whether the terminal Q has changed from "1" to "0" (step S755). If the terminal Q has not yet changed from "1" to "0" (if NO at step S755), control repeats the checking operation at step S755 until the terminal Q becomes "0" to activate the flash device to discharge in response to the trailing edge of the quench signal output from the terminal Q. If the terminal Q becomes "0" (if YES at step S755), control proceeds to step S756. On the other hand, if it is determined at step S753 that the sync mode setting does not designate the successive sync flash mode, or if it is determined at step S754 that the sync mode request does not request the successive sync flash mode, control proceeds to step S756 to activate the flash device to discharge in response to the trailing edge of the signal output from the terminal X.

At step S756 it is determined whether the photometering mode setting designates the TTL photometering mode. If the photometering mode setting does not designate the TTL photometering mode (if NO at step S756), control proceeds to step S768. On the other hand, if the photometering mode setting designates the TTL photometering mode (if YES at step S756), the output port P4 of the flash CPU 65, i.e., the signal 30 Von, is set to "1" to thereby cause the 30-volt generating circuit 77 to generate a voltage of 30 volts, the output port P5, i.e., the signal IGBTctl is set to "1" to switch the IGBT 83 ON via the level shift circuit 78, and the output port P3, i.e, the signal TRIGon is set to "1" to thereby cause the xenon flashtube 82 to start discharging (step S757).

Subsequently, the timer B, which times the maximum flash emission duration, is set to 3.2 ms and started (step S758). Subsequently, it is determined whether the terminal Q is "1" (step S759). If the terminal Q is not "1" (if NO at step S759), it is determined whether the timer-B lapsed flag is 1 (step S760). If the timer-B lapsed flag is not 1 (if NO at step S760), control returns to step S759 to repeat the operations at steps S759 and S760. If the terminal Q is "1" (if YES at step S759), or if the timer-B lapsed flag is 1 (if YES at step S760) even if the terminal Q is not "1", the output port P5, i.e., the signal IGBTctl is set to "0" to switch the IGBT 83 OFF via the level shift circuit 78, and at the same time, the output ports P3, i.e., the signal TRIGon and P4, i.e., the signal 30 Von are reset to "0" (step S761). Subsequently, the remaining time of the timer B is stored in the RAM 65a as a variable M1 (step S762).

Subsequently, it is determined whether the timer-B lapsed flag is 1 (step S763). If the timer-B lapsed flag is 1 (if YES at step S763), i.e., if the terminal Q does not become "1" before the timer B expires, "Far" is set as the photometering-range checking information (step S764). The terminal Q does not become "1" before the timer B expires when the output of the operational amplifier 202 does not reach the predetermined voltage T_ttl(x) because of the amount of the light received by the TTL direct photometering sensor 23 being small. Therefore, when the terminal Q does not become "1" before the timer B expires, it is assumed that the photographic object is located at a distance farther from the range of flash photometering control of the flash device or that the reflectivity of the photographic object is smaller than a reference reflectivity. The set photometering-range checking information is transmitted to the camera body 10 in the communication information process at step S508.

If the timer-B lapsed flag is not 1 (if NO at step S763), it is determined whether the remaining time of the timer B, i.e., variable M1, which has been stored in the RAM 65a is smaller than 30 µs (step S765). The time span 30 µs is the shortest time for the flash photometering operation with relative high precision from the moment the flash device starts discharges. If the remaining time of the timer B (variable M1) which has been stored in the RAM 65a is smaller than 30 µs (if YES at step S765), "Near" is set as the photometering-range checking information (step S767). In this case, it is assumed that the photographic object is located at a distance nearer to the range of flash photometering control of the flash device or that the reflectivity of the photographic object is greater than the reference reflectivity. If the remaining time of the timer B (variable M1) which has been stored in the RAM 65a is not smaller than 30 µs (if NO at step S765), "Proper" is set as the photometering-range checking information (step S766). In this case, it is assumed that the photographic object is located at a distance within the range of flash photometering control of the flash device or that the reflectivity of the photographic object is about the same as the reference reflectivity.

After "Proper", "Near", or "Far" has been set as the photometering-range checking information, it is determined whether the variable WLmode is 3 (step S768). If the variable WLmode is 3 (if YES at step S768), a single low flash emission which serves as the main-flash emission command wireless signal is emitted to the slave flash device (step S769). If the variable WLmode is not 3 (if NO at step S768), control skips step S769, i.e., control proceeds straight from step S768 to step S770. At step S770 the F_CRequest flag is set to 1, and control returns to the communication interrupt process shown in FIG. 22. In the present embodiment of the flash photography system, the single low flash emission which serves as the main-flash emission command wireless signal is emitted to the slave flash device at step S769 after the main flash discharge has been completed, namely, after the TTL flash photometering operation performed during the operations at steps S757 through step S761. This prevents the TTL flash photometering operation from being influenced by the main-flash emission command wireless signal.

Figure 30:
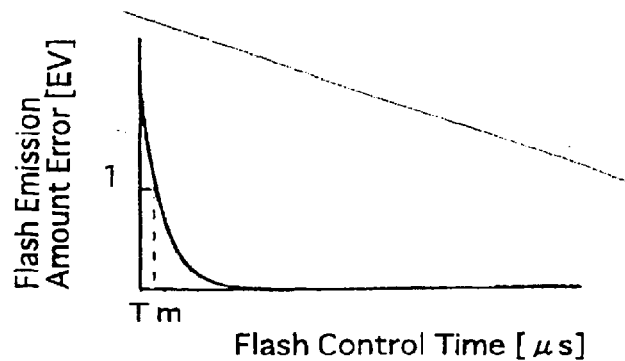
FIG. 30 is a graph showing the relationship between a flash control time Tm [μs] and a flash emission amount error [EV]

FIG. 30 is a graph showing the relationship between the aforementioned flash control time Tm [µs] and a flash emission amount error [EV]. It can be understood from the graph that the error [EV] has a tendency to increase as the flash control time Tm is shortened, due to the time lag between the moment the xenon flashtube 82 is commanded to stop discharging and the moment the xenon flashtube 82 actually stops discharging, and other factors. In the present embodiment of the flash photography system, the flash control time Tm with which the flash emission amount error becomes 1 EV is set at 30 µs, and a state of overexposure is made known to the user by setting "Near" as the photometering-range checking information if it is determined at step S765 that the remaining time of the timer B is smaller than 30 µs . The photometering-range checking information is indicated on the information display panel 72 via the operation at step S510, and is transmitted to the camera body 10 via the communication information process at step S508 to be indicated on the information display panel 5 of the camera body 10 via the indication process at step S104. Accordingly, the user can visually check via either the information display panel 5 or the information display panel 72 if the flash photometering operation has been performed properly.

PWC Interrupt Process

Figure 27:
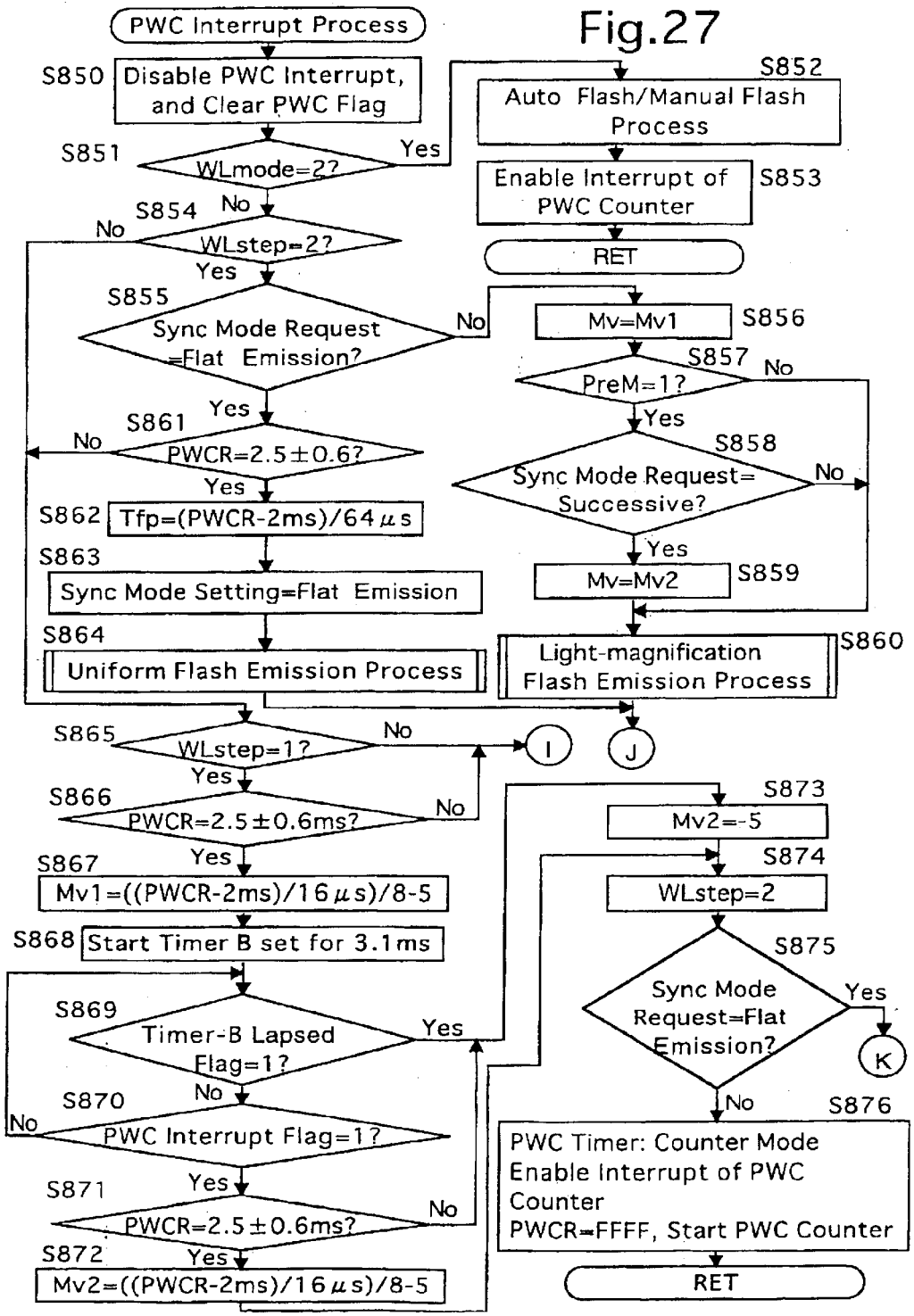
FIG. 27 is the first half of a flow chart for a PWC interrupt process performed by the CPU of the flash device.
Figure 28:
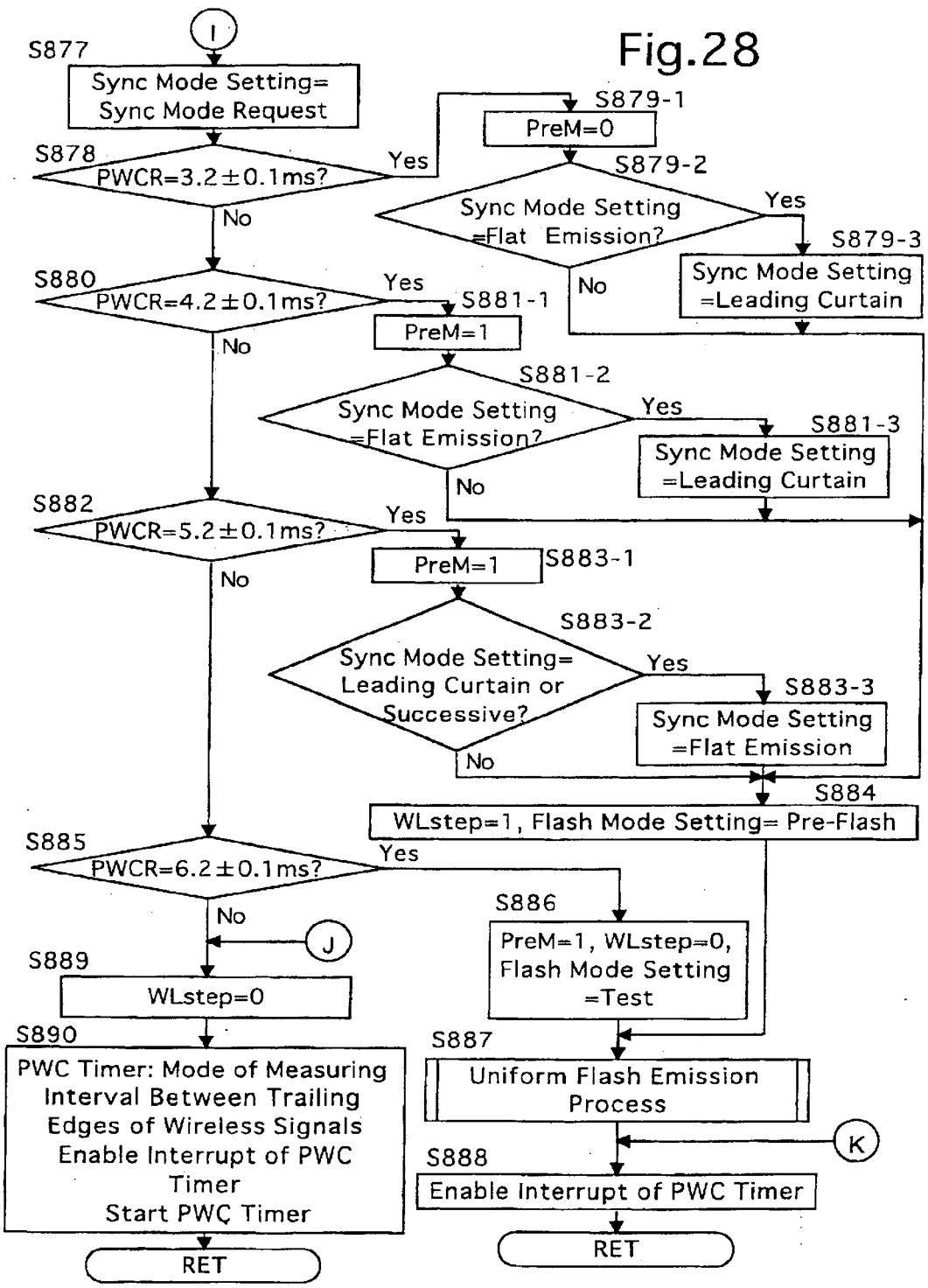
FIG. 28 is the second half of the flow chart for the PWC interrupt process.

The PWC interrupt process will be hereinafter discussed in detail with reference to the flow chart shown in FIGS. 27 and 28. The PWC interrupt process is performed when the flash device 50 serves as slave flash device (i.e., when the main switch 64 is in the WL position and at the same time the wireless slave mode has been set via the wireless mode setting switch 63c). The PWC interrupt process starts immediately after the amount of a low flash emission which is emitted by the built-in flash or the external flash device and subsequently received by the light-receiving element 57 reaches a predetermined value.

In the PWC interrupt process, firstly a subsequent PWC interrupt is disabled, and a PWC flag is set to 0 (step S850). Subsequently, it is determined whether the variable WLmode is 2 (step S851). If the variable WLmode is 2 (if YES at step S851), i.e., if in the old-system compatible mode, an auto flash/manual flash process is performed (step S852). In the auto flash/ manual flash process, if the photometering mode request requests the auto flash photometering mode, the amount of light received by the light-receiving element 71 that is connected to the auto flash circuit 70 is integrated (accumulated) by the auto flash circuit 70, and subsequently the signal IGBTctl at the output port P5 is set to "0" to stop the discharge of the xenon flashtube 82 immediately after the integrated light amount reaches a specified amount. On the other hand, in the auto flash/manual flash process, if the photometering mode request requests the manual photometering mode, the xenon flashtube 82 stops discharging immediately after a specified period of time elapses. After the auto flash/manual flash process is performed, an interrupt of the PWC counter is enabled (step S853), and control returns to the step where the PWC interrupt occurs.

If the variable WLmode is not 2 (if NO at step S851) it is determined whether the variable WLstep is 2, i.e., it is determined whether the flash CPU 65 is in a standby state of receiving the main-flash emission command wireless signal (step S854). If the variable WLstep is not 2 (if NO at step S854), it is determined whether the variable WLstep is 1, i.e., it is determined whether the flash CPU 65 is in a standby state of receiving the light-magnification command wireless signal (step S865) If the variable WLstep is not 1 either (if NO at step S865) the variable WLstep is 0, thus indicating that the standby state of receiving the main-flash emission command wireless signal. In this case, control proceeds from step S865 to step S877. At step S877 the sync mode request is set as the sync mode setting. Subsequently, an appropriate process which corresponds to the value of the register PWCR that represents the PWC counter value is performed (step S878 through step S890) The value of the register PWCR corresponds to the clocked interval between two adjacent trailing edges of the received wireless signal serving as the pre-flash emission command wireless signal, and varies in accordance with the pre-flash emission mode designated by the CPU 13 of the camera body (the first pre-flash emission mode or the second pre-flash emission mode) and the sync mode setting (see Table 6).

It is determined at step S878 whether the value of the register PWCR is in the range of ±0.1 of 3.2 ms. If the value of the register PWCR is in the range of ±0.1 of 3.2 ms (if YES at step S878), the pre-flash emission command wireless signal which designates the pre-flash emission mode PreM of "0" and a sync flash mode other than the flat emission mode (e.g., the leading curtain sync flash mode) has been received, so that the pre-flash emission mode PreM is set to "0" (step S879-1), and subsequently it is determined whether the sync mode setting designates the flat emission mode (step S879-2). If the sync mode setting designates the flat emission mode (if YES at step S879-2), the syncmode setting is changed from the flat emission mode to the leading curtain sync flash mode (step S879-3) and subsequently the variable WLstep is set to 1 while the flash mode setting is set to designate the pre-flash emission mode (step S884). Subsequently, the uniform flash-emission process shown in FIG. 25 is performed (step S887). Subsequently, an interrupt of the PWC timer is enabled (step S888) and control returns to the step where the PWC interrupt occurs. If the sync mode setting does not designate the flat emission mode (if NO at step S879-2) control proceeds straight from step S879-2 to step S884.

If the value of the register PWCR is out of the range of ±0.1 of 3.2 ms (if NO at step S878), it is determined whether the value of the register PWCR is in the range of ±0.1 of 4.2 ms (step S880). If the value of the register PWCR is in the range of ±0.1 of 4.2 ms (if YES at step S880), the pre-flash emission command wireless signal which designates the pre-flash emission mode PreM of "1" and a sync flash mode other than the flat emission mode (e.g., the leading curtain sync flash mode) has been received, so that the pre-flash emission mode PreM is set to "1" (step S881-1), and subsequently it is determined whether the sync mode setting designates the flat emission mode (step S881-2). If the sync mode setting designates the flat emission mode (if YES at step S881-2), the sync mode setting is changed from the flat emission mode to the leading curtain sync flash mode (step S881-3) and control proceeds to step S884 to perform the operations at steps S884 through step S888. If the sync mode setting does not designate the flat emission mode (if NO at step S881-2), control proceeds straight from step S881-2 to step S884.

If the value of the register PWCR is out of the range of ±0.1 of 4.2 ms (if NO at step S880), it is determined whether the value of the register PWCR is in the range of ±0.1 of 5.2 ms (step S882). If the value of the register PWCR is in the range of ±0.1 of 5.2 ms (if YES at step S882) the pre-flash emission command wireless signal which designates the pre-flash emission mode PreM of "1" and the flat emission mode has been received, so that the pre-flash emission mode PreM is set to "1" (step S883-1), and subsequently it is determined whether the sync mode setting designates one of the leading curtain sync flash mode and the successive sync flash mode (step S883-2). If the sync mode setting designates either the leading curtain sync flash mode or the successive sync flash mode (if YES at step S883-2), the sync mode setting is changed to the flat emission mode (step S888-3) and subsequently control proceeds to step S884 to perform the operations at steps S884 through step S888. If the sync mode setting does not designate either the leading curtain sync flash mode or the successive sync flash mode (if NO at step S883-2), control proceeds straight from step S883-2 to step S884. If the value of the register PWCR is out of the range of ±0.1 of 5.2 ms (if NO at step S882), it is determined whether the value of the register PWCR is in the range of ±0.1 of 6.2 ms (step S885). If the value of the register PWCR is in the range of ±0.1 of 6.2 ms (if YES at step S885) the test-flash emission command wireless signal has been received, so that the pre-flash emission mode PreM is set to "1", the variable WLstep is set to 0 because the main-flash emission command wireless signal does not need to be received, and the flash mode setting is set to designate the test flash mode (step S886). Subsequently, the uniform flash-emission process shown in FIG. 25 is performed (step S887). Subsequently, an interrupt of the PWC timer is enabled (step S888) and control returns to the step where the PWC interrupt occurs.

If the value of the register PWCR is out of the range of ±0.1 of 6.2 ms (if NO at step S885), i.e., if NO at each of steps S878, S880, S882 and S885, neither the pre-flash emission command wireless signal nor the test-flash emission command wireless signal has been received, so that the variable WLstep is set to 0 (step S889). Thereafter, the measuring mode of the PWC timer is set to a mode of measuring an interval between trailing edges of low flash emissions (wireless signals) that the light-receiving element 57 of the flash device 50 receives, an interrupt of the PWC timer is enabled, and the PWC timer is started to thereby enter a state where wireless light signal (wireless signal) can be received (step S890). Subsequently, control returns to the step where the PWC interrupt occurs. It is generally determined "YES" at one of steps S878, S880, S882 and S885. It is possible to be determined "NO" at step S885 if interfering light such as light emitted from a fluorescent lamp is received by the light-receiving element 57.

When control re-enters the PWC interrupt process after the operation at step S884 has been performed and control has returned via the operations at steps S887 and S888, the variable WLstep has been set to 1, namely, the pre-flash emission has been completed while the flash CPU 65 is in a standby state of receiving the light-magnification command wireless signal. Therefore, when control re-enters the PWC interrupt process after the operation at step S884 has been performed and control has returned via the operations at steps S887 and S888, it is determined "YES" at step S865, so that control proceeds to step S866 to receive the light-magnification command wireless signal.

At step S866 it is determined whether the value of the register PWCR is in the range of ±0.6 of 2.5 ms. If the value of the register PWCR is out of the range of ±0.6 of 2.5 ms (if NO at step S866), the received wireless signal is not the light-magnification command wireless signal, so that control proceeds to step S877. If the value of the register PWCR is in the range of ±0.6 of 2.5 ms (if YES at step S866), the flashlight-emitting magnification Mv1 is calculated at step S867 using the following equation:

$$Mv1=((PWCR-2\ ms)/16\ \mu s)/8-5.$$

For instance, the flashlight-emitting magnification Mv1 is 0 (EV) when the value of the register PWCR is 2.640 ms.

Subsequently, the timer B is set for 3.1 ms, and is started (step S868). Subsequently, it is determined whether the timer-B lapsed flag is 1 (step S869). If the timer-B lapsed flag is not 1 (if NO at step S869), it is determined whether a PWC interrupt flag is 1 (step S870). If the PWC interrupt flag is not 1 (if NO at step S870), control returns to step S869 to repeat the operations at steps S869 and S870. The PWC interrupt flag is used to determine whether a wireless signal has been received. Since the PWC interrupt is disabled when control enters the operation at step S870, whether the third low flash emission that is represented by the third pulse (3) (shown in FIG. 6F) has been received is determined via the PWC interrupt flag.

If the PWC interrupt flag is 1 (if YES at step S870) the third low flash emission that is represented by the third pulse (3) shown in FIG. 6F has been received, so that it is determined whether the value of the register PWCR is in the range of ±0.6 of 2.5 ms (step S871). If the value of the register PWCR is in the range of ±0.6 of 2.5 ms (if YES at step S871), the flashlight-emitting magnification Mv2 is calculated at step S872 using the following equation:

$$Mv2=((PWCR-2\ ms)/16\ \mu s)/8-5.$$

On the other hand, if the timer-B lapsed flag is 1 (if YES at step S869), or if the value of the register PWCR is out of the range of ±0.6 of 2.5 ms (if NO at step S871), the flashlight-emitting magnification Mv2 is set at −5 EV (step S873). This operation at step S873 is performed when the wireless signal serving as the light-magnification command wireless signal was not received or could not be received properly.

After the flashlight-emitting magnification Mv2 is set at step S872 or S873, the variable WLstep is set to 2 (step S874) and subsequently it is determined whether the sync mode setting designates the flat emission mode (step S875). In the present embodiment of the flash photography system, the flash mode at the main exposure is set in accordance with the sync mode setting designated by the pre-flash emission command wireless signal, and the main-flash emission command wireless signal which corresponds to the set flash mode is transmitted to the slave flash device.

If the sync mode setting does not designate the flat emission mode, the main flash discharge is performed in the normal flash emission mode (in the light-magnification flash emission mode shown in FIG. 29) In this case, the built-in flash or the external flash device emits a single low flash emission to transmit the same as the main-flash emission command wireless signal to the slave flash device. Therefore, if the sync mode setting does not designate the flat emission mode (if NO at step S875), the measuring mode of the PWC timer is set to the counter mode, an interrupt of the PWC timer is enabled, the register PWCR that represents the PWC counter value is loaded with FFFF, and the PWC timer is started (step S876), and thereafter control returns to the step where the PWC interrupt occurs. In the case where control returns after performing the operation at step S876, an interrupt of the PWC counter occurs immediately after a single low flash emission is emitted by the built-in flash or the external flash device, and thereafter control proceeds from step S855 to S856 via the operations at steps S850, S851 and S854.

At step S856 the flashlight-emitting magnification Mv is set to the flashlight-emitting magnification Mv1 which has been calculated at step S867. Subsequently, it is determined whether the pre-flash emission mode PreM is 1 (step S857). If the pre-flash emission mode PreM is 1 (if YES at step S857), it is determined whether the sync mode request requests the successive sync flash mode (step S858). If the sync mode request requests the successive sync flash mode (if YES at step S858), the flashlight-emitting magnification Mv is set to the flashlight-emitting magnification Mv2 obtained at step S872 or S873 (step S859), and control proceeds to step S860. If the pre-flash emission mode PreM is not 1 (if NO at step S857), or if the sync mode request does not request the successive sync flash mode (if NO at step S858) even if the pre-flash emission mode PreM is 1, control skips the operation at step S859, so that control proceeds straight from step S857 to S860 or from step S858 to S860. At step S860, a light-magnification flash emission process ("Light-Magnification Flash Emission Process" shown in FIG. 29) is performed to emit the main flash emission.

On the other hand, if the sync mode setting designates the flat emission mode (if YES at step S875), the main flash discharge is performed in the flat emission mode. In this case, the built-in flash or the external flash device emits two successive low flash emissions to transmit the same as the main-flash emission command wireless signal to the slave flash device. The interval between the two successive low flash emissions corresponds to the uniform flash-emission duration Tfp. Therefore, if the sync mode setting designates the flat emission mode (if YES at step S875), an interrupt of the PWC timer is enabled (step S888) and control returns to the step where the PWC interrupt occurs. In the case where control returns after performing the operation at step S888, an interrupt of the PWC timer occurs immediately after the first low flash emission is received, and thereafter control proceeds from step S855 to S861 via the operations at steps S850, S851 and S854.

At step S861 it is determined whether the counter value of the PWC timer, or the value of the register PWCR, which represents the interval between two successive low flash emissions serving as the main-flash emission command wireless signal, is in the range of ±0.6 of 2.5 ms. If the value of the register PWCR is out of the range of ±0.6 of 2.5 ms (if NO at step S861), control proceeds to step S865 without the uniform flash-emission process being performed. This is because the received main-flash emission command wireless signal does not correspond to the duration of the uniform flash-emission. On the other hand, if the value of the register PWCR is in the range of ±0.6 of 2.5 ms (if YES at step S861), the uniform flash-emission duration Tfp (ms) is calculated at step S862 using the following equation:

$$Tfp=(PWCR-2 \text{ ms})/64 \text{ }\mu s \text{ (ms)}.$$

For instance, the uniform flash-emission duration Tfp is 10 ms when the value of the register PWCR is 2.640 ms.

Figure 25:
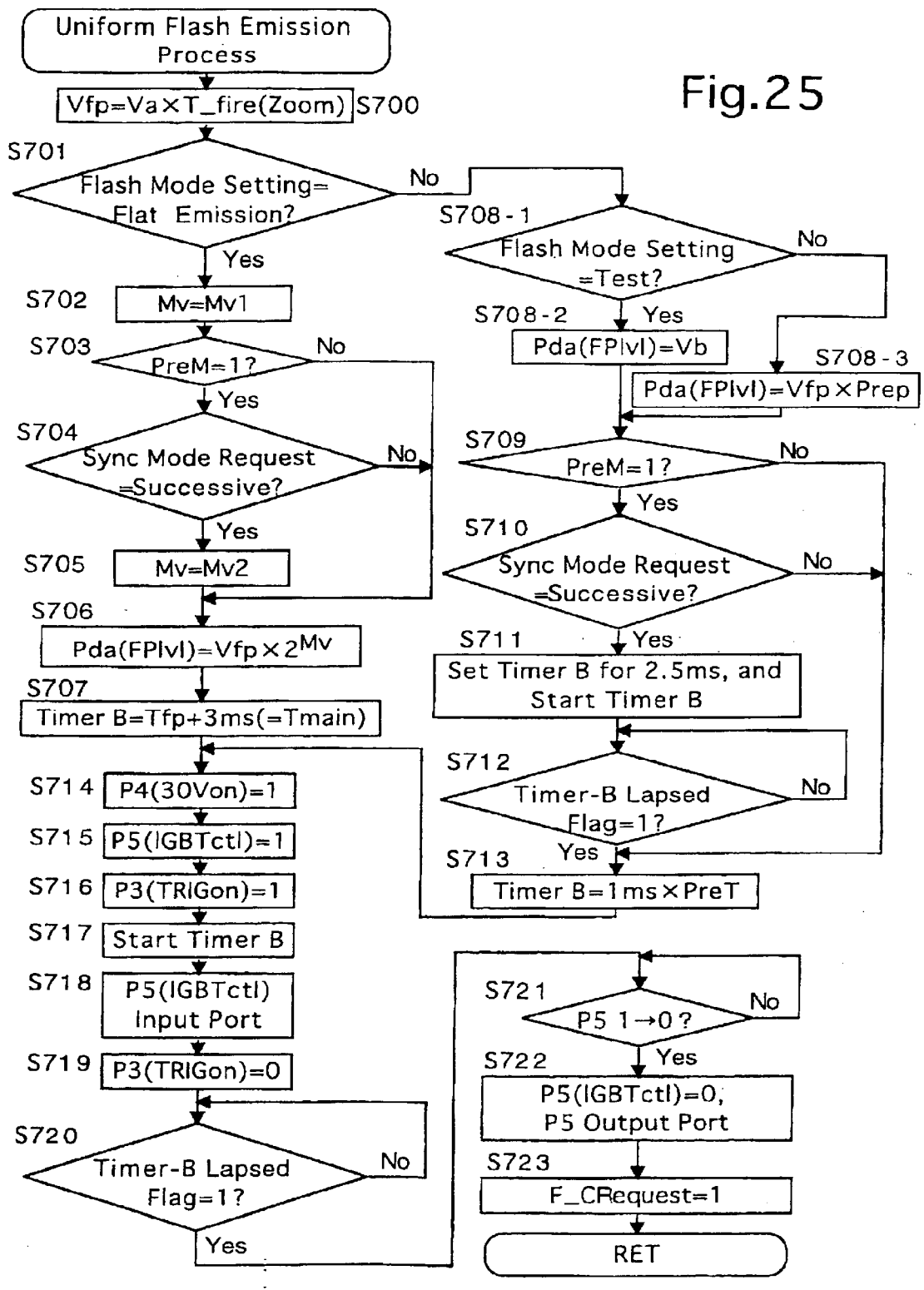
FIG. 25 is a flow chart for a uniform flash-emission process performed by the CPU of the flash device.

Subsequently, the flash mode setting is changed to the flat emission mode (step S863), and the uniform flash-emission process shown in FIG. 25 is performed to emit a uniform flash-emission as the main flash emission (step S864).

After the main flash emission is completed at step S860 or S864, the variable WLstep is set to 0 (step S889), the measuring mode of the PWC timer is set to the mode of measuring an interval between trailing edges of low flash emissions (wireless signals) that the light-receiving element 57 of the flash device 50 receives, an interrupt of the PWC timer is enabled, and the PWC timer is started (step S890).

Light-Magnification Flash Emission Process

Figure 29:
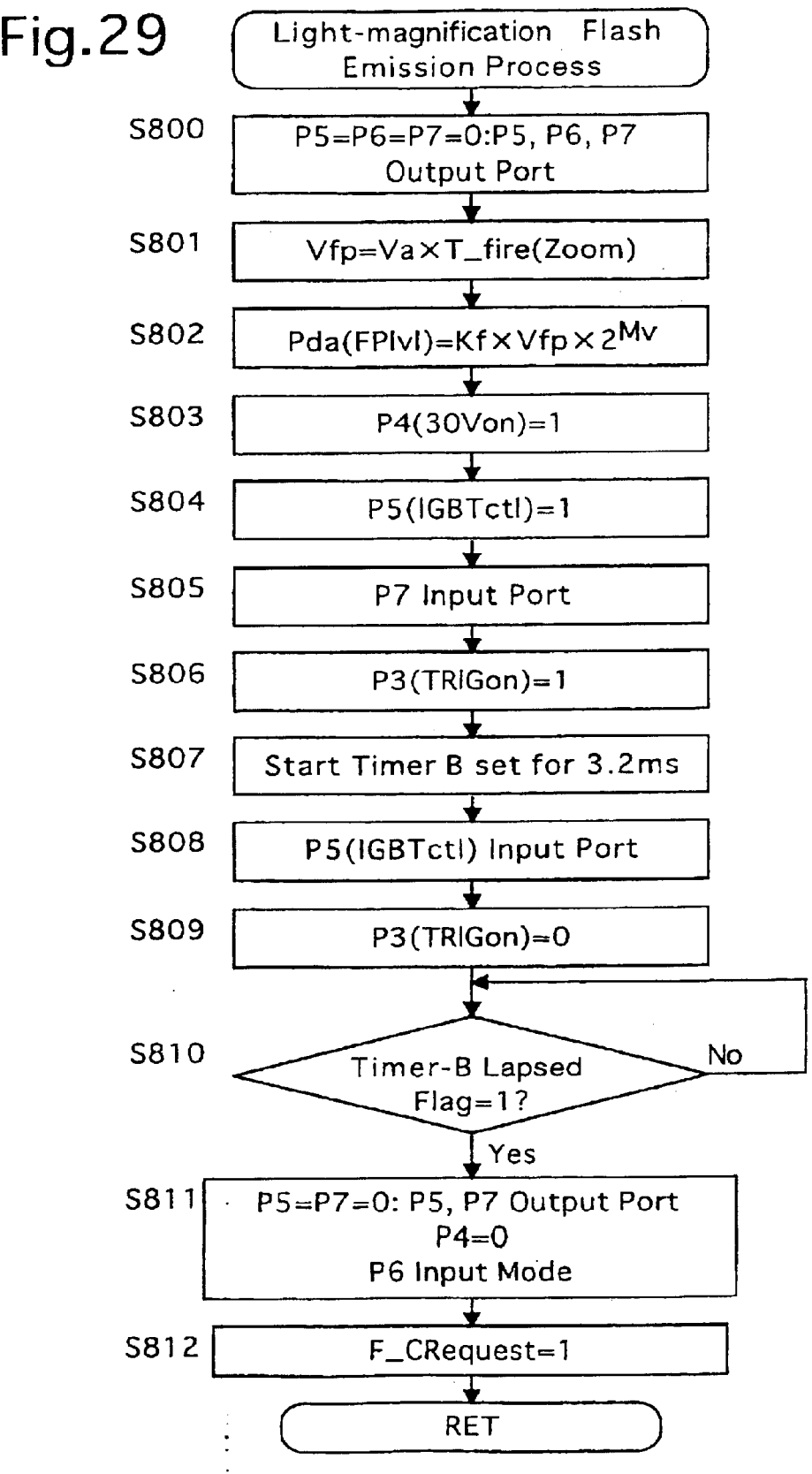
FIG. 29 is a flow chart for a light-magnification flash emission process performed by the CPU of the flash device.

The light-magnification flash process performed at step S860 will be hereinafter discussed in detail with reference to the flow chart shown in FIG. 29. In the light-magnification flash emission process, firstly each of the ports P5, P6 and P7 is set to serve as output port while a low-level signal "0" is output from each of the output ports P5, P6 and P7 (step S800). At this time, the electric charges accumulated in the capacitor 73 are discharged via the resistor 74. Subsequently, the uniform flash-emission level Vfp is calculated at step S801 using the following equation:

$$Vfp=Va \times T\_fire(zoom).$$

Subsequently, the output level of the voltage FPlvl, which is to be output from the D/A conversion port Pda, is calculated at step S802 using the following equation:

$$FPlvl=Kf \times Vfp \times 2^{Mv}$$

wherein "Kf" represents a predetermined constant.

The calculated voltage FPlvl is output from the D/A conversion port Pda to be supplied to the non-inverting input terminal of the comparator 75. Subsequently, the signal 30 Von of the output port P4 is changed from "0" to "1" so that a voltage of 30 volts is output from the 30-volt generating circuit 77 to be applied to the level shift circuit 78 (step S803). Subsequently, the output port P5, i.e., the signal IGBTctl, is changed from "0" to "1" (step S804) and subsequently the port P7 is set to serve as input port (step S805). A change of the output port P5, i.e., the signal IGBTctl, from "0" to "1" causes the voltage of 30 volts generated by the 30-volt generating circuit 77 to be applied to the gate IGBTg of an IGBT 83 to switch the IGBT 83 ON. In a state where the port P7 serves as input port, the photocurrent generated by the light-receiving element 85 for detecting the amount of the flash emission discharged from the xenon flashtube 82 is accumulated in the capacitor 73.

Subsequently, the signal TRIGon of the output port P3 is changed from "0" to "1" to thereby cause the xenon flashtube 82 to start discharging (step S806), the timer B is set for 3.2 ms and started (step S807), the port P5 (IGBTctl) is set to serve as input port (step S808), and the output port P3, i.e., the signal TRIGon, is set to "0" (step S809).

Upon a commencement of the discharge of the xenon flashtube 82 due to the operation at step S806, the light-receiving element 85 generates a photocurrent which corresponds to the received light amount. The generated photocurrent is accumulated in the capacitor 73, which increases the voltage PDfl that is input to the inverting input terminal of the comparator 75. Thereafter, immediately after the voltage PDfl reaches the voltage FPlvl, the output (IGBTctl) of the comparator changes from "1" to "0" to thereby switch the IGBT 83 OFF via the level shift circuit 78. Consequently, the xenon flashtube 82 stops discharging. It should be noted that the light amount of the flash light emission of the xenon flashtube 82 is proportional to $2^{Mv}$ since the voltage FPlvl is determined as being proportional to $2^{Mv}$.

Subsequently, it is determined whether the timer-B lapsed flag is 1 (step S810). If the timer-B lapsed flag is not 1 (if NO at step S810), control returns to step S810 to repeat the checking operation at step S810 until the timer-B lapsed flag becomes 1. If the timer-B lapsed flag is 1 (if YES at step S810), each of the output ports P5 and P7 is set to serve as output port, and is set to "0". At the same time, the port P4 is set to "0", while the port P6 is set to serve as input port (step S811). Subsequently, the F_CRequest is set to 1 (step S812) and control returns to the PCW interrupt process shown in FIGS. 27 and 28.

Old-System Process

Figure 32:
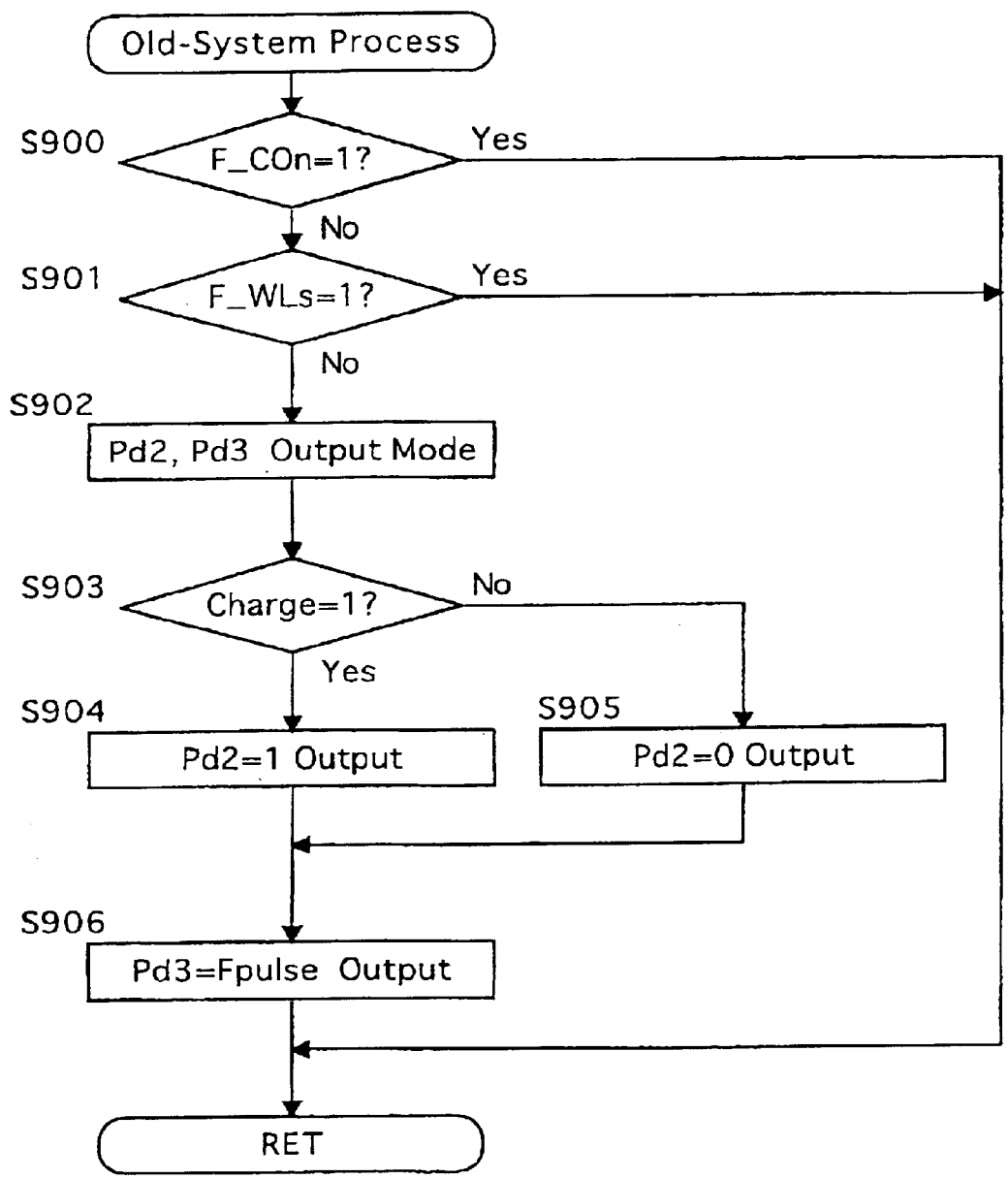
FIG. 32 is a flow chart for an old-system process performed by the CPU of the flash device.

The old-system process performed at step S511-2 will be hereinafter discussed in detail with reference to the flow chart shown in FIG. 32. In the old-system process, the charge completion signal and the Fpulse signal that corresponds to the f-number set on the flash device 50 are transmitted to the camera body via the terminal connector 56 if the camera body is a conventional type which cannot have communication with the flash CPU 65. The Fpulse signal is a pulse signal having a frequency proportional to the camera's f-number setting set on the flash device 50.

In the old-system process, firstly it is determined whether the F_COn flag is 1 (step S900). If the F_COn flag is 1 (if YES at step S900), control returns to the flash main process shown in FIG. 20 because the camera body is of a type which can have communication with the flash CPU 65 (see step S613 in FIG. 22). If the F_COn flag is not 1 (if NO at step S900), it is determined whether the WLset flag is 1 (step S901). If the WLset flag is 1 (if YES at step S901), control returns to the flash main process shown in FIG. 20 because the flash device 50 is serving as slave flash unit (see step S562 in FIG. 21).

If the F_COn flag is not 1 (if NO at step S900) and further if the WLset flag is not 1 (if NO at step S901), each of the ports Pd2 and Pd3 (see FIG. 33) of the flash CPU 65 is set to serve as output port (step S902). It should be noted that setting each of the ports Pd2 and Pd3 of the flash CPU 65 to serve as output port indicates that the I/O port switch terminal IN/OUT (see FIG. 34) is changed from "1" to "0".

Subsequently, it is determined whether the Charge flag is 1 (step S903). The Charge flag is set to 1 when the main capacitor 79 has been fully charged. If the Charge flag is 1 (if YES at step S903), the I/O port Pd2 of the flash CPU 65 is set to 1 while a signal of "1" is output therefrom (step S904). Due to the operation at step S904, the charge completion signal "1" is output to the CPU 13 of the camera body 10 via the terminal R. On the other hand, if the Charge flag is not 1 (if NO at step S903), the I/O port Pd2 of the flash CPU 65 is set to 0 and a signal of "0" is output therefrom (step S905). Due to the operation at step S905, the charge completion signal "0" is output to the CPU 13 of the camera body 10 via the terminal R.

After the charge completion signal "0" or "1" has been output to the CPU 13, the Fpulse signal is output from the port Pd3 (step S906) and subsequently control returns to the flash main process shown in FIG. 20.

Figure 35:
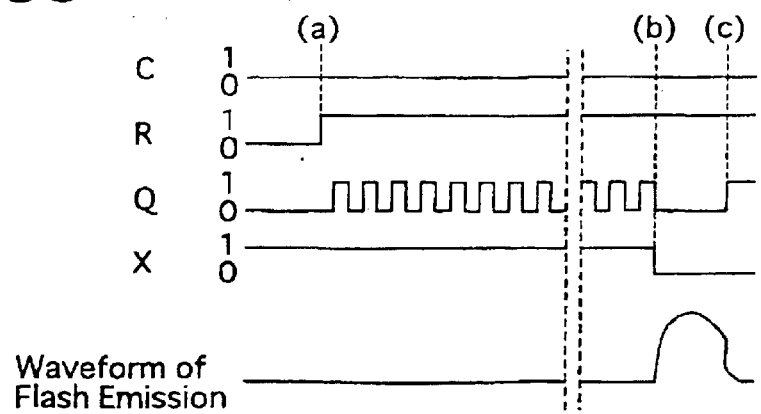
FIG. 35 is a timing chart for signals output from specific terminals of the terminal connector of the flash device and for a flash emission in the old-system process, illustrating a Fpulse signal that is output from the flash device.

FIG. 35 is a timing chart for the signals output from the terminals C, R, Q and X of the terminal connector 56 and for a flash emission in the old-system process. When the terminal C of the terminal connector 56 of the camera body 10 is "0", upon a change of the charge completion signal from "0" to "1", the terminal R changes from "0" to "1". This causes the Fpulse signal to be output from the terminal Q (at a time (a) shown in FIG. 35). Thereafter, upon a change of the terminal X from "1" to "0" (at a time (b) shown in FIG. 35), the flash device 50 starts discharging, and at the same time, the terminal Q is set to serve as input port. Thereafter, the flash device 50 stops discharging in response to the quench signal transmitted from the camera body 10 via the terminal Q (at a time (c) shown in FIG. 35).

As can be understood from the foregoing, according to the present invention, since the light amount of a pre-flash emission is controlled so that illuminance on an object at a specified distance is substantially constant regardless of a variation of the flash illumination angle, correct exposure is attained for the main subject in accordance with photometric measurements at the pre-flash emission even if a plurality of zoom flash devices with different illumination angles are used or even if a plurality of flash devices with different guide numbers are used. Furthermore, correct exposure is attained for the main subject in a flash photography system in which a plurality of flash devices are controlled by wireless control.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom flash comprising:
   a light emitter;
   a zoom driver which moves said light emitter along an axis to vaiy an illumination angle;
   a detector which detects a zoom position of said light emitter;
   a calculator which calculates a pre-flash emission level according to the detected zoom position so that iliuminance on an object at a predetermined distance is substantially constant regardless of a variation of said illumination angle;
   a controller which activates said light emitter to emit a preliminary flash emission, before a main flash emission, by supplying a voltage corresponding to said pre-flash emission level for said light emitter; and
   a memory in which a maximum guide number that varies in accordance with said zoom position, a constant predetermined reference guide number, and a predetermined reference flash emission level serving as a correction constant are stored,
   wherein said maximum guide number, said reference guide number, and said reference flash emission level are stored in said memory, and wherein said calculator calculates a pre-flash emission level using a predetermined relationship between the reference flash emission level, the reference guide number and the maximum guide number corresponding to the detected zoom position.

2. The zoom flash according to claim 1, wherein said calculator calculates said pre-flash emission level so that an effective guide number is substantially constant regardless of said variation of said illumination angle.

3. The zoom flash according to claim 1, further comprising a terminal connector via which said zoom flash is electrically connectable to a camera body;
   wherein said zoom driver moves said light emitter in accordance with a focal length of a photographing lens of the camera body when said zoom flash is electrically connected to the camera body.

4. The zoom flash according to claim 1, wherein said control device controls said light emitter to perform a pre-flash emission in a flat emission mode.

5. A flash photography system having a camera body and at least one zoom flash, said at least one zoom flash being activatable to emit a preliminary flash emission before a main flash emission, wherein said at least one zoom comprises:
   a light emitter;
   a zoom driver which moves said light emitter along an axis to vazy an illumination angle; and
   a detector which detects a zoom position of said light emitter;
   wherein one of said camera body and said at least one zoom flash comprises:
   a calculator which calculates a pre-flash emission level according to the detected zoom position so that an illuminance on an object at a predetermined distance is substantially constant regardless of a variation of said illumination angle;
   a controller which activates said light emitter to emit a preliminary flash emission by supplying a voltage corresponding to said pre-flash emission level for said light emitter before a main flash emission; and
   a memory in which a maximum guide number that varies in accordance with said zoom position, a constant predetermined reference guide number, and a predetermined reference flash emission level serving as a correction constant are stored;
   wherein said maximum guide number, said reference guide number, and said reference flash emission level are stored in said memory, and wherein said calculator calculates a pre-flash emission level using a predetermined relationship between the reference flash emission level, the reference guide number and the maximum guide number corresponding to the detected zoom position.

6. The flash photography system according to claim 5, wherein said calculator calculates said pre-flash emission level so that an effective guide number is substantially constant regardless of said variation of said illumination angle.

7. The flash photography system according to claim 5, further comprising a terminal connector via which said zoom, flash is electrically connectable to a camera body;
   wherein said zoom driver moves said light emitter in accordance with a focal length of a photographing lens of said camera body when said zoom flash is electrically connected to said camera body.

8. The flash photography system according to claim 5, wherein said controller controls said light emitter to perform a pre-flash emission in a flat emission mode.

9. A zoom flash comprising:
   a light emitter and a lens element;
   a zoom driver that varies a distance between said light emitter and said lens element to vary an illumination angle;
   a detector which detects a distance set by said zoom driver;
   a calculator which calculates a pre-flash emission level according to the distance set by said zoom driver so that illuminance on an object at a predetermined distance is substantially constant regardless of a variation of said illumination angle;
   a controller which activates said light emitter to emit a preliminary flash emission, before a main flash emission, by supplying a voltage corresponding to said pre-flash emission level for said light emitter; and
   a memory that stores data related to a maximum guide number that varies in accordance with said distance and related to a constant predetermined reference guide number,
   wherein said calculator calculates a pre-flash emission level utilizing the data in said memory.

10. The zoom flash according to claim 9, wherein:
    said memory stores said maximum guide number that varies in accordance with said zoom position, said predetermined reference guide number, and a reference flash emission level predetermined as a correction constant; and
    wherein said calulator calculates a pre-flash emission level using the following equation:

$$Vfp=Va\times(Gnos/Gno(\text{zoom}))^2$$

wherein "Vfp" represents said pre-flash emission level;
    "Va" represents said reference flash emission level;
    "Gnos" represents said reference guide number; and
    "Gno(zoom)" represents said maximum guide number corresponding to the detected zoom position.

11. The zoom flash according to claim 10, further comprising a terminal connector via which said zoom flash can be electrically connected to a camera body;
    wherein said zoom driver moves said ligit emitter in accordance with a focal length of a photographing lens of said camera body in a case where said zoom flash is electrically connected to said camera body.

12. The zoom flash according to claim 9, said pre-flash emission level decreasing in accordance with an increase in a focal length of a photographing lens of a camera to which said zoom flash is connected and increasing in accordance with a decrease in the focal length of the photographing lens.

13. A flash photography system having a camera body and at least one zoom flash, said at least one zoom flash being activated to emit a preliminary flash emission before a main flash emission, wherein said at least one zoom flash comprises:
    a light emitter and a lens element;
    a zoom driver that varies a distance between said light emitter and said lens element to vary an illumination angle;
    a detector which detects the distance set by said zoom driver; and
    a memory that stores data related to a maximum guide number that varies in accordance with said distance and related to a constant predetermined reference guide number,
    wherein said calculator calculates a pre-flash emission level utilizing the data in said memory,
    wherein one of said camera body and said at least one zoom flash comprises:
    calculator which calculates a pre-flash emission level according to the distance set by said zoom driver so that an illumnance on an object at a predetermined distance is substantially constant regardless of a variation of said illumination angle; and
    a controller which activates said light emitter to emit a preliminary flash emission by supplying a voltage corresponding to said pre-flash emission level for said light emitter before a nain flash emission.

14. The flash photography system according to claim 13, wherein said memory stores said maximum guide number that varies in accordance with said zoom position, said constant predetermined reference guide number, and a reference flash emission level predetermined as a correction constant; and
    wherein said calculator calculates a pre-flash emission level using the following equation:

$$Vfp=Va\times(Gnos/Gno(\text{zoom}))^2$$

wherein "Vfp" represents said pre-flash emission level;
    "Va" represents said reference flash emission level;
    "Gnos" represents said reference guide number; and
    "Gno(zoom)" represents said maximum guide number corresponding to the detected zoom position.

15. The flash photography system according to claim 14, further comprising a terminal connector via which said zoom flash can be electrically connected to a camera body;
    wherein said zoom driver moves said light emitter in accordance with a focal length of a photographing lens of said camera body in a case where said zoom flash is electrically connected to said camera body.

16. The flash photography system according to claim 14, wherein said control device controls said light emitter perform a pre-flash emission in a flat emission mode.

17. The flash photography system according to claim 13, the at least one zoom flash comprising a plurality of zoom flashes, wherein in a further zoom flash of said plurality of zoom flashes said memory stores data related to a further maximum guide number that varies in accordance with said distance and related to a further constant predetermined reference guide member, said further maximum guide number being different than said maximum guide number and said further constant predetermined reference guide number being different than said constant predetermined referenceguide number.

18. The flash photography system according to claim 13, said pre-flash emission level decreasing in accordance with an increase in a focal length of a photographing lens attached to said camera body and increasing in accordance with a decrease in the focal length of the photographing lens.

* * * * *